United States Patent
Peterson

(10) Patent No.: US 9,998,328 B1
(45) Date of Patent: Jun. 12, 2018

(54) SERVICE-ORIENTED SYSTEM OPTIMIZATION USING CLIENT DEVICE RELOCATION

(71) Applicant: Amazon Technologies, Inc., Reno, NV (US)

(72) Inventor: Kyle Bradley Peterson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 371 days.

(21) Appl. No.: 14/309,752

(22) Filed: Jun. 19, 2014

(51) Int. Cl.
H04L 12/24 (2006.01)

(52) U.S. Cl.
CPC .......... H04L 41/0816 (2013.01); H04L 41/50 (2013.01); H04L 41/5035 (2013.01); H04L 41/5054 (2013.01)

(58) Field of Classification Search
CPC ............. H04L 41/0816; H04L 41/5054; H04L 41/5035; H04L 41/50
See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 6,522,631 B2 | 2/2003 | Rosborough et al. | |
| 7,209,548 B2 | 4/2007 | Ethier et al. | |
| 7,454,458 B2 * | 11/2008 | Islam | G06F 9/505 709/203 |
| 7,496,799 B2 | 2/2009 | Prang et al. | |
| 7,757,214 B1 * | 7/2010 | Palczak | G06F 9/5083 709/223 |
| 8,051,410 B2 * | 11/2011 | Marfatia | G06F 8/51 717/124 |
| 8,244,874 B1 * | 8/2012 | Thireault | G06F 9/5072 709/226 |
| 8,429,630 B2 * | 4/2013 | Nickolov | H04L 67/34 717/110 |
| 8,589,558 B2 * | 11/2013 | Peles | G06Q 10/0639 709/226 |
| 8,645,529 B2 * | 2/2014 | Doddavula | H04L 67/34 709/223 |
| 8,732,291 B2 * | 5/2014 | Zhu | H04L 67/303 709/217 |

(Continued)

OTHER PUBLICATIONS

Rodrigo Fonseca, George Porter, Randy H. Katz, Scott Shenker, and Ion Stoica, "X-Trace: A Pervasive Network Tracing Framework," 4th USENIX Symposium on Networked Systems Design & Implementation (NSDI'07), Apr. 2007, pp. 1-14.

(Continued)

Primary Examiner — Patrice L Winder
(74) Attorney, Agent, or Firm — Robert C. Kowert; Meyertons Hood Kivlin Kowert & Goetzel, P.C.

(57) ABSTRACT

Methods, systems, and computer-readable media for implementing service-oriented system optimization using client device relocation are disclosed. An optimized configuration is determined for a service-oriented system based on trace data for a plurality of service interactions between services. One or more of the services are relocated to one or more client devices based on the optimized configuration. The relocation improves a total performance metric in at least a portion of the service-oriented system.

20 Claims, 44 Drawing Sheets

(56) References Cited

U.S. PATENT DOCUMENTS

| | | | | |
|---|---|---|---|---|
| 8,775,677 | B2* | 7/2014 | Meijer | H04L 41/50 709/223 |
| 8,863,138 | B2* | 10/2014 | Sedayao | G06F 11/30 709/223 |
| 8,930,541 | B2* | 1/2015 | Assuncao | G06F 9/50 709/212 |
| 8,954,574 | B1* | 2/2015 | Chheda | H04L 67/1095 709/220 |
| 9,229,854 | B1 | 1/2016 | Kuzmin et al. | |
| 9,363,190 | B2* | 6/2016 | Beloglazov | H04L 47/70 |
| 2004/0213395 | A1 | 10/2004 | Ishii et al. | |
| 2007/0169049 | A1 | 7/2007 | Gingell et al. | |
| 2008/0080497 | A1 | 4/2008 | Meijer et al. | |
| 2008/0082641 | A1* | 4/2008 | Meijer | H04L 67/20 709/220 |
| 2008/0256020 | A1 | 10/2008 | Wakefield | |
| 2010/0332629 | A1* | 12/2010 | Cotugno | H04L 67/34 709/221 |
| 2011/0161496 | A1 | 6/2011 | Nicklin | |
| 2011/0320520 | A1* | 12/2011 | Jain | G06F 9/5072 709/203 |
| 2013/0085742 | A1* | 4/2013 | Barker | G06F 9/5088 703/22 |
| 2013/0151681 | A1* | 6/2013 | Dournov | G06F 8/67 709/223 |
| 2013/0227547 | A1* | 8/2013 | Little | G06F 8/60 717/177 |
| 2013/0346572 | A1* | 12/2013 | Jain | G06F 9/5088 709/223 |
| 2014/0019970 | A1* | 1/2014 | Okamoto | G06F 9/4856 718/1 |
| 2014/0057722 | A1* | 2/2014 | Justice | A63F 13/12 463/42 |
| 2014/0067758 | A1* | 3/2014 | Boldyrev | H04L 67/1097 707/610 |
| 2014/0156813 | A1* | 6/2014 | Zheng | H04L 67/16 709/220 |
| 2015/0113117 | A1* | 4/2015 | Jun | H04L 43/0876 709/224 |
| 2015/0222516 | A1 | 8/2015 | Deval et al. | |
| 2016/0285780 | A1* | 9/2016 | Strijkers | H04L 67/10 |

OTHER PUBLICATIONS

Benjamin H. Sigelman, Luiz Andre Barroso, Mike Burrows, Pat Stephenson, Manoj Plakal, Donald Beaver, Saul Jaspan, and Chandan Shanbhag, "Dapper, a Large-Scale Distributed Systems Tracing Infrastructure," Google Technical Report dapper-2010-1, Apr. 2010, pp. 1-14.

U.S. Appl. No. 14/309,755, filed Jun. 19, 2014, Â Kyle Bradley Peterson.

U.S. Appl. No. 14/309,762, filed Jun. 19, 2014, Â Kyle Bradley Peterson.

U.S. Appl. No. 14/309,765, filed Jun. 19, 2014, Â Kyle Bradley Peterson.

U.S. Appl. No. 14/309,746, filed Jun. 19, 2014, Kyle Bradley Peterson.

* cited by examiner

SERVICE-ORIENTED SYSTEM OPTIMIZATION USING CLIENT DEVICE RELOCATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for providing service-oriented system optimization are described. Using the systems and methods described herein, interactions between services (e.g., service requests and service responses) in a distributed system may be monitored by individual services. Based on the trace data generated by the monitoring, one or more performance metrics for the service interactions may be generated, and one or more call graphs capturing relationships between the services may be generated. An optimized configuration may be generated for the services. In one embodiment, the optimized configuration may be generated based (at least in part) on the performance metric(s). In one embodiment, the optimized configuration may be generated based (at least in part) on the call graph(s). In one embodiment, the optimized configuration may be generated based (at least in part) on static analysis of the program code of one or more services, e.g., to detect dependencies between services. Services may be relocated (e.g., to different hosts) to implement the optimized configuration. In one embodiment, a partial service may be generated to include frequently used program code from an original service, and the partial service may be deployed in suitable locations based on the optimized configuration. In one embodiment, a service may be relocated to an edge host to reduce latency between the service-oriented system and client devices. In one embodiment, a service may be relocated to a client device to reduce the latency of client transactions. In general, global information concerning the service-oriented system may be used to optimize any suitable characteristic of the system, e.g., by selecting optimized configuration options. In this manner, the performance and/or cost of the service-oriented system may be optimized.

Figure 1:
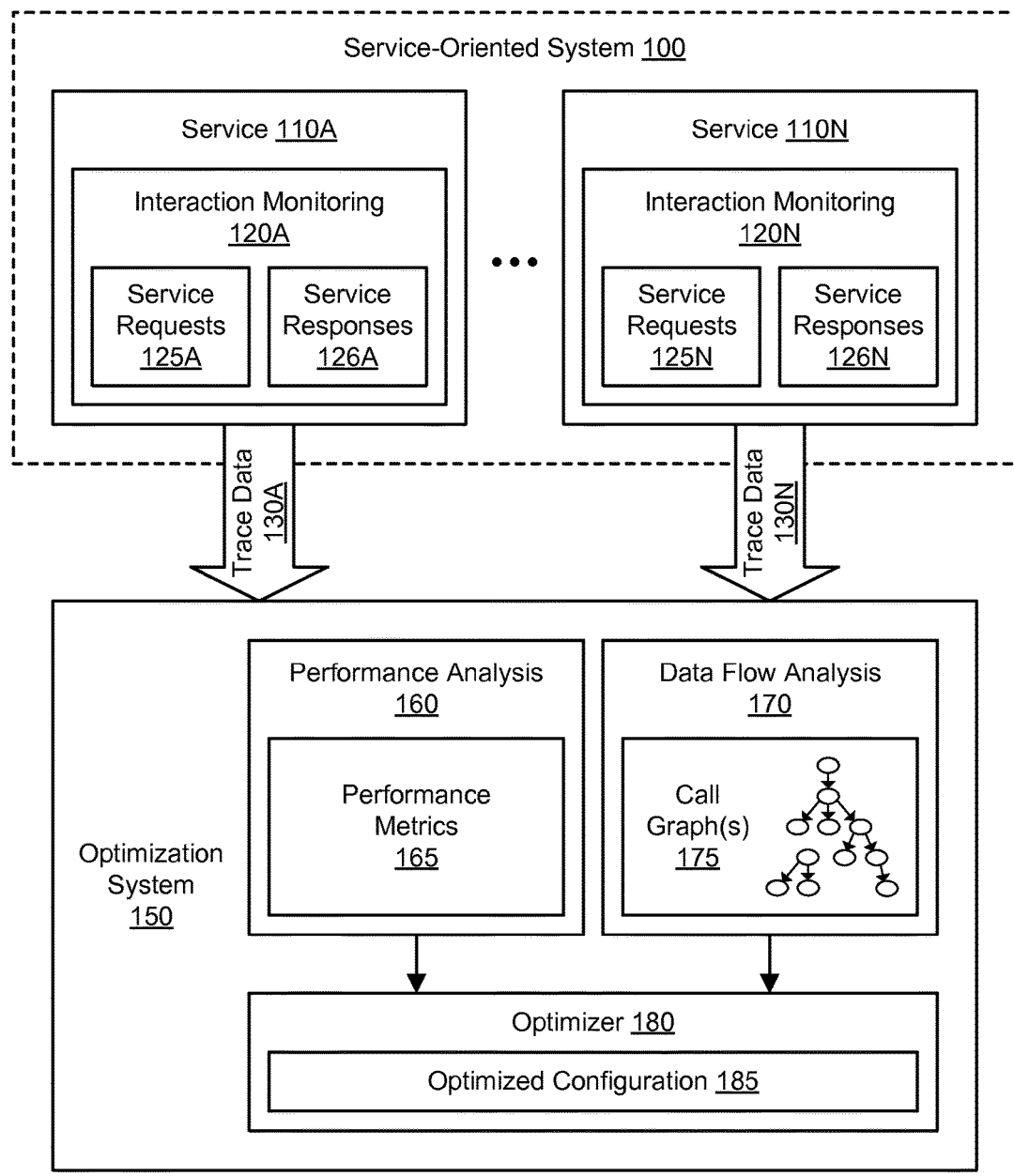
FIG. 1 illustrates an example system environment for service-oriented system optimization using trace data, according to some embodiments.

FIG. 1 illustrates an example system environment for service-oriented system optimization using trace data, according to some embodiments. The example system environment may include a service-oriented system 100 and an optimization system 150. The service-oriented system 100 may implement a service-oriented architecture and may include multiple services 110A-110N configured to communicate with each other (e.g., through message passing) to carry out various tasks, such as business functions. Although two services 110A and 110N are illustrated for purposes of example, it is contemplated that any suitable number of services may be used with the service-oriented system 100. The services 110A-110N may represent different services (e.g., different sets of program code) or different instances of the same service. The services 110A-110N may be implemented using a plurality of hosts, any of which may be implemented by the example computing device 3000 illustrated in FIG. 28. The hosts may be located in any suitable number of data centers or geographical locations. In one embodiment, multiple services and/or instances of the same service may be implemented using the same host. It is contemplated that the service-oriented system 100 and/or optimization system 150 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, each of the services 110A-110N may be configured with one or more components for monitoring interactions between services. For example, service 110A may include an interaction monitoring functionality 120A, and service 110N may include an interaction monitoring functionality 120N. The interaction monitoring functionality 120A or 120N may monitor or track interactions between the corresponding service 110A or 110N and other services (or components of services) in the service-oriented system 100. The monitored interactions may include service requests 125A-125N (i.e., requests for services to be performed), responses 126A-126N to requests, and other suitable events.

In one embodiment, the interaction monitoring functionality 120A or 120N may monitor service interactions such as service requests 125A or 125N and service responses 126A or 126N in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service requests 125A-125N and responses 126A-126N, lightweight instrumentation may be added to services, including services 110A-110N. The instrumentation (e.g., a reporting agent associated with each service) may collect and report data associated with each inbound request, outbound request, or other service interaction (e.g., a timer-based interaction) processed by a service. Further aspects of the interaction monitoring functionality 120A-120N are discussed below with respect to FIG. 21 through FIG. 26.

Based on the interaction monitoring, a service may collect trace data and send the trace data to the optimization system 150. For example, service 110A may collect and send trace data 130A, and service 110N may collect and send trace data 130N. The trace data may describe aspects of the service interactions. In one embodiment, the trace data may be generated in real-time or near real-time, e.g., as service requests and service responses are received and/or processed by the services. The trace data may include data indicative of relationships between individual services, such as an identification of the calling (i.e., requesting) service and the called (i.e., requested) service for each interaction. The trace data may include metadata such as request identifiers that are usable to identify paths of service requests and responses from service to service. Request identifiers are discussed in greater detail below with respect to FIG. 21 through FIG. 26. The trace data may also include data describing the performance of the service interactions. For example, the trace data may include data indicative of network latency for a request or response, data indicative of network throughput for one or more interactions, data indicative of service reliability or availability, data indicative of resource usage, etc. The trace data generated for multiple services and multiple service interactions may be sent to the optimization system 150 for aggregation and analysis.

In one embodiment, the optimization system 150 may include a plurality of components configured for analysis of the trace data 130A-130N and optimization of the service-oriented system 100 based on the analysis. For example, the optimization system 150 may include a performance analysis functionality 160, a data flow analysis functionality 170, and an optimizer functionality 180. The optimization system 150 may include one or more computing devices, any of which may be implemented by the example computing device 3000 illustrated in FIG. 28. In various embodiments, the functionality of the different services, components, and/or modules of the optimization system 150 may be provided by the same computing device or by different computing devices. If any of the various components are implemented using different computing devices, then the respective computing devices may be communicatively coupled, e.g., via a network. Each one of the performance analysis functionality 160, the data flow analysis functionality 170, and the optimizer functionality 180 may represent any combination of software and hardware usable to perform their respective functions, as discussed as follows.

Using the performance analysis functionality 160, the optimization system 150 may analyze the performance data generated by the interaction monitoring functionality 120A-120N and received by the optimization system 150 in the trace data 130A-130N. The performance analysis functionality 160 may determine one or more performance metrics 165 based on the trace data 130A-130N. In one embodiment, the performance metrics 165 may describe aspects of the performance of multiple interactions, such as metrics representing aggregate performance, average performances, etc. In one embodiment, the performance metrics 165 may describe aspects of the performance of individual interactions. For example, the optimization system 150 may calculate the client-measured latency for an interaction based on the time at which a request was sent by a service and also on the time at which a response to the request was received by the service. The optimization system 150 may also calculate the server-measured latency for an interaction based on the time at which a request was received by a service and also on the time at which a response to the request was sent by the service. The network transit time for the interaction may be calculated as the difference between the client-measured latency and the server-measured latency. Accordingly, the performance metrics 165 may include individual transit times for individual service calls and/or transit time metrics (e.g., mean, median, etc.) for multiple service calls. Network transit times may be impacted by the number of network hops, the physical distance between hops, and the link quality between endpoints. In one embodiment, the performance metrics 165 may describe aspects of the costs of performing or maintaining various interactions, services, instances of services, and/or hosts. For example, the cost may include elements of computing resource usage (e.g., processor usage, persistent storage usage, memory usage, etc.), energy consumption, heat production, and/or any other suitable cost element(s).

The interaction monitoring functionality 120A-120N for the various services may collect data indicative of service interactions involved in satisfying a particular initial request, e.g., data indicative of a route taken in satisfying a service request and/or a hierarchy of call pathways between services. The route may correspond to a set of call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service, which may then call one or more other services. Additionally, each of those services may also call one or more other services, and so on until the root request is completely fulfilled. The particular services called to fulfill a request may be represented as a call graph that specifies, for each particular service of multiple services called to fulfill the same root request, the service that called the particular service and any services called by the particular service.

Using the data flow analysis functionality 170, the optimization system 150 may analyze the trace data 130A-130N and generate one or more call graphs 175 based on connectivity information within the trace data. Each call graph may represent the flow of requests from service to service and may identify service dependencies. Each call graph may include a plurality of nodes representing services and one or more edges (also referred to as call paths) representing service interactions. Each of the call graphs 175 may include a hierarchical data structure that include nodes representing the services and edges representing the interactions. In some cases, a call graph may be a deep and broad tree with multiple branches each representing a series of related service calls. The data flow analysis functionality 170 may use any suitable data and metadata to build each call graph, such as request identifiers and metadata associated with services and their interactions. The request identifiers and metadata are discussed below with respect to FIG. 21 through FIG. 26. In one embodiment, the data flow analysis functionality 170 may analyze the trace data 130A-130N and generate suitable reports and/or visualizations (e.g., call graph visualizations) based on the trace data 130A-130N.

The generation of a particular call graph may be initiated based on any suitable determination. In one embodiment, the call graph generation may be initiated after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the call graph may be finalized within seconds or minutes.

Using the optimizer functionality 180, the optimization system 150 may determine an optimized configuration 185 for at least a portion of the one or more call graph(s). As used herein, the term "optimized" generally means "improved" rather than "optimal." The optimized configuration 185 for a set of services may represent an improvement on the existing configuration of the set of services with respect to one or more performance metrics (e.g., network latency or transit times, throughput, reliability or availability, cost, etc.) for at least a portion of the one or more call graphs. Accordingly, the optimized configuration 185 may be determined based on the one or more performance metrics 165 in order to optimize one or more call paths of the one or more call graphs 175. In one embodiment, the optimized configuration 185 may also be determined based on additional information that is not derived from trace data, such as an expense associated with each service instance, service interaction, host, and/or unit of resource consumption. In one embodiment, the optimized configuration 185 may be determined such that it minimizes, maximizes, decreases, or increases a total performance metric for one or more call paths. For example, the optimized configuration 185 may minimize or reduce the network latency for one or more call paths, maximize or increase the throughput for one or more call paths, maximize or increase the reliability or availability for one or more call paths, or minimize or reduce the cost for one or more call paths. The optimizer 180 may take into account the sensitivity of a particular call path to latency, e.g., whether improving the latency of one event would improve the latency of another event in a call graph. Any suitable component(s) may be used to implement the optimizer 180. For example, the optimizer 180 may be implemented using a constrained optimization solver which is configured to minimize a cost function or an energy function in the presence of one or more constraints or to maximize a reward function or a utility function in the presence of one or more constraints. The optimizer 180 may generate an optimized configuration 185 by optimizing a user-defined function of network latency, throughput, reliability, cost, and/or any other suitable term(s).

In one embodiment, data and/or metadata associated with a request or response may be compressed, encrypted, or serialized by a service. Similarly, data and/or metadata associated with a request or response may be decompressed, decrypted, or deserialized upon receipt by a service. The cost or time associated with compression, decompression, encryption, decryption, serialization, and/or deserialization may be taken into account by the optimizer 180. Accordingly, performance metrics associated with the costs of preparing a message for network transport and processing such a received message (e.g., the costs of compression, decompression, encryption, decryption, serialization, and/or deserialization) may be collected as part of the trace data. Additionally, the optimizer 180 may take into account such performance data as CPU (central processing unit) utilization for program code, memory utilization for program code, and any other suitable data. In one embodiment, the optimization system 150 may collect performance data from sources other than the interaction monitoring components.

In one embodiment, all or nearly all of the service interactions (e.g., the service requests 125A-125N and service responses 126A-126N) may be monitored to generate trace data 130A-130N for use with the optimization system 150. In one embodiment, however, only a subset of the service interactions (e.g., service requests 125A-125N and service responses 126A-126N) may be monitored to generate trace data 130A-130N for use with the optimization system 150. Any suitable technique may be used to identify which of the service interactions are collected and/or used as the basis for the optimized configuration 185. For example, probabilistic sampling techniques may be used to initiate interaction monitoring for a certain percentage (e.g., 1%) of all service interactions.

Figure 2A:
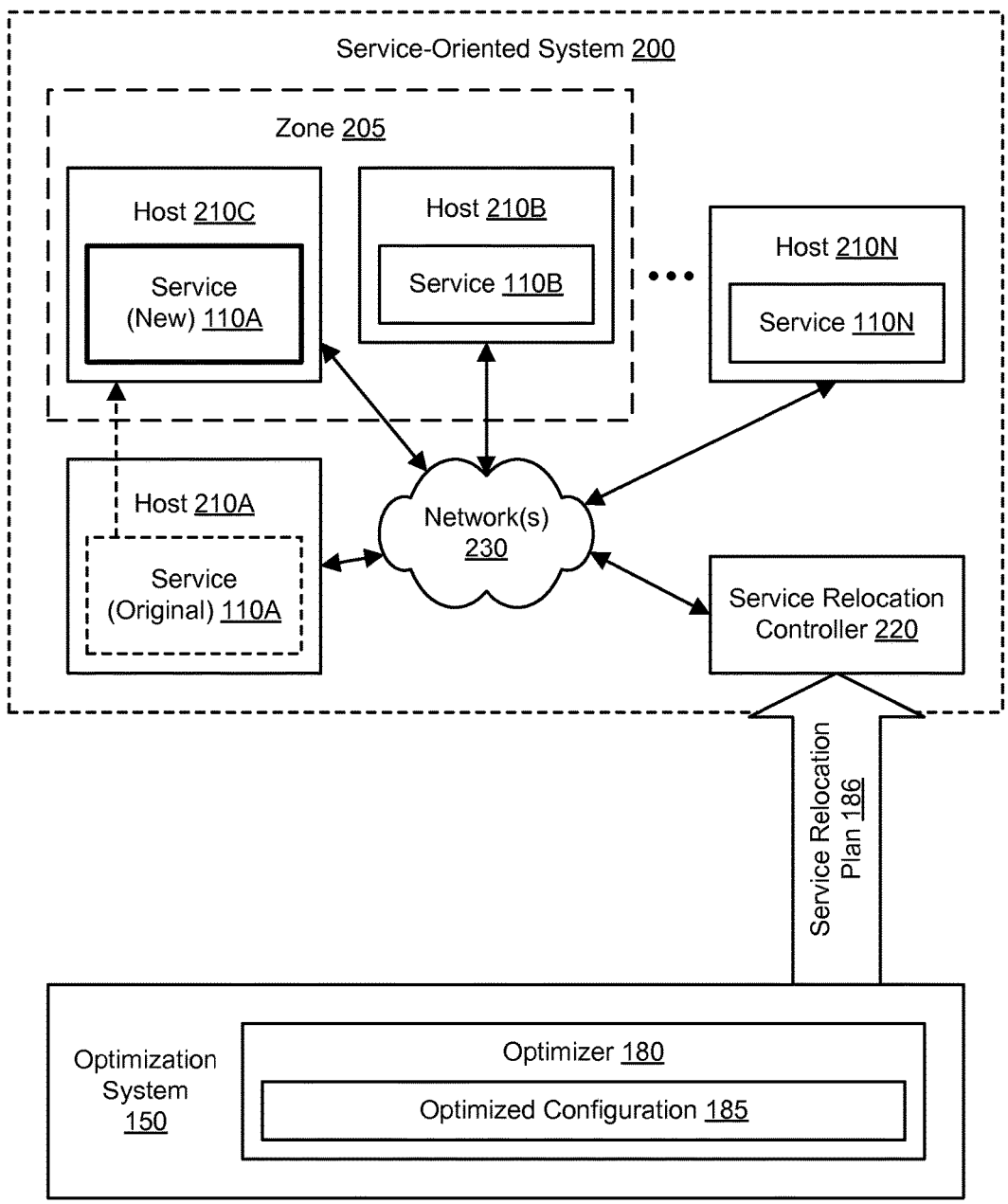
FIG. 2A illustrates aspects of an example system environment for service-oriented system optimization using trace data, including service relocation from host to host, according to some embodiments.
Figure 2B:
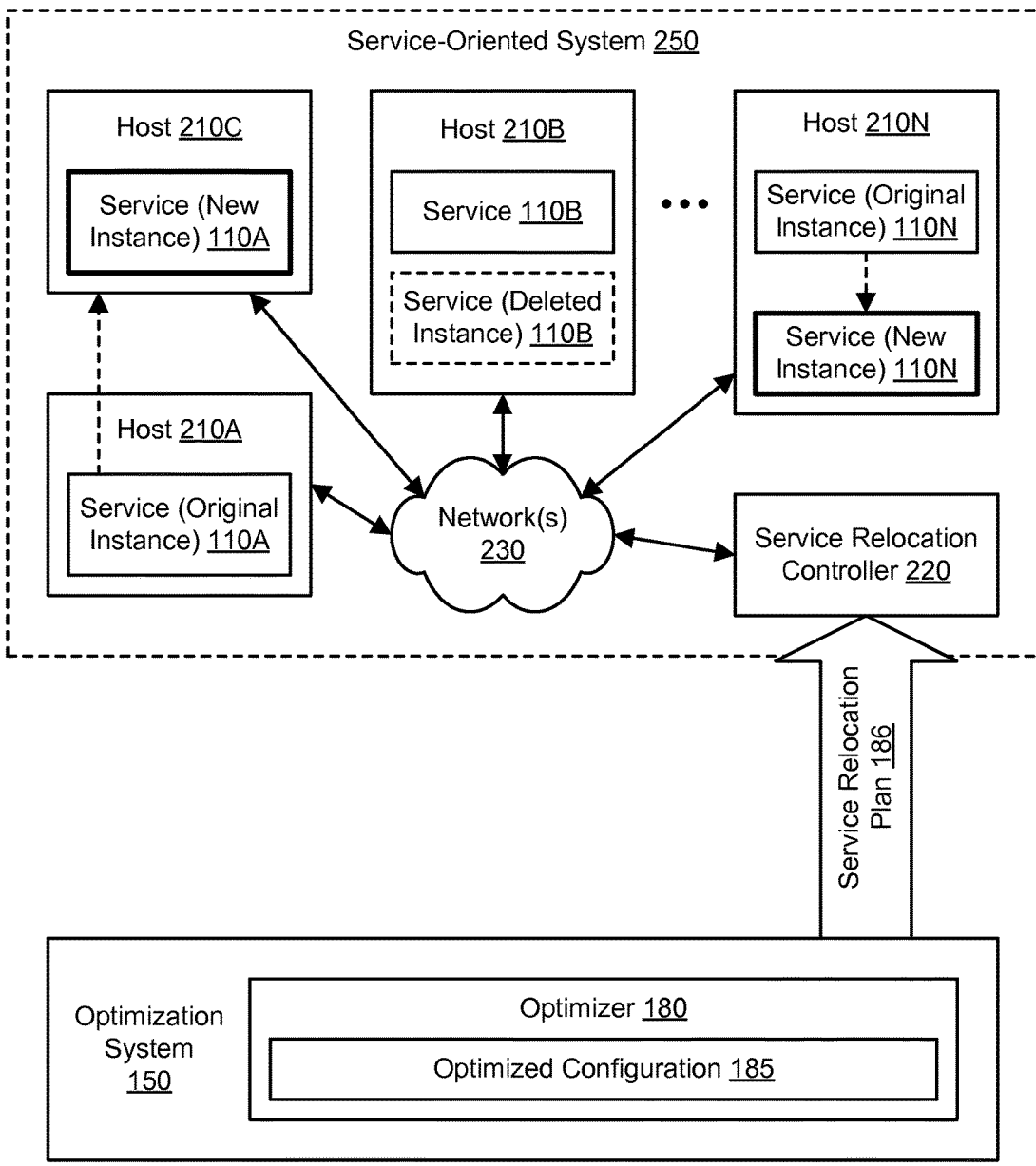
FIG. 2B illustrates aspects of an example system environment for service-oriented system optimization using trace data, including modification of the number of service instances, according to some embodiments.
Figure 3A:
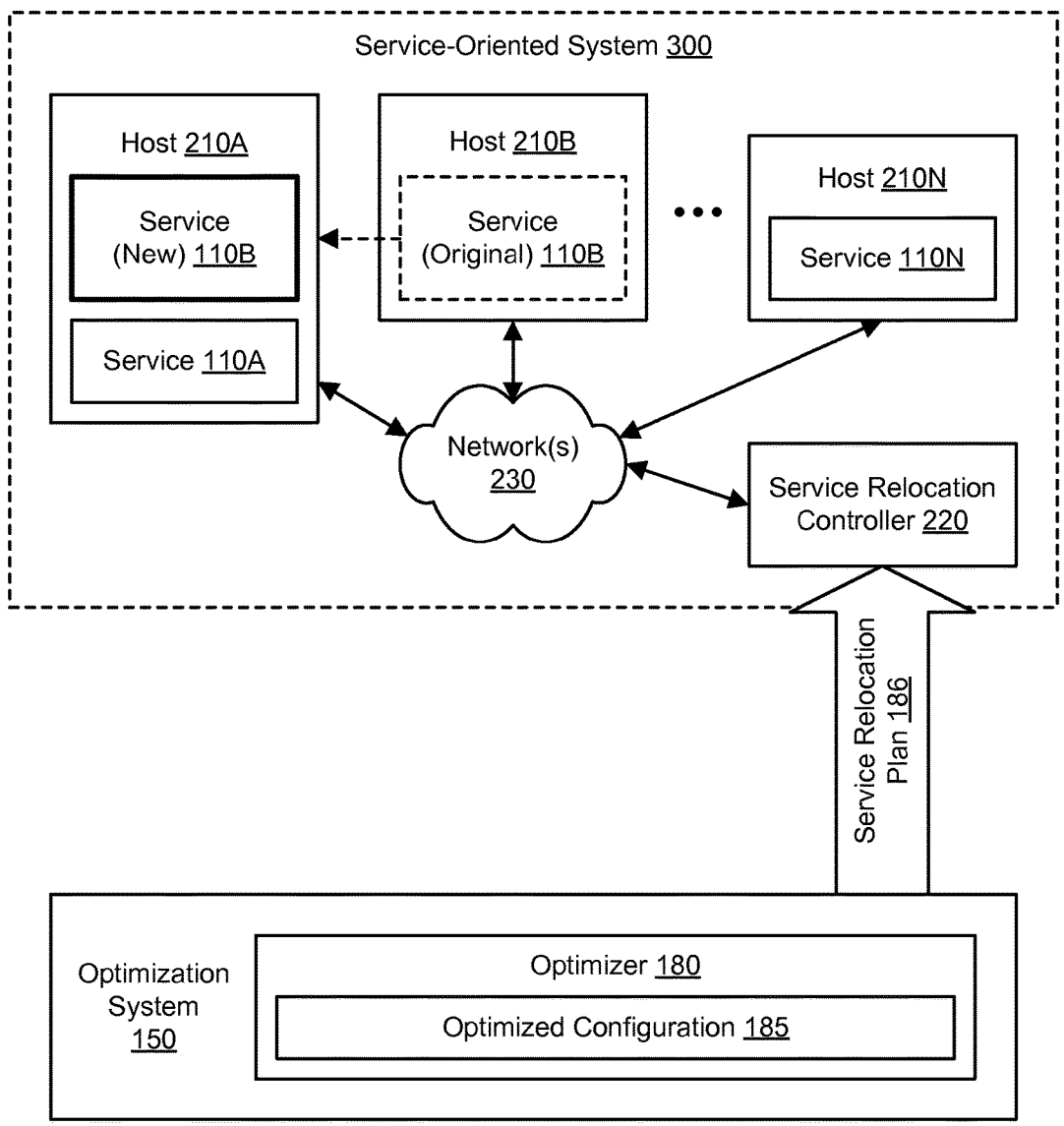
FIG. 3A illustrates aspects of an example system environment for service-oriented system optimization using trace data, including service relocation to a common host, according to some embodiments.
Figure 3B:
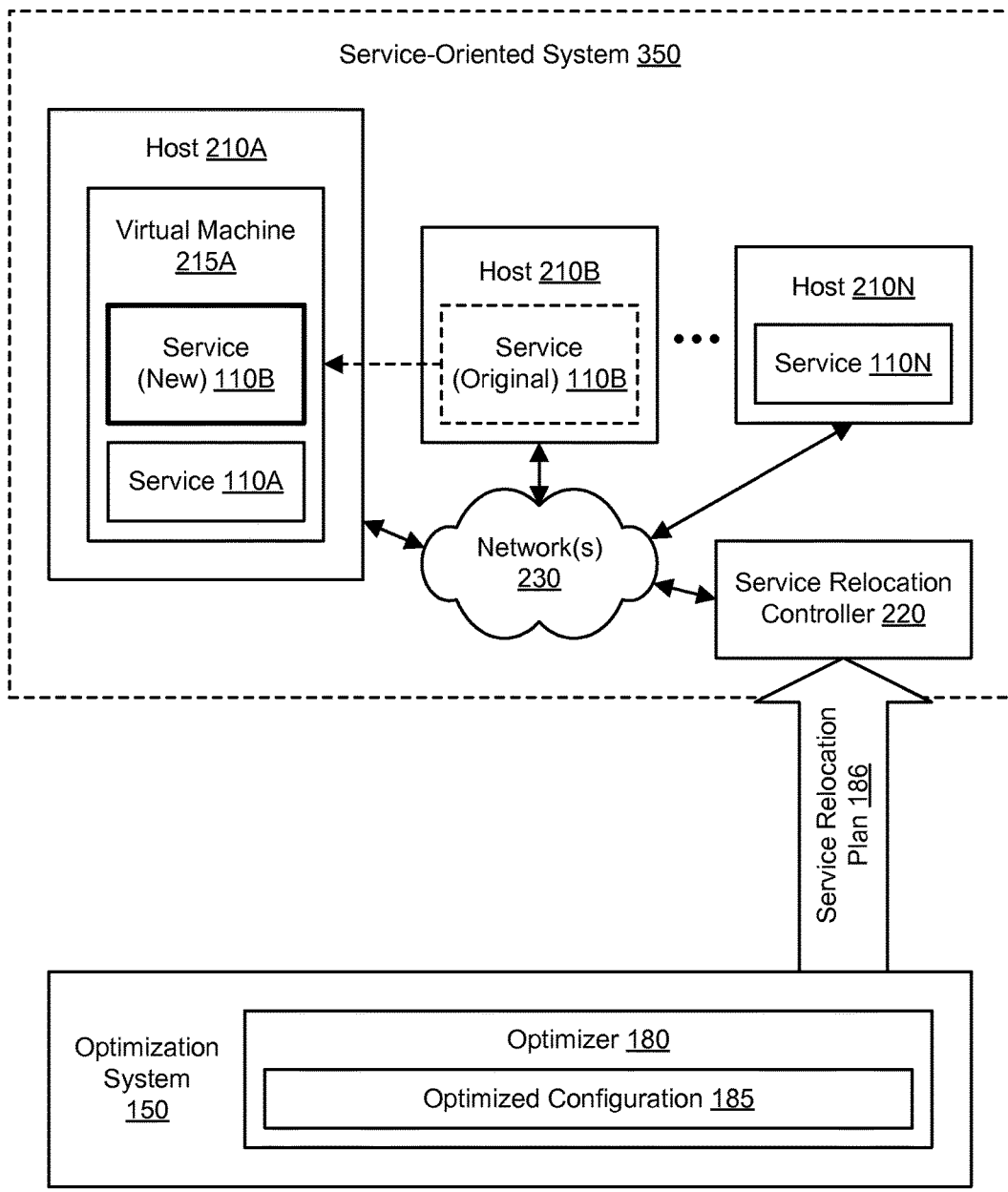
FIG. 3B illustrates aspects of an example system environment for service-oriented system optimization using trace data, including service relocation to a virtual machine on a common host, according to some embodiments.

As will be described in greater detail below, the location(s) of one or more services may be modified based on the optimized configuration 185. In one embodiment, as illustrated in FIG. 2A, one or more services may be moved to a different host. In one embodiment, as illustrated in FIG. 2B, the number of service instances may be modified. In one embodiment, as illustrated in FIG. 3A, a service may be moved to the same host as another service with which it shares a call path. In one embodiment, as illustrated in FIG. 3B, a service may be moved to the same virtual machine on the same host as another service with which it shares a call path. In this manner, the performance of the service-oriented system 100 may be improved through the collection and analysis of the trace data 130A-130N.

In one embodiment, the optimization system 150 may receive a continuous stream of trace data from the service-oriented system 100. The optimization system 150 may generate and/or modify the optimized configuration 185 repeatedly and at appropriate intervals. Similarly, the placement of services may be modified repeatedly and at appropriate intervals in accordance with new or modified versions of the optimized configuration 185.

FIG. 2A illustrates aspects of an example system environment for service-oriented system optimization using trace data, including service relocation from host to host, according to some embodiments. A service-oriented system 200 may implement a service-oriented architecture and may include a plurality of hosts, any of which may be implemented by the example computing device 3000 illustrated in FIG. 28. The hosts may be coupled using one or more networks 230. Although four hosts 210A, 210B, 210C, and 210N are illustrated for purposes of example, it is contemplated that any suitable number of hosts may be used with the service-oriented system 200. The hosts 210A-210N may be located in any suitable number of data centers and/or geographical locations. For example, hosts 210B and 210C may be physically located within a zone 205, and hosts 210A and 210N may be physically located outside the zone 205 (i.e., in one or more different zones). The zone 205 may represent a geographical area, a data center, or a particular location (e.g., a rack) within a data center.

In one embodiment, individual hosts may be added to or subtracted from the service-oriented system 200, e.g., based on the computing resources required to run a particular set of services with a desired level of performance. Each host may run one or more services. For example, as shown in FIG. 2A, host 210A may run an instance of service 110A, host 210B may run an instance of service 110B, and host 210N may run an instance of service 110N. In one embodiment, multiple services and/or instances of the same service may be implemented using the same host. It is contemplated that the service-oriented system 200 and/or optimization system 150 may include additional components not shown, fewer components than shown, or different combinations, configurations, or quantities of the components shown.

In some embodiments, the hosts 210A-210N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 28.

In one embodiment, a suitable component of the service-oriented system 200 may provision and/or configure the hosts 210A-210N. For example, the hosts 210A-210N may be provisioned from a pool of available compute instances by selecting available compute instances with suitable specifications and configuring the selected compute instances with suitable software. In one embodiment, additional compute instances may be added to the service-oriented system 200 as needed. In one embodiment, compute instances may be returned to the pool of available compute instances from service-oriented system 200, e.g., if the computing instances are not needed at a particular point in time. Additionally, the software installed on the hosts may be modified. A service relocation controller 220 may implement such a provisioning and configuration functionality (potentially in conjunction with other components) to cause one or more hosts to be added to the service-oriented system 200, cause one or more hosts to be removed from the service-oriented system 200, cause one or more services to be removed from one or more hosts, and/or cause one or more services to be added to one or more hosts. The service relocation controller 220 may be implemented by the example computing device 3000 illustrated in FIG. 28 and may be implemented as a physical compute instance or virtual compute instance.

The number of hosts and/or configuration of the hosts may be modified in accordance with the optimized configuration 185. In one embodiment, the number and/or configuration of the hosts may be modified dynamically, e.g., while the service-oriented system 200 remains operational to serve requests. Based on the trace data, the optimization system 150 may generate an optimized configuration 185 in which the original instance of the service 110A does not run on host 210A. The optimized configuration 185 may instead indicate that another instance of the service 110A should run on a different host 210C. In accordance with the optimized configuration 185, the service-oriented system 200 may be modified to relocate or migrate the service 110A from the original host 210A to the new host 210C. As discussed above, the hosts 210A and 210B may be located in different zones, while the hosts 210B and 210C may be located in the same zone 205. Due to the increased proximity of host 210C to host 210B, the relocation of the service 110A may yield performance and/or cost improvements.

In one embodiment, the optimization system 150 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. Using the service relocation plan 186, the service relocation controller 220 may implement the relocation or migration of one or more services, such as service 110A. Accordingly, the service relocation controller 220 may provision the host 210C (if necessary) and add the new instance of the service 110A to the host 210C. Additionally, if so indicated in the service relocation plan 186, the service relocation controller 220 may remove the original instance of the service 110A from the host 210A. In some scenarios, however, the original instance of the service 110A on host 210A may be left in place to run in parallel with the new instance of the service 110A on host 210C. In one embodiment, a service (e.g., service 110A) may include multiple components that may run independently, and only a portion of the service may be relocated based on the optimized configuration 185. In one embodiment, the host 210A may be removed from the service-oriented system 200 and returned to the pool of available hosts if it no longer provides any services after removal of the original instance of the service 110A. The service relocation controller 220 may also perform any steps needed to inform other services of the location of the new instance of the service 110A. In this manner, the service-oriented system 200 may be reconfigured to provide improved performance (e.g., improved transit times, throughput, or reliability) or to be implemented at an improved cost.

FIG. 2B illustrates aspects of an example system environment for service-oriented system optimization using trace data, including modification of the number of service instances, according to some embodiments. A service-oriented system 250 may implement a service-oriented architecture and may include a plurality of hosts, any of which may be implemented by the example computing device 3000 illustrated in FIG. 28. The hosts may be coupled using one or more networks 230. Although four hosts 210A, 210B, 210C, and 210N are illustrated for purposes of example, it is contemplated that any suitable number of hosts may be used with the service-oriented system 250. The hosts 210A-210N may be located in any suitable number of data centers and/or geographical locations. In one embodiment, individual hosts may be added to or subtracted from the service-oriented system 250, e.g., based on the computing resources required to run a particular set of services with a desired level of performance. Each host may run one or more services. For example, as shown in FIG. 2B, hosts 210A and 210C may run one or more instances of service 110A, host 210B may run one or more instances of service 110B, and host 210N may run one or more instances of service 110N. In one embodiment, multiple services and/or instances of the same service may be implemented using the same host. It is contemplated that the service-oriented system 250 and/or optimization system 150 may include additional components not shown, fewer components than shown, or different combinations, configurations, or quantities of the components shown.

As discussed with respect to FIG. 2A, a service relocation controller 220 may implement a provisioning and configuration functionality (potentially in conjunction with other components) to cause one or more hosts to be added to the service-oriented system 250, cause one or more hosts to be removed from the service-oriented system 250, cause one or more services to be removed from one or more hosts, and/or cause one or more services to be added to one or more hosts. The number of hosts and/or configuration of the hosts may be modified in accordance with the optimized configuration 185. In one embodiment, the number and/or configuration of the hosts may be modified dynamically, e.g., while the service-oriented system 250 remains operational to serve requests.

Based on the trace data, the optimization system 150 may generate an optimized configuration 185 in which the number of instances of one or more services is modified. Accordingly, the optimized configuration 185 may indicate that new instances of a particular service should be added or activated and/or that instances of a particular service should be deleted or deactivated. For example, the optimized configuration 185 may indicate that a new instance of service 110A should be added to host 210C to run in parallel with an original instance of service 110A on host 210A. As another example, the optimized configuration 185 may indicate that an instance of service 110B should be deleted from host 210B while leaving another instance of the service 110B operational. As yet another example, the optimized configuration 185 may indicate that a new instance of service 110N should be added to host 210N to run in parallel with an original instance of service 110N on host 210N. In accordance with the optimized configuration 185, the service-oriented system 250 may be modified to implement the addition(s) and deletion(s) of service instances.

In one embodiment, the optimization system 150 may generate a service relocation plan 186 based on the optimized configuration 185 and send the plan to the service relocation controller 220. The service relocation plan 186 may include an indication of the service and the host for each instance of a service to be added or deleted in the optimized configuration 185. Using the service relocation plan 186, the service relocation controller 220 may implement the addition and/or deletion of service instances. For example, the service relocation controller 220 may add the new instance of the service 110A to the host 210C. As another example, the service relocation controller 220 may delete an instance of the service 110B from the host 210B. As yet another example, the service relocation controller 220 may add the new instance of the service 110N to the host 210N. The service relocation controller 220 may also perform any steps needed to inform other services of the location of the new instances of the services. In this manner, the service-oriented system 250 may be reconfigured to provide improved performance (e.g., improved transit times, throughput, or reliability) or to be implemented at an improved cost.

FIG. 3A illustrates aspects of an example system environment for service-oriented system optimization using trace data, including service relocation to a common host, according to some embodiments. A service-oriented system 300 may implement a service-oriented architecture and may include a plurality of hosts, any of which may be implemented by the example computing device 3000 illustrated in FIG. 28. The hosts may be coupled using one or more networks 230. Although three hosts 210A, 210B, and 210N are illustrated for purposes of example, it is contemplated that any suitable number of hosts may be used with the service-oriented system 300. The hosts 210A-210N may be located in any suitable number of data centers and/or geographical locations. In one embodiment, individual hosts may be added to or subtracted from the service-oriented system 300, e.g., based on the computing resources required to run a particular set of services with a desired level of performance. Each host may run one or more services. For example, as shown in FIG. 3A, host 210A may run an instance of service 110A, host 210B may run an instance of service 110B, and host 210N may run an instance of service 110N. In one embodiment, multiple services and/or instances of the same service may be implemented using the same host. It is contemplated that the service-oriented system 300 and/or optimization system 150 may include additional components not shown, fewer components than shown, or different combinations, configurations, or quantities of the components shown.

As discussed with respect to FIG. 2A, a service relocation controller 220 may implement a provisioning and configuration functionality (potentially in conjunction with other components) to cause one or more hosts to be added to the service-oriented system 300, cause one or more hosts to be removed from the service-oriented system 300, cause one or more services to be removed from one or more hosts, and/or cause one or more services to be added to one or more hosts. The number of hosts and/or configuration of the hosts may be modified in accordance with the optimized configuration 185. In one embodiment, the number and/or configuration of the hosts may be modified dynamically, e.g., while the service-oriented system 300 remains operational to serve requests.

Based on the trace data, the optimization system 150 may generate an optimized configuration 185 in which the original instance of the service 110B does not run on host 210B. The optimized configuration 185 may instead indicate that another instance of the service 110B should run on a different host 210A. The hosts 210A and 210B may be located in any suitable locations relative to each other. For example, the hosts may be implemented as two different virtual compute instances on a set of shared computing hardware, the hosts may be implemented using different computing devices located near each other in the same data center, or the hosts may be implemented using different computing devices in two different data centers. In accordance with the optimized configuration 185, the service-oriented system 300 may be modified to relocate or migrate the service 110B from the original host 210B to the new host 210A.

In one embodiment, the optimization system 150 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. Using the service relocation plan 186, the service relocation controller 220 may implement the relocation or migration of one or more services, such as service 110B. Accordingly, the service relocation controller 220 may add the new instance of the service 110B to the host 210A. Additionally, if so indicated in the service relocation plan 186, the service relocation controller 220 may remove the original instance of the service 110B from the host 210B. In some scenarios, however, the original instance of the service 110B on host 210B may be left in place to run in parallel with the new instance of the service 110B on host 210A. In one embodiment, the host 210B may be removed from the service-oriented system 300 and returned to the pool of available hosts if it no longer provides any services after removal of the original instance of the service 110B. The service relocation controller 220 may also perform any steps needed to inform other services of the location of the new instance of the service 110B. In this manner, the service-oriented system 300 may be reconfigured to provide improved performance (e.g., improved transit times, throughput, or reliability) or to be implemented at an improved cost.

In one embodiment, the service 110A and the service 110B may be services that frequently communicate with one another, e.g., with one of the services as a requesting service and the other service as the requested service. By locating both of the services 110A and 110B on the same host 210A, the performance of any service calls between the two services may be improved. The services 110A and 110B may run in different process spaces and may communicate with one another on the host 210A using a loopback functionality, shared memory, or other virtual network interface. In this manner, the use of network resources may be minimized for service calls between the instances of services 110A and 110B on the host 210A, and the speed of such calls may be improved. Additionally, the costs of preparing a message for network transport and processing such a received message may be removed or reduced.

FIG. 3B illustrates aspects of an example system environment for service-oriented system optimization using trace data, including service relocation to a virtual machine on a common host, according to some embodiments. A service-oriented system 350 may implement a service-oriented architecture and may include a plurality of hosts, any of which may be implemented by the example computing device 3000 illustrated in FIG. 28. The hosts may be coupled using one or more networks 230. Although three hosts 210A, 210B, and 210N are illustrated for purposes of example, it is contemplated that any suitable number of hosts may be used with the service-oriented system 350. The hosts 210A-210N may be located in any suitable number of data centers and/or geographical locations. In one embodiment, individual hosts may be added to or subtracted from the service-oriented system 350, e.g., based on the computing resources required to run a particular set of services with a desired level of performance. Each host may run one or more services. For example, as shown in FIG. 3B, host 210A may run an instance of service 110A, host 210B may run an instance of service 110B, and host 210N may run an instance of service 110N. In one embodiment, multiple services and/or instances of the same service may be implemented using the same host. It is contemplated that the service-oriented system 350 and/or optimization system 150 may include additional components not shown, fewer components than shown, or different combinations, configurations, or quantities of the components shown.

As discussed with respect to FIG. 2A, a service relocation controller 220 may implement a provisioning and configuration functionality (potentially in conjunction with other components) to cause one or more hosts to be added to the service-oriented system 350, cause one or more hosts to be removed from the service-oriented system 350, cause one or more services to be removed from one or more hosts, and/or cause one or more services to be added to one or more hosts. The number of hosts and/or configuration of the hosts may be modified in accordance with the optimized configuration 185. In one embodiment, the number and/or configuration of the hosts may be modified dynamically, e.g., while the service-oriented system 350 remains operational to serve requests.

Based on the trace data, the optimization system 150 may generate an optimized configuration 185 in which the original instance of the service 110B does not run on host 210B. The optimized configuration 185 may instead indicate that another instance of the service 110B should run on a different host 210A. The hosts 210A and 210B may be located in any suitable locations relative to each other. For example, the hosts may be implemented as two different virtual compute instances on a set of shared computing hardware, the hosts may be implemented using different computing devices located near each other in the same data center, or the hosts may be implemented using different computing devices in two different data centers. In accordance with the optimized configuration 185, the service-oriented system 350 may be modified to relocate or migrate the service 110B from the original host 210B to the new host 210A. Additionally, the new instance of the service 110B may be installed on the same virtual machine 215A as the service 110A on the host 210A. In various embodiments, the use of the same virtual machine 215A to run instances of both services 110A and 110B may or may not be indicated in the optimized configuration 185.

In one embodiment, the optimization system 150 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. In one embodiment, the service relocation plan 186 may also include an indication that the relocated service should be installed on a particular virtual machine on the new host. Using the service relocation plan 186, the service relocation controller 220 may implement the relocation or migration of one or more services, such as service 110B. Accordingly, the service relocation controller 220 may add the new instance of the service 110B to the host 210A. Additionally, if so indicated in the service relocation plan 186, the service relocation controller 220 may remove the original instance of the service 110B from the host 210B. In some scenarios, however, the original instance of the service 110B on host 210B may be left in place to run in parallel with the new instance of the service 110B on host 210A. In one embodiment, the host 210B may be removed from the service-oriented system 350 and returned to the pool of available hosts if it no longer provides any services after removal of the original instance of the service 110B. The service relocation controller 220 may also perform any steps needed to inform other services of the location of the new instance of the service 110B. In this manner, the service-oriented system 350 may be reconfigured to provide improved performance (e.g., improved transit times, throughput, or reliability) or to be implemented at an improved cost.

In one embodiment, the service 110A and the service 110B may be services that frequently communicate with one another, e.g., with one of the services as a requesting service and the other service as the requested service. By locating both of the services 110A and 110B on the same virtual machine 215A on the same host 210A, the performance of any service calls between the two services may be improved. The services 110A and 110B may communicate with one another on the host 210A using any suitable form of inter-process communication, e.g., the use of shared memory with a message-passing model to pass requests and/or data (or references thereto) back and forth. In this manner, the use of network resources may be minimized for service calls between the instances of services 110A and 110B on the host 210A, and the speed of such calls may be improved. Additionally, the costs of preparing a message for network transport and processing such a received message (e.g., the costs of compression, decompression, encryption, decryption, serialization, and/or deserialization) may be removed or reduced.

Figure 4:
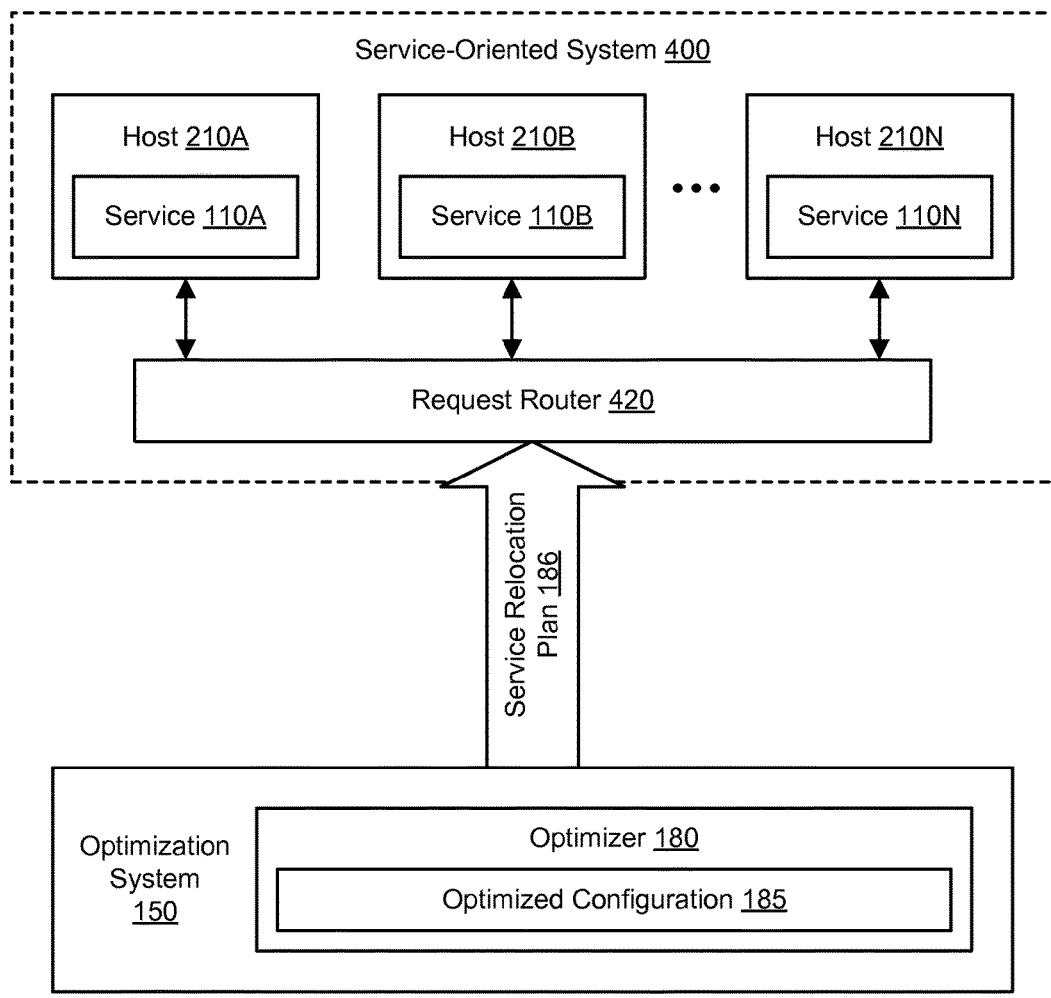
FIG. 4 illustrates aspects of an example system environment for service-oriented system optimization using trace data, including request routing, according to some embodiments.

FIG. 4 illustrates aspects of an example system environment for service-oriented system optimization using trace data, including request routing, according to some embodiments. In one embodiment, a component 420 may be configured for routing requests to target services within a service-oriented system 400. For example, service requests may be received at a load balancer, and the load balancer may be configured for request routing. The request router 420 may be implemented by the example computing device 3000 illustrated in FIG. 28 and may be implemented as a physical compute instance or virtual compute instance. In one embodiment, service requests may be received from services (e.g., services 110A, 110B, and 110N) within the service-oriented system 400.

The service-oriented system 400 may include a plurality of hosts, e.g., as hosts 210A, 210B, and 210N. Each host may run one or more services, e.g., as services 110A, 110B, and 110N. Although three hosts 210A-210N and three services 110A-110N are illustrated for purposes of example, it is contemplated that any suitable number of hosts and services may be used with the service-oriented system 400. The services 110A-110N may represent different services and/or different instances of the same service. In one embodiment, new service requests may also originate from the services 110A-110N.

In one embodiment, the optimization system 150 may generate a service relocation plan 186 based on the optimized configuration 185 and send the plan to the request router 420. The service relocation plan 186 may include an indication of the current host for each instance of a service whose host is modified in the optimized configuration 185. Using the service relocation plan 186, the request router 420 may properly map service requests to instances of services in the modified configuration of the service-oriented system 400. In one embodiment, service requests may be routed by the request router 420 to particular instances of services in a manner that provides optimized performance (e.g., network latency, throughput, or reliability) or optimized cost. For example, an incoming request may be routed to a particular instance of a service based on the proximity of the sender of the request to various instances of the target service. In other words, the particular instance may be selected as the recipient of the request based on the proximity of the sender of the request to various instances of the target service. As another example, an incoming request may be routed to a particular instance of a service based on the anticipated latency or cost of sending the request to various instances of the target service. In other words, the particular instance may be selected as the recipient of the request based on the anticipated latency or cost of sending the request to various instances of the target service.

In various embodiments, the routing of service requests in this manner may be performance instead of service relocation (as illustrated in FIGS. 2A, 2B, 3A, and 3B) or in addition to service relocation. In one embodiment, services may be migrated to appropriate locations within the service-oriented system 400 prior to implementing request routing. In one embodiment, new instances of services may be added in appropriate locations within the service-oriented system 400 prior to implementing request routing. In one embodiment, instances of services may be removed from appropriate locations within the service-oriented system 400 prior to implementing request routing.

Figure 5:
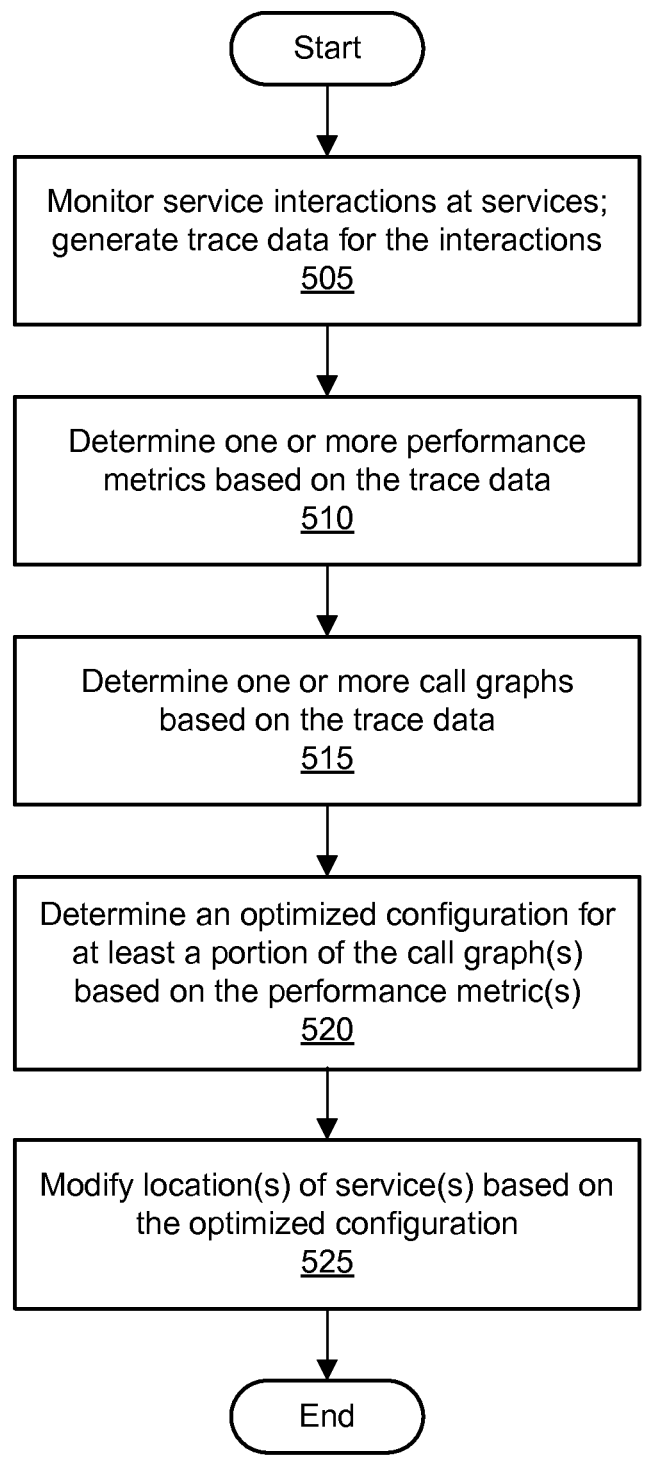
FIG. 5 is a flowchart illustrating a method for service-oriented system optimization using trace data, according to some embodiments.

FIG. 5 is a flowchart illustrating a method for service-oriented system optimization using trace data, according to some embodiments. As shown in 505, service interactions between services may be monitored, and trace data describing aspects of the interactions may be generated by the monitoring. The monitoring may be performed using instrumentation of individual services. In one embodiment, the trace data may be generated in real-time or near real-time, e.g., as service requests and service responses are received and/or processed by the services. The trace data may include data indicative of relationships between individual services, such as an identification of the calling (i.e., requesting) service and the called (i.e., requested) service for each interaction. The trace data may include one or more request identifiers that are usable to identify paths of service requests and responses from service to service. Request identifiers are discussed in greater detail below with respect to FIG. 21 through FIG. 26. The trace data may also include data describing the performance of the service interactions. For example, the trace data may include data indicative of network latency for a request or response, data indicative of network throughput for one or more interactions, data indicative of reliability or availability for one or more services, etc. The trace data generated for multiple services and multiple service interactions may be sent to an optimization system for aggregation and analysis.

As shown in 510, one or more performance metrics may be determined based on the trace data. In one embodiment, the optimization system may analyze the trace data to determine the one or more performance metrics. At least a portion of the performance metrics may be determined for individual interactions between services. For example, the optimization system may calculate the client-measured latency for an interaction based on the time at which a request was sent by a service and also on the time at which a response to the request was received by the service. The optimization system may also calculate the server-measured latency for an interaction based on the time at which a request was received by a service and also on the time at which a response to the request was sent by the service. The network transit time for the interaction may be calculated as the difference between the client-measured latency and the server-measured latency. The performance metrics may include data indicative of network latency, throughput, reliability, cost, etc. In one embodiment, the performance metrics may be determined based on other data sources (e.g., a cost database) in addition to the trace data.

As shown in 515, one or more call graphs may be determined based on the trace data. Using the trace data received from various services, the optimization system may build one or more call graphs that capture the interactions between the services. Each call graph may include a plurality of nodes representing services and one or more edges (also referred to as a call paths) representing service interactions. Call graphs are discussed in greater detail below with respect to FIG. 21 through FIG. 26.

As shown in 520, an optimized configuration may be determined for at least a portion of the one or more call graph(s). The optimized configuration for a set of services may represent an improvement on the existing configuration of the set of services with respect to one or more performance metrics (e.g., network latency or transit times, throughput, reliability, cost, etc.). Accordingly, the optimized configuration may be determined based on the one or more performance metrics determined in 510 in order to optimize one or more call paths of the one or more call graphs. In one embodiment, the optimized configuration may be determined such that it improves a total performance metric for one or more call paths. For example, the optimized configuration may minimize or decrease the network latency for one or more call paths, maximize or increase the throughput for one or more call paths, maximize or increase the service reliability or availability for one or more call paths, or minimize or decrease the cost for one or more call paths.

As shown in 525, the location(s) of one or more services may be modified based on the optimized configuration. In one embodiment, one or more services may be moved to a different host. In one embodiment, a service may be moved to the same host as another service with which it shares a call path. In one embodiment, a service may be moved to the same virtual machine on the same host as another service with which it shares a call path. In one embodiment, the number of instances of a service may be increased or decreased. In this manner, the performance of the service-oriented system may be improved using trace data.

Partial Service Relocation

Figure 6A:
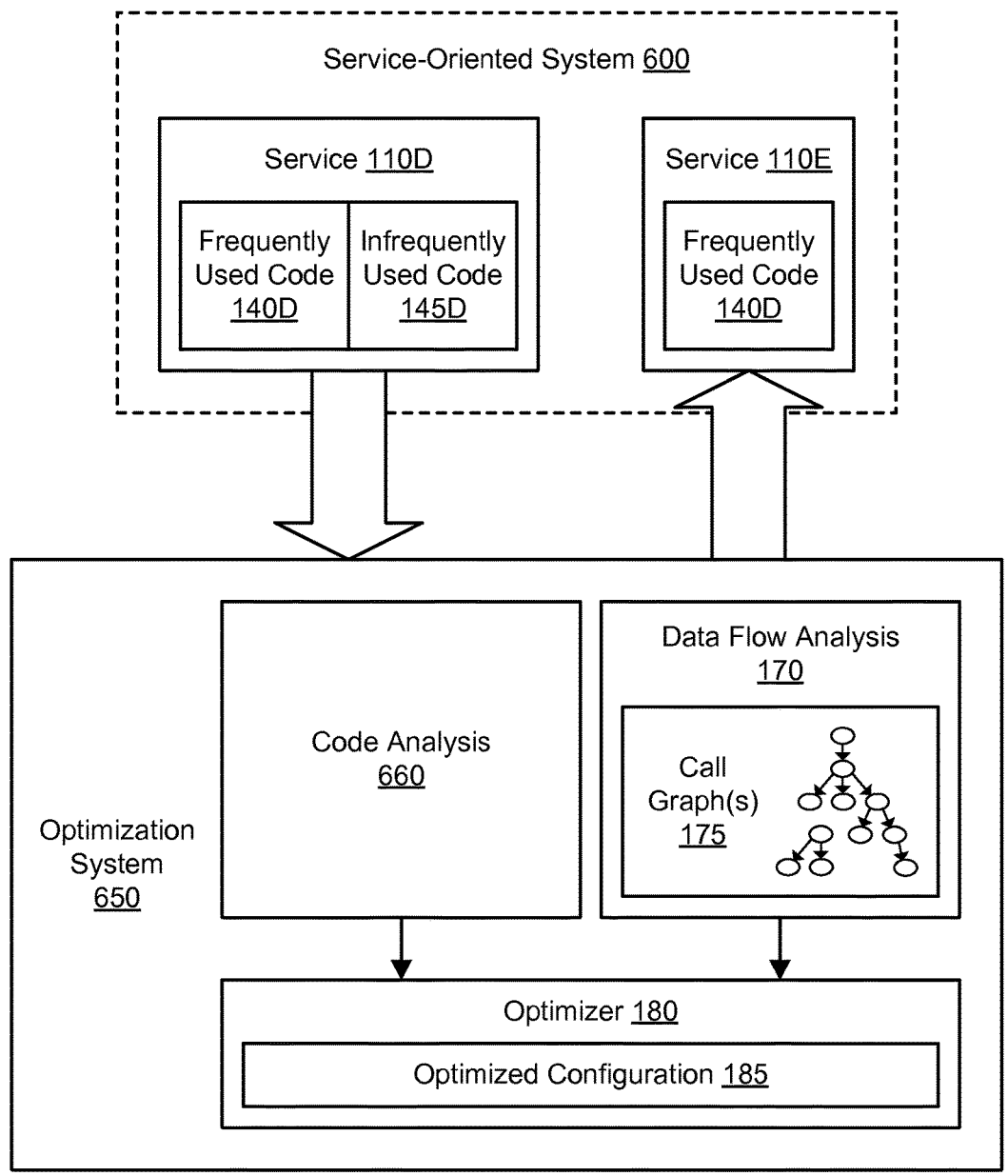
FIG. 6A illustrates an example system environment for service-oriented system optimization using partial service relocation, according to some embodiments.

FIG. 6A illustrates an example system environment for service-oriented system optimization using partial service relocation, according to some embodiments. The example system environment may include a service-oriented system 600 and an optimization system 650. As discussed above with respect to FIG. 1, the service-oriented system 600 may implement a service-oriented architecture and may include multiple services configured to communicate with each other (e.g., through message passing) to carry out various tasks, such as business functions. Although two services 110D and 110E are illustrated for purposes of example, it is contemplated that any suitable number of services may be used with the service-oriented system 600. The services 110D-110E may be implemented using a plurality of hosts, any of which may be implemented by the example computing device 3000 illustrated in FIG. 28. The hosts may be located in any suitable number of data centers or geographical locations. In one embodiment, multiple services and/or instances of the same service may be implemented using the same host. It is contemplated that the service-oriented system 600 and/or optimization system 650 may include additional components not shown, fewer components than shown, or different combinations, configurations, or quantities of the components shown.

Each service 110D-110E may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 600 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 110D-110E described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

As discussed with reference to FIG. 1, each of the services 110D-110E may be configured with one or more components for monitoring interactions between services. The interaction monitoring functionality for each service may monitor or track interactions between the corresponding service and other services (or components of services) in the service-oriented system 600. The monitored interactions may include service requests (i.e., requests for services to be performed), responses to requests, and other suitable events. In one embodiment, the interaction monitoring functionality may monitor service interactions such as service requests and service responses in any suitable environment, such as a production environment and/or a test environment. To monitor the service requests and responses, lightweight instrumentation may be added to services. The instrumentation (e.g., a reporting agent associated with each service) may collect and report data associated with each inbound request, outbound request, or other service interaction (e.g., a timer-based interaction) processed by a service. As discussed above with respect to FIG. 1, a service may collect trace data and send the trace data to the optimization system 650. The trace data may describe aspects of the service interactions. Further aspects of the interaction monitoring functionality are discussed below with respect to FIG. 21 through FIG. 26.

In one embodiment, the optimization system 650 may include a plurality of components configured for optimization of the service-oriented system 600. For example, the optimization system 650 may include a code analysis functionality 660, a data flow analysis functionality 170, and an optimizer functionality 180. In one embodiment, the optimization system 650 may also include a performance analysis functionality 160 as shown in FIG. 1. The optimization system 650 may include one or more computing devices, any of which may be implemented by the example computing device 3000 illustrated in FIG. 28. In various embodiments, the functionality of the different services, components, and/or modules of the optimization system 650 may be provided by the same computing device or by different computing devices. If any of the various components are implemented using different computing devices, then the respective computing devices may be communicatively coupled, e.g., via a network. Each one of the code analysis functionality 660, the data flow analysis functionality 170, and the optimizer functionality 180 may represent any combination of software and hardware usable to perform their respective functions, as discussed as follows.

Using the code analysis functionality 660, the optimization system 150 may analyze the program code of one or more of the services in the service-oriented system 600. For example, the code analysis functionality 660 may be used to analyze the program code of service 110D. In one embodiment, the code analysis functionality 660 may analyze the program code of a service to determine which portions of the program code are suitable for inclusion in a newly generated service that is smaller in size (e.g., in length of code or number of instructions). In one embodiment, the code analysis functionality 660 may determine which portions of the program code are frequently used code 140D and which portions of the code are infrequently used code 145D. Any suitable technique(s) may be used to determine the frequently used code 140D and the infrequently used code 145D. As used herein, the terms "frequent" or "frequently used" and "infrequent" or "infrequently used" may be determined relative to any suitable threshold. For example, the service may be executed for many service interactions involving different input parameters, either in a production environment or in a test environment. The interactions may be monitored, and trace data may be generated describing aspects of the interactions. Using the trace data, the frequency at which a particular portion of the program code is executed may be determined as a percentage of all interactions involving the service, and the portions of the program code above a particular frequency threshold may be assigned to the frequently used code 140D. Conversely, portions of the program code below a particular frequency threshold may be assigned to the infrequently used code 145D. Accordingly, the frequently used code 140D and infrequently used code 145D may be determined based on a set of trace data, e.g., for a particular context associated with a set of services and service interactions. In one embodiment, the infrequently used code 145D may never be used in a particular context defined by trace data. In one embodiment, the frequently used code 140D and the infrequently used code 145D may collectively represent all or nearly all of the original program code of the service 110D.

Based on the code analysis functionality 660, the optimization system 650 may generate one or more new services that are based on the program code of the service 110D but smaller in size (e.g., in length of code or number of instructions). For example, the optimization system 650 may generate a new service 110E that includes the frequently used code 140D and excludes the infrequently used code 145D. The service 110E may also be referred to as a partial service. The partial service 110E may be deployed in any suitable location and in any suitable number of instances in the service-oriented system 600. As will be discussed below, the optimizer 180 may generate an optimized configuration 185 that indicates the number of instances and locations for deploying the partial service 110E. The partial service 110E may require fewer resources (e.g., computational resources, memory resources, network resources, etc.) to execute than the original service 110D. Accordingly, deployment of the partial service 110E to supplement or replace the original service 110D may improve the performance of the service-oriented system 600.

In one embodiment, the partial service 110E may be optimized for execution within a particular context, e.g., within a particular subset of a call graph as determined based on trace data. For example, the partial service 110E may be optimized for interaction with one or more requesting services (i.e., services that call the partial service 110E). Trace data and/or program code instrumentation may be used to determine which parameters are passed to a service and which portions of code are executed as a result. In some contexts, clients may invoke only a subset of the functionality of the original service 110D, e.g., by passing only a limited set of parameters (potentially as few as one of the parameters) to the original service 110D. Only the portion of the program code that handles those one or more parameters may be executed on a regular basis in a context where the original service 110D is called by a particular set of clients. For example, if the service-oriented system 600 implements an online marketplace, only one particular currency or one particular shipping option may be used for transactions in a particular geographical context. In one embodiment, the frequently used code 140D may be repackaged for deployment in that context, e.g., to be invoked by a particular set of clients that pass only a limited set of parameters to the service. In one embodiment, if the partial service 110E is generated for use with only one input parameter, the requirement to pass that parameter may be eliminated when the partial service 110E is generated.

In some embodiments, the code analysis and partial service generation may vary based on the language(s) in which the original service 110D is written. In one embodiment, the code analysis functionality 660 may include a code coverage analyzer for the original service 110D, particularly where the program code is expressed in a compiled language. In one embodiment, the program code of the original service 110D may be written in an interpreted language rather than in a compiled language. Instead of being compiled before deployment, code written in such a language may be deployed as written and then interpreted (e.g., using on the fly compilation) on the hosts where it is run. The interpreted program code may be easier to divide and relocate because it has not been compiled to harden its library dependencies. The code analysis functionality 660 may analyze the program code to prove that some of the code is not executed for particular input parameters or in a particular context (e.g., in a subset of a call graph). For example, the service 110D may be partially evaluated for particular input parameters. In one embodiment, trace data may be used to determine the input parameters that are used for the partial evaluation. The portions of code that are not executed in such circumstances may be assigned to the infrequently used code 145D and excluded from the repackaged service 110E.

In one embodiment, the program code of the original service 110D that is analyzed and repackaged may be written in a declarative, interpreted language. For example, the program code may be written using a language that decoupled business logic from underlying execution environments. The program code may be written using a framework for precomputing results, e.g., by defining a query that produces the results to be precomputed, specifying where the query results should be stored, specifying which inputs should be monitored and which should be ignored, and launching a model in a hosted environment that scales up or down depending on the required capacity. A model may include a view as a building block of a query. Views may point to underlying input data, or they may be layered to join or transform other views to produce some result. Views may be blueprints for how a computation should be done and for computing the effects of a change. A model may include a replica that designates storage for a view. Additionally, a model may include a replicator that behaves like a trigger. The replicator may declare that changes from a particular input source should be propagated to a particular replica. The model may make a number of statements that can be verified, e.g., by determining whether a view yields the expected results or whether input changes propagate as expected. A unit-testing framework may enable verification of a model without making external service calls.

As discussed above with respect to FIG. 1, using the data flow analysis functionality 170, the optimization system 650 may analyze the trace data and generate one or more call graphs 175 based on connectivity information within the trace data. Each call graph may represent the flow of requests from service to service and may identify service dependencies. Each call graph may include a plurality of nodes representing services and one or more edges (also referred to as call paths) representing service interactions. Each of the call graphs 175 may include a hierarchical data structure that includes nodes representing the services and edges representing the interactions. In some cases, a call graph may be a deep and broad tree with multiple branches each representing a series of related service calls. The data flow analysis functionality 170 may use any suitable data and metadata to build each call graph, such as request identifiers and metadata associated with services and their interactions. The request identifiers and metadata are discussed below with respect to FIG. 21 through FIG. 26. In one embodiment, the data flow analysis functionality 170 may analyze the trace data and generate suitable reports and/or visualizations (e.g., call graph visualizations) based on the trace data.

The generation of a particular call graph may be initiated based on any suitable determination. In one embodiment, the call graph generation may be initiated after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the call graph may be finalized within seconds or minutes.

Using the optimizer functionality 180, the optimization system 150 may determine an optimized configuration 185 for at least a portion of the one or more call graph(s). As used herein, the term "optimized" generally means "improved" rather than "optimal." The optimized configuration 185 for a set of services may represent an improvement on the existing configuration of the set of services with respect to one or more performance metrics (e.g., network latency or transit times, throughput, reliability or availability, cost, etc.) for at least a portion of the one or more call graphs. Accordingly, the optimized configuration 185 may be determined based on the code analysis 660 and optionally based on one or more performance metrics in order to optimize one or more call paths of the one or more call graphs 175. In one embodiment, the optimized configuration 185 may also be determined based on additional information that is not derived from trace data, such as an expense associated with each service instance, service interaction, host, and/or unit of resource consumption. In one embodiment, the optimized configuration 185 may be determined such that it minimizes, maximizes, decreases, or increases a total performance metric for one or more call paths. For example, the optimized configuration 185 may minimize or reduce the network latency for one or more call paths, maximize or increase the throughput for one or more call paths, maximize or increase the reliability or availability for one or more call paths, or minimize or reduce the cost for one or more call paths. The optimizer 180 may take into account the sensitivity of a particular call path to latency, e.g., whether improving the latency of one event would improve the latency of another event in a call graph. Any suitable component(s) may be used to implement the optimizer 180. For example, the optimizer 180 may be implemented using a constrained optimization solver which is configured to minimize a cost function or an energy function in the presence of one or more constraints or to maximize a reward function or a utility function in the presence of one or more constraints. The optimizer 180 may generate an optimized configuration 185 by optimizing a user-defined function of network latency, throughput, reliability, cost, and/or any other suitable term(s).

In one embodiment, data and/or metadata associated with a request or response may be compressed, encrypted, or serialized by a service. Similarly, data and/or metadata associated with a request or response may be decompressed, decrypted, or deserialized upon receipt by a service. The cost or time associated with compression, decompression, encryption, decryption, serialization, and/or deserialization may be taken into account by the optimizer 180. Accordingly, performance metrics associated with the costs of preparing a message for network transport and processing such a received message (e.g., the costs of compression, decompression, encryption, decryption, serialization, and/or deserialization) may be collected as part of the trace data. Additionally, the optimizer 180 may take into account such performance data as CPU (central processing unit) utilization for program code, memory utilization for program code, and any other suitable data. In one embodiment, the optimization system 650 may collect performance data from sources other than the interaction monitoring components.

In one embodiment, the optimization system 650 may receive a continuous stream of trace data from the service-oriented system 600. The optimization system 650 may generate and/or modify the optimized configuration 185 repeatedly and at appropriate intervals. Similarly, the placement of services may be modified repeatedly and at appropriate intervals in accordance with new or modified versions of the optimized configuration 185. In one embodiment, the optimized configuration 185 for one or more partial services may be generated periodically, such as when a software deployment occurs or when a traffic analysis is performed. In one embodiment, the optimized configuration 185 for one or more partial services may be generated to optimize the use of any suitable computational resources, such as processor resources, memory resources, and/or network resources.

Figure 6B:
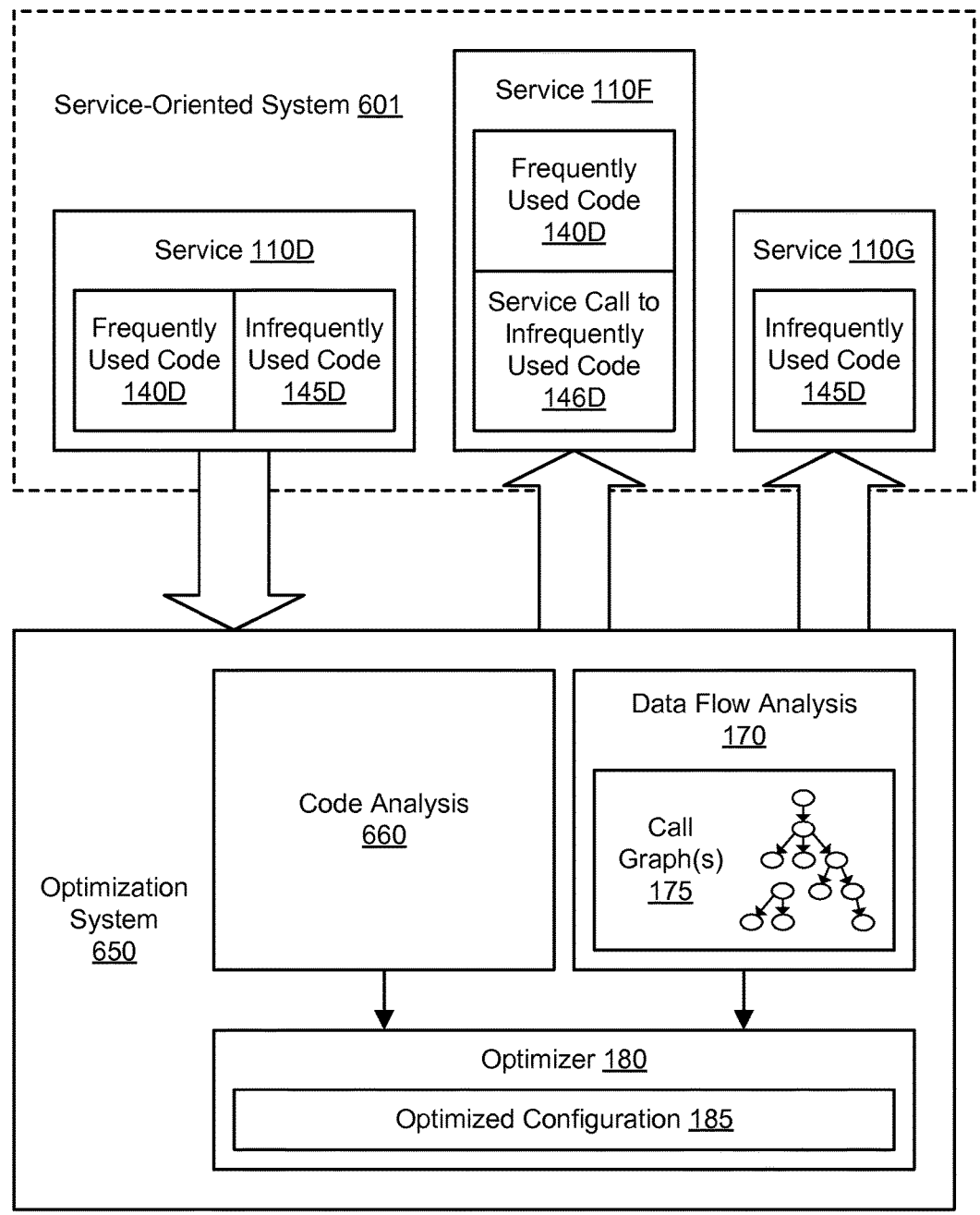
FIG. 6B illustrates further aspects of an example system environment for service-oriented system optimization using partial service relocation, according to some embodiments.

FIG. 6B illustrates further aspects of an example system environment for service-oriented system optimization using partial service relocation, according to some embodiments. A service-oriented system 601 may include an original service 110D. As discussed above with respect to FIG. 6A, using the code analysis functionality 660, the optimization system 650 may determine a portion of the service 110D that is frequently used code 140D and another portion that is infrequently used code 145D. The optimization system 650 may generate a plurality of new services, such as service 110F and 110G, based on the code analysis. The partial service 110F may include the frequently used code 140D. The partial service 110F may also include a service call 146D in place of the infrequently used code 145D. The service call 146D may invoke yet another service 110G that includes the infrequently used code 145D. Alternatively, the service call 146D may invoke the functionality of the infrequently used code 145D in an instance of the original service 110D. One or more instances of the partial service 110F and optionally one or more instances of the service 110G may then be deployed based on the optimized configuration 185. By giving the partial service 110F the ability to invoke the functionality of the infrequently used code 145D, the partial service 110F may improve the performance of the service-oriented system 601 while potentially being deployed in a wider range of contexts than the partial service 110E. For example, an optimized configuration of services for processing a very large list of items (e.g., in a large "shopping cart" for an online merchant) may differ from an optimized configuration of services for processing a smaller list of items. In particular, the partial service 110F may be configured to run on smaller hosts for processing smaller lists, and the partial service 110G may be configured to run on larger hosts for processing very large lists. The optimizer 180 may determine which of the partial services to deploy on which host class when it minimizes an energy function for the service-oriented system.

Figure 6C:
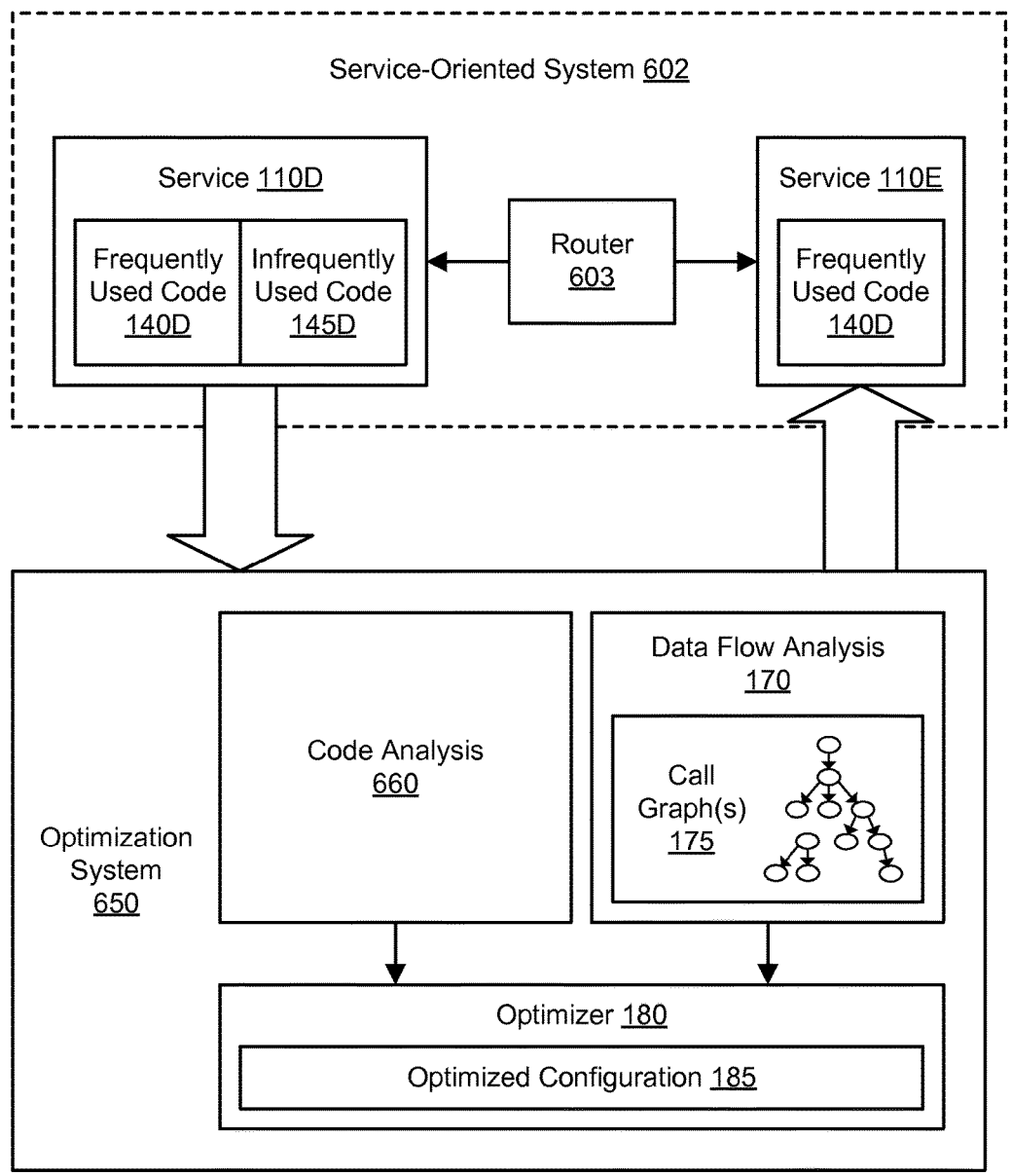
FIG. 6C illustrates further aspects of an example system environment for service-oriented system optimization using partial service relocation, including the use of a router, according to some embodiments.

FIG. 6C illustrates further aspects of an example system environment for service-oriented system optimization using partial service relocation, including the use of a router, according to some embodiments. A service-oriented system 602 may include an original service 110D. As discussed above with respect to FIG. 6A, using the code analysis functionality 660, the optimization system 650 may determine a portion of the service 110D that is frequently used code 140D and another portion that is infrequently used code 145D. The optimization system 650 may generate one or more new services, such as service 110E, based on the code analysis. As discussed above with respect to FIG. 6A, the partial service 110E may include the frequently used code 140D. The service-oriented system 602 may also include a router 603 that may route service calls intended for the original service 110D to an instance of the original service 110D or to an instance of the partial service 110E.

For example, the router 603 may analyze the incoming service request, such as by examining any input parameters associated with the service request. If the router 603 determines that the request may be processed using the frequently used code 140D, then the router may forward the request to the partial service 110E. On the other hand, if the router 603 determines that the request may not be processed using the frequently used code 140D (e.g., that the request may be processed using the infrequently used code 145D), then the router may forward the request to the original service 110D.

Figure 6D:
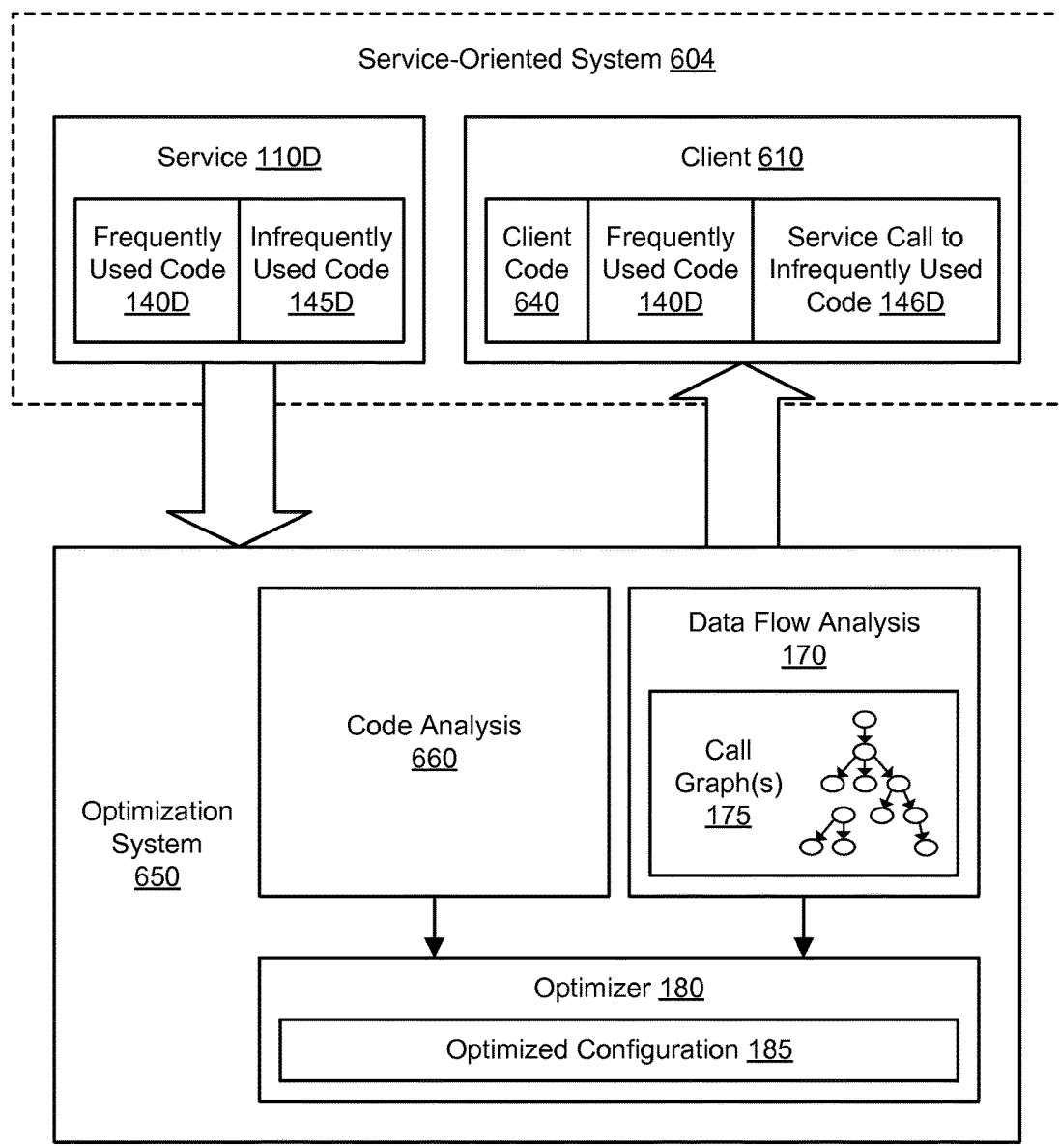
FIG. 6D illustrates further aspects of an example system environment for service-oriented system optimization using partial service relocation, including the inlining of frequently used code, according to some embodiments.

FIG. 6D illustrates further aspects of an example system environment for service-oriented system optimization using partial service relocation, including the inlining of frequently used code, according to some embodiments. A service-oriented system 604 may include an original service 110D. As discussed above with respect to FIG. 6A, using the code analysis functionality 660, the optimization system 650 may determine a portion of the service 110D that is frequently used code 140D and another portion that is infrequently used code 145D. Using trace data for the service-oriented system 604, the optimization system 650 may determine that a particular client of the original service 110D frequently invokes the functionality of the frequently used code 140D but not necessarily the infrequently used code 145D. The optimization system 650 may generate a new version of the client 610 that includes (e.g., inlines) the frequently used code 140D in place of the original service call to the original service 110D. In one embodiment, the new version of the client may also include a service call 146D to the infrequently used code. The service call 146D may invoke either a new service (e.g., new service 110G, as shown in FIG. 6B) that includes the infrequently used code 145D or an instance of the original service 110D that includes the infrequently used code 145D. One or more instances of the new client 610 and optionally one or more instances of the service that includes the infrequently used code 146D (e.g., service 110G) may then be deployed based on the optimized configuration 185. By giving the client 610 the ability to perform the code 140D that it most frequently invokes without a service call, while also giving the client the ability to invoke the functionality of the infrequently used code 145D, the optimization system 650 may improve the performance of the service-oriented system 604.

Figure 7:
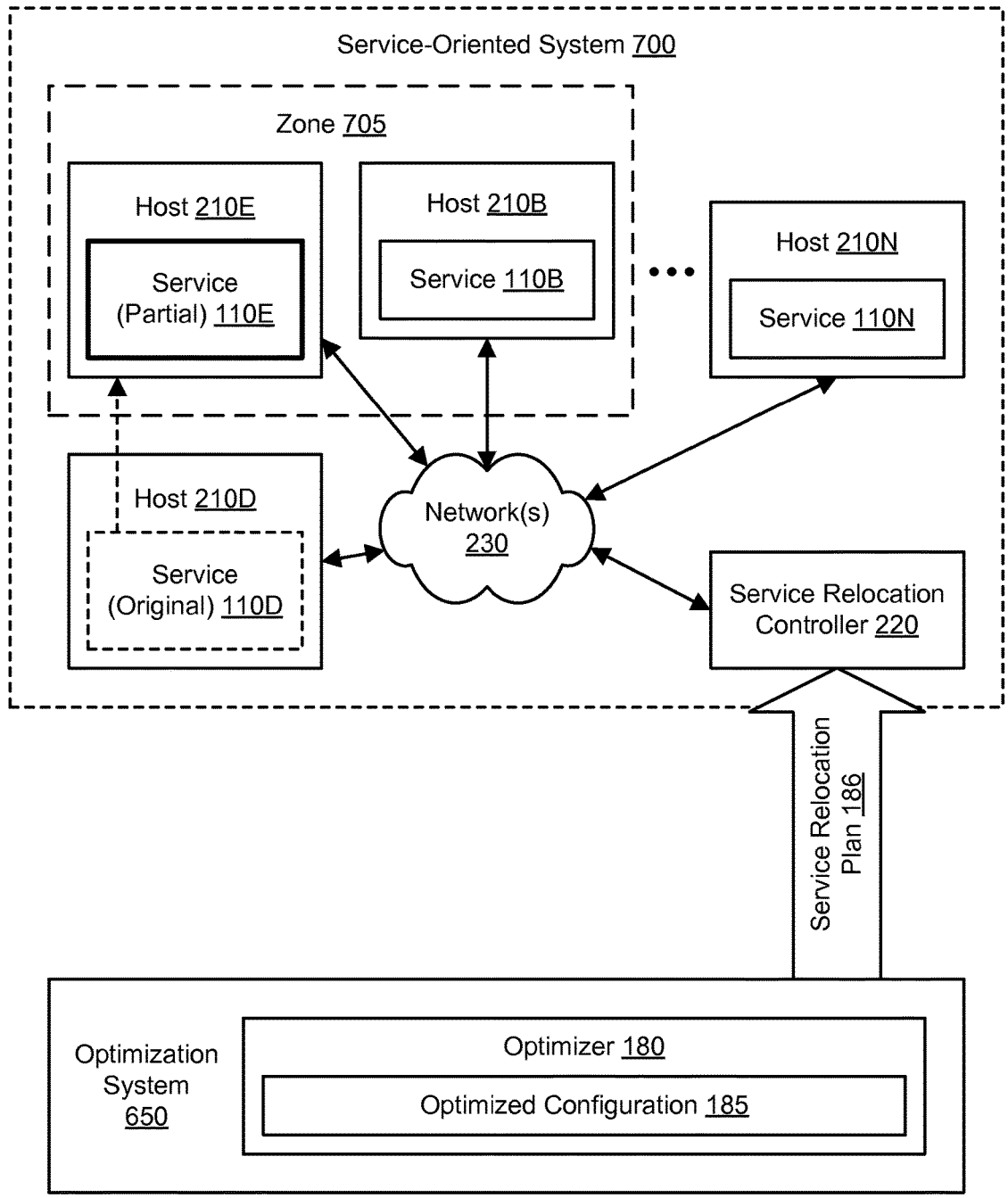
FIG. 7 illustrates aspects of an example system environment for service-oriented system optimization using partial service relocation, including partial service relocation from host to host, according to some embodiments.
Figure 8A:
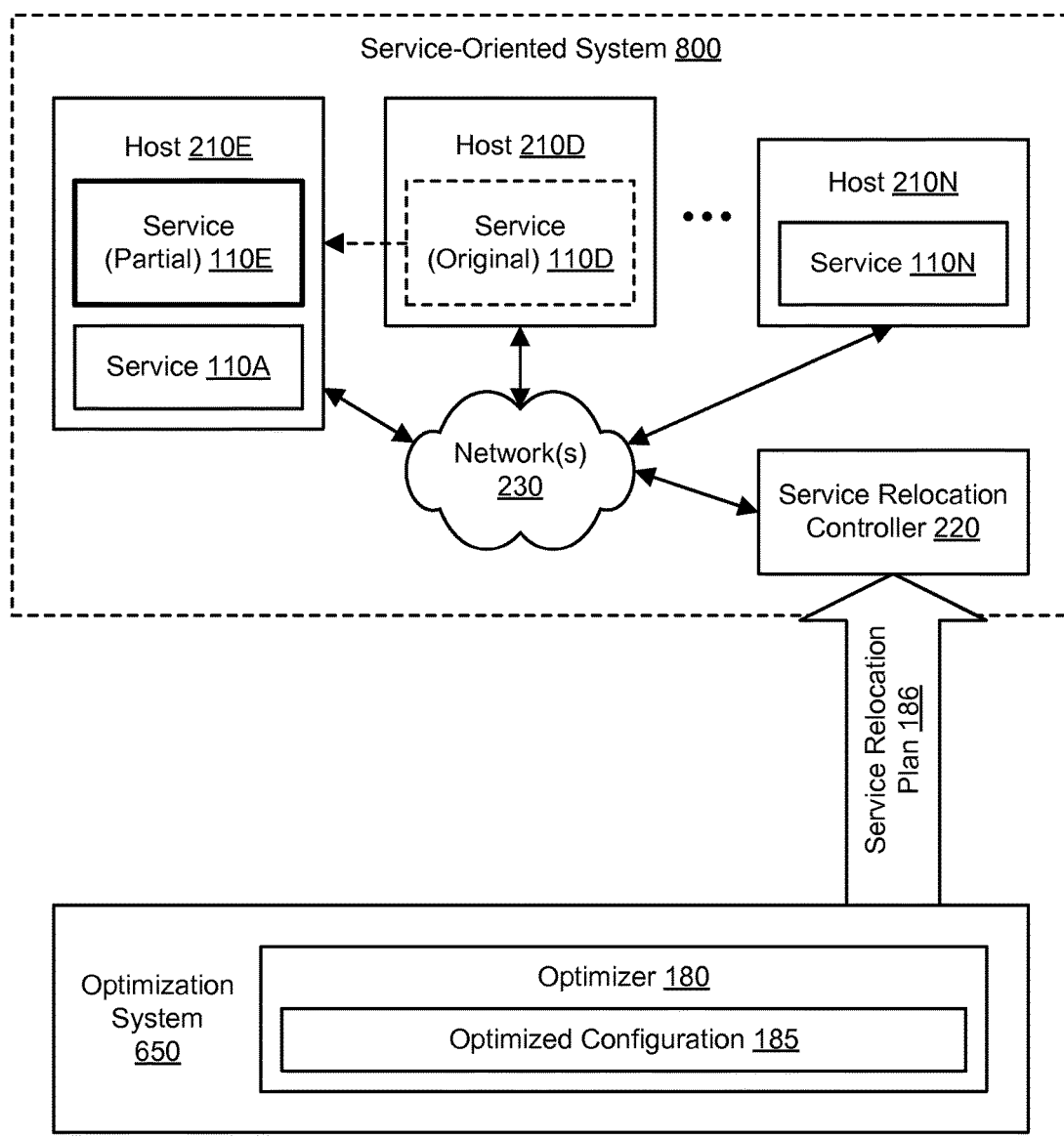
FIG. 8A illustrates aspects of an example system environment for service-oriented system optimization using partial service relocation, including partial service relocation to a common host, according to some embodiments.
Figure 8B:
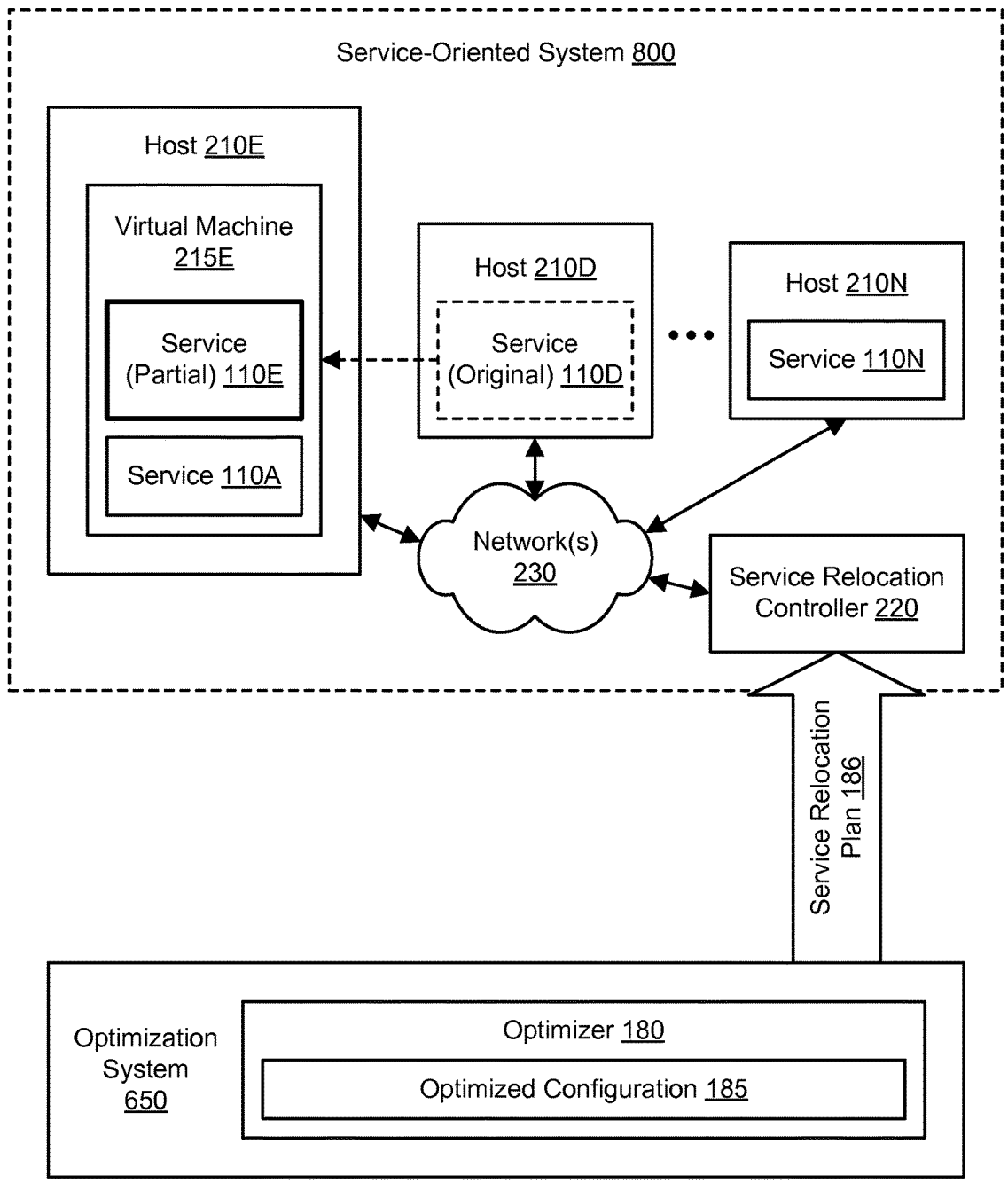
FIG. 8B illustrates aspects of an example system environment for service-oriented system optimization using partial service relocation, including partial service relocation to a virtual machine on a common host, according to some embodiments.
Figure 8C:
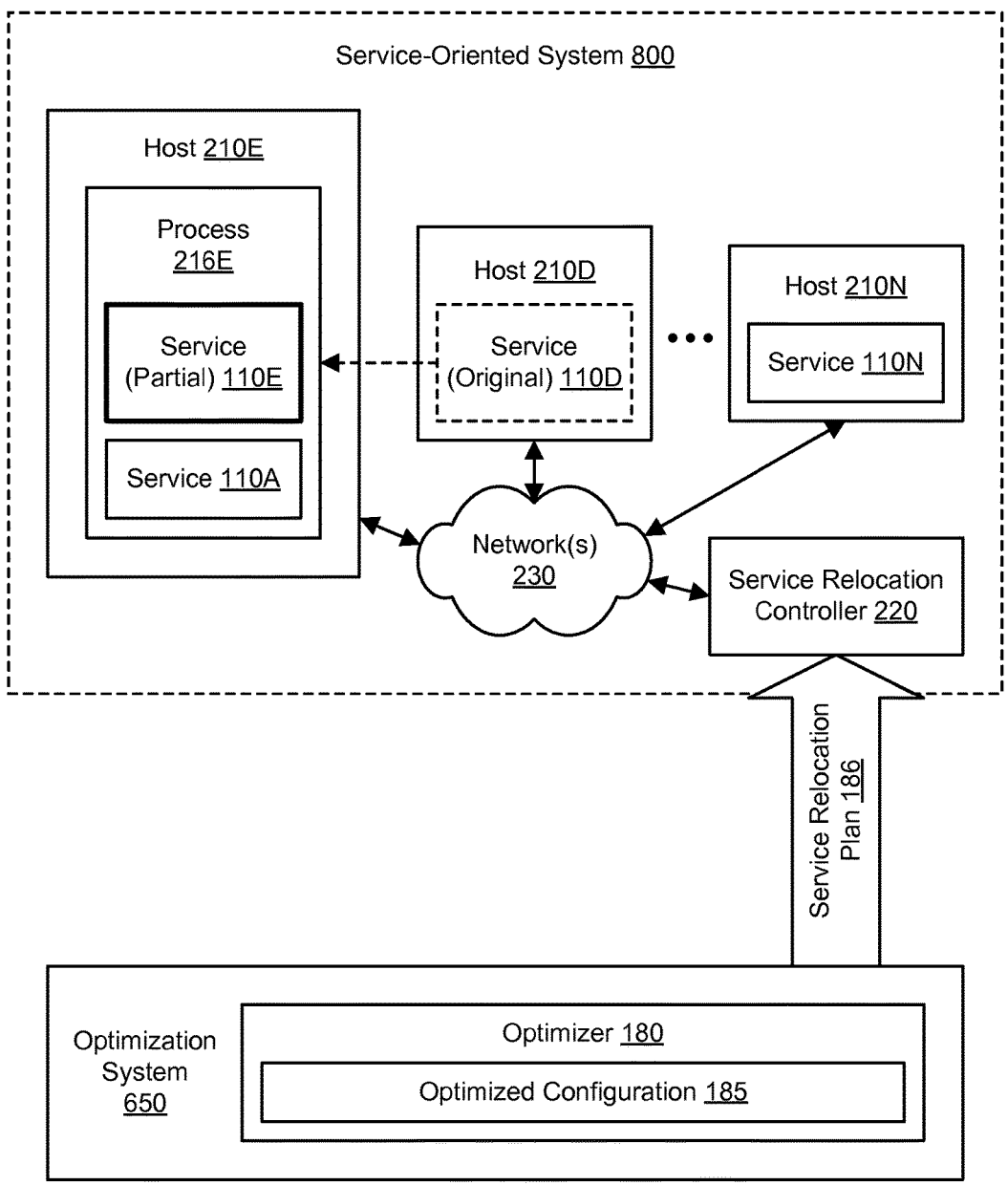
FIG. 8C illustrates aspects of an example system environment for service-oriented system optimization using partial service relocation, including partial service relocation to a common process on a common host, according to some embodiments.

As will be described in greater detail below, the location(s) of one or more partial services may be determined based on the optimized configuration 185. In one embodiment, as illustrated in FIG. 7, one or more partial services may be deployed to a different host than the original service. In one embodiment, as illustrated in FIG. 8A, a partial service may be moved to the same host as another service, e.g., a service with which it shares a call path. In one embodiment, as illustrated in FIG. 8B, a partial service may be moved to the same virtual machine on the same host as another service, e.g., with which it shares a call path. In one embodiment, as illustrated in FIG. 8C, a partial service may be moved to the same process on the same host as another service, e.g., with which it shares a call path. In this manner, the performance of the service-oriented system 600 and/or 601 may be improved through the deployment of one or more partial services.

FIG. 7 illustrates aspects of an example system environment for service-oriented system optimization using partial service relocation, including partial service relocation from host to host, according to some embodiments. A service-oriented system 700 may implement a service-oriented architecture and may include a plurality of hosts, any of which may be implemented by the example computing device 3000 illustrated in FIG. 28. The hosts may be coupled using one or more networks 230. Although four hosts 210B, 210D, 210E, and 210N are illustrated for purposes of example, it is contemplated that any suitable number of hosts may be used with the service-oriented system 200. The hosts 210B, 210D, 210E, and 210N may be located in any suitable number of data centers and/or geographical locations. For example, hosts 210B and 210E may be physically located within a zone 705, and hosts 210D and 210N may be physically located outside the zone 705 (i.e., in one or more different zones). The zone 705 may represent a geographical area, a data center, or a particular location (e.g., a rack) within a data center.

In one embodiment, individual hosts may be added to or subtracted from the service-oriented system 700, e.g., based on the computing resources required to run a particular set of services with a desired level of performance. Each host may run one or more services. For example, as shown in FIG. 7, host 210D may originally run an instance of service 110D, host 210B may run an instance of service 110B, and host 210N may run an instance of service 110N. In one embodiment, multiple services and/or instances of the same service may be implemented using the same host. It is contemplated that the service-oriented system 700 and/or optimization system 650 may include additional components not shown, fewer components than shown, or different combinations, configurations, or quantities of the components shown.

In some embodiments, the hosts 210B, 210D, 210E, and 210N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 28.

In one embodiment, a suitable component of the service-oriented system 700 may provision and/or configure the hosts 210B, 210D, 210E, and 210N. For example, the hosts 210B, 210D, 210E, and 210N may be provisioned from a pool of available compute instances by selecting available compute instances with suitable specifications and configuring the selected compute instances with suitable software. In one embodiment, additional compute instances may be added to the service-oriented system 700 as needed. In one embodiment, compute instances may be returned to the pool of available compute instances from service-oriented system 700, e.g., if the computing instances are not needed at a particular point in time. Additionally, the software installed on the hosts may be modified. A service relocation controller 220 may implement such a provisioning and configuration functionality (potentially in conjunction with other components) to cause one or more hosts to be added to the service-oriented system 700, cause one or more hosts to be removed from the service-oriented system 700, cause one or more services to be removed from one or more hosts, and/or cause one or more services to be added to one or more hosts. The service relocation controller 220 may be implemented by the example computing device 3000 illustrated in FIG. 28 and may be implemented as a physical compute instance or virtual compute instance.

The number of hosts and/or configuration of the hosts may be modified in accordance with the optimized configuration 185. In one embodiment, the number and/or configuration of the hosts may be modified dynamically, e.g., while the service-oriented system 700 remains operational to serve requests. As discussed above with respect to FIGS. 6A and 6B, the optimization system 650 may generate an optimized configuration 185 in which the original instance of the service 110D does not run on host 210D. The optimized configuration 185 may instead indicate that an instance of the partial service 110E based on the original service 110D should run on a different host 210E. In accordance with the optimized configuration 185, the service-oriented system 700 may be modified to remove the original service 110D from the original host 210D and deploy the partial service 110E to the host 210E. As discussed above, the hosts 210D and 210B may be located in different zones, while the hosts 210B and 210E may be located in the same zone 705. Due to the increased proximity of host 210E to host 210B, the relocation of the partial service 110E may yield performance and/or cost improvements.

In one embodiment, the optimization system 650 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. Using the service relocation plan 186, the service relocation controller 220 may implement the relocation or migration of one or more services, such as original service 110D and partial service 110E. Accordingly, the service relocation controller 220 may provision the host 210E (if necessary) and add the new instance of the partial service 110E to the host 210E. Additionally, if so indicated in the service relocation plan 186, the service relocation controller 220 may remove the original instance of the service 110D from the host 210D. In some scenarios, however, the original instance of the service 110D on host 210D may be left in place to run in parallel with the new instance of the partial service 110E on host 210E. In one embodiment, a service may include multiple components that may run independently, and only a portion of the service may be relocated based on the optimized configuration 185. In one embodiment, the host 210D may be removed from the service-oriented system 700 and returned to the pool of available hosts if it no longer provides any services after removal of the original instance of the service 110D. The service relocation controller 220 may also perform any steps needed to inform other services of the location of the new instance of the partial service 110E. In this manner, the service-oriented system 700 may be reconfigured to provide improved performance (e.g., improved transit times, throughput, or reliability) or to be implemented at an improved cost.

FIG. 8A illustrates aspects of an example system environment for service-oriented system optimization using partial service relocation, including partial service relocation to a common host, according to some embodiments. A service-oriented system 800 may implement a service-oriented architecture and may include a plurality of hosts, any of which may be implemented by the example computing device 3000 illustrated in FIG. 28. The hosts may be coupled using one or more networks 230. Although three hosts 210E, 210D, and 210N are illustrated for purposes of example, it is contemplated that any suitable number of hosts may be used with the service-oriented system 800. The hosts 210E, 210D, and 210N may be located in any suitable number of data centers and/or geographical locations. In one embodiment, individual hosts may be added to or subtracted from the service-oriented system 800, e.g., based on the computing resources required to run a particular set of services with a desired level of performance. Each host may run one or more services. For example, as shown in FIG. 8A, host 210E may run an instance of service 110A, host 210D may originally run an instance of service 110D, and host 210N may run an instance of service 110N. In one embodiment, multiple services and/or instances of the same service may be implemented using the same host. It is contemplated that the service-oriented system 800 and/or optimization system 650 may include additional components not shown, fewer components than shown, or different combinations, configurations, or quantities of the components shown.

As discussed with respect to FIG. 7, a service relocation controller 220 may implement a provisioning and configuration functionality (potentially in conjunction with other components) to cause one or more hosts to be added to the service-oriented system 800, cause one or more hosts to be removed from the service-oriented system 800, cause one or more services to be removed from one or more hosts, and/or cause one or more services to be added to one or more hosts. The number of hosts and/or configuration of the hosts may be modified in accordance with the optimized configuration 185. In one embodiment, the number and/or configuration of the hosts may be modified dynamically, e.g., while the service-oriented system 800 remains operational to serve requests.

The optimization system 650 may generate an optimized configuration 185 in which the instance of the original service 110D does not run on host 210D. The optimized configuration 185 may instead indicate that an instance of the partial service 110E should run on a different host 210E. The hosts 210D and 210E may be located in any suitable locations relative to each other. For example, the hosts may be implemented as two different virtual compute instances on a set of shared computing hardware, the hosts may be implemented using different computing devices located near each other in the same data center, or the hosts may be implemented using different computing devices in two different data centers. In accordance with the optimized configuration 185, the service-oriented system 800 may be modified to relocate or migrate the frequently used functionality of the original service 110D from the original host 210D to the new host 210E, e.g., by deploying the partial service 110E to host 210E.

In one embodiment, the optimization system 650 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. Using the service relocation plan 186, the service relocation controller 220 may implement the relocation or migration of one or more services, such as partial service 110E. Accordingly, the service relocation controller 220 may add the new instance of the service 110E to the host 210E. Additionally, if so indicated in the service relocation plan 186, the service relocation controller 220 may remove the original instance of the service 110D from the host 210D. In some scenarios, however, the original instance of the service 110D on host 210D may be left in place to run in parallel with the new instance of the service 110E on host 210E. In one embodiment, the host 210D may be removed from the service-oriented system 800 and returned to the pool of available hosts if it no longer provides any services after removal of the original instance of the service 110D. The service relocation controller 220 may also perform any steps needed to inform other services of the location of the new instance of the service 110D. In this manner, the service-oriented system 800 may be reconfigured to provide improved performance (e.g., improved transit times, throughput, or reliability) or to be implemented at an improved cost.

In one embodiment, the service 110A and the service 110E may be services that frequently communicate with one another, e.g., with one of the services as a requesting service and the other service as the requested service. By locating both of the services 110A and 110E on the same host 210E, the performance of any service calls between the two services may be improved. The services 110A and 110E may run in different process spaces and may communicate with one another on the host 210E using a loopback functionality, shared memory, or other virtual network interface. In this manner, the use of network resources may be minimized for service calls between the instances of services 110A and 110E on the host 210E, and the speed of such calls may be improved. Additionally, the costs of preparing a message for network transport and processing such a received message may be removed or reduced.

FIG. 8B illustrates aspects of an example system environment for service-oriented system optimization using partial service relocation, including partial service relocation to a virtual machine on a common host, according to some embodiments. As discussed above with respect to FIG. 8A, a service-oriented system 800 may implement a service-oriented architecture and may include a plurality of hosts, such as hosts 210E, 210D, and 210N. Each host may run one or more services. For example, as shown in FIG. 8B, host 210E may run an instance of service 110A, host 210D may originally run an instance of service 110D, and host 210N may run an instance of service 110N. The optimization system 650 may generate an optimized configuration 185 in which the instance of the original service 110D does not run on host 210D. The optimized configuration 185 may instead indicate that an instance of the partial service 110E should run on a different host 210E. In accordance with the optimized configuration 185, the service-oriented system 800 may be modified to relocate or migrate the frequently used functionality of the original service 110D from the original host 210D to the new host 210E, e.g., by deploying the partial service 110E to host 210E. Additionally, the new instance of the service 110E may be installed on the same virtual machine 215E as the service 110A on the host 210A. In one embodiment, the service relocation plan 186 may include an indication that the relocated service should be installed on the virtual machine 215E on the new host 210E. In this manner, the service-oriented system 800 may be reconfigured to provide improved performance (e.g., improved transit times, throughput, or reliability) or to be implemented at an improved cost.

In one embodiment, the service 110A and the service 110E may be services that frequently communicate with one another, e.g., with one of the services as a requesting service and the other service as the requested service. By locating both of the services 110A and 110E on the same virtual machine 215E on the same host 210E, the performance of any service calls between the two services may be improved. The services 110A and 110E may communicate with one another on the host 210A using any suitable form of inter-process communication, e.g., the use of shared memory with a message-passing model to pass requests and/or data (or references thereto) back and forth. In this manner, the use of network resources may be minimized for service calls between the instances of services 110A and 110E on the host 210A, and the speed of such calls may be improved. Additionally, the costs of preparing a message for network transport and processing such a received message (e.g., the costs of compression, decompression, encryption, decryption, serialization, and/or deserialization) may be removed or reduced.

FIG. 8C illustrates aspects of an example system environment for service-oriented system optimization using partial service relocation, including partial service relocation to a common process on a common host, according to some embodiments. As discussed above with respect to FIG. 8A, a service-oriented system 800 may implement a service-oriented architecture and may include a plurality of hosts, such as hosts 210E, 210D, and 210N. Each host may run one or more services. For example, as shown in FIG. 8B, host 210E may run an instance of service 110A, host 210D may originally run an instance of service 110D, and host 210N may run an instance of service 110N. The optimization system 650 may generate an optimized configuration 185 in which the instance of the original service 110D does not run on host 210D. The optimized configuration 185 may instead indicate that an instance of the partial service 110E should run on a different host 210E. In accordance with the optimized configuration 185, the service-oriented system 800 may be modified to relocate or migrate the frequently used functionality of the original service 110D from the original host 210D to the new host 210E, e.g., by deploying the partial service 110E to host 210E. Additionally, the new instance of the service 110E may be installed such that it runs in the same process 216E as the service 110A on the host 210E. In one embodiment, the service relocation plan 186 may include an indication that the relocated service should be installed to run in the same process 216E on the new host 210E. In this manner, the service-oriented system 800 may be reconfigured to provide improved performance (e.g., improved transit times, throughput, or reliability) or to be implemented at an improved cost.

In one embodiment, the service 110A and the service 110E may be services that frequently communicate with one another, e.g., with one of the services as a requesting service and the other service as the requested service. By executing both of the services 110A and 110E in the same process 216E on the same host 210E, the performance of any interactions between the two services may be improved. The services 110A and 110E may communicate with one another on the host 210A using any suitable form of communication, e.g., the use of shared memory. In this manner, the use of network resources may be minimized for interactions between the instances of services 110A and 110E on the host 210A, and the speed of such interactions may be improved. Additionally, the costs of preparing a message for network transport and processing a received message (e.g., the costs of compression, decompression, encryption, decryption, serialization, and/or deserialization) may be removed or reduced.

Figure 9:
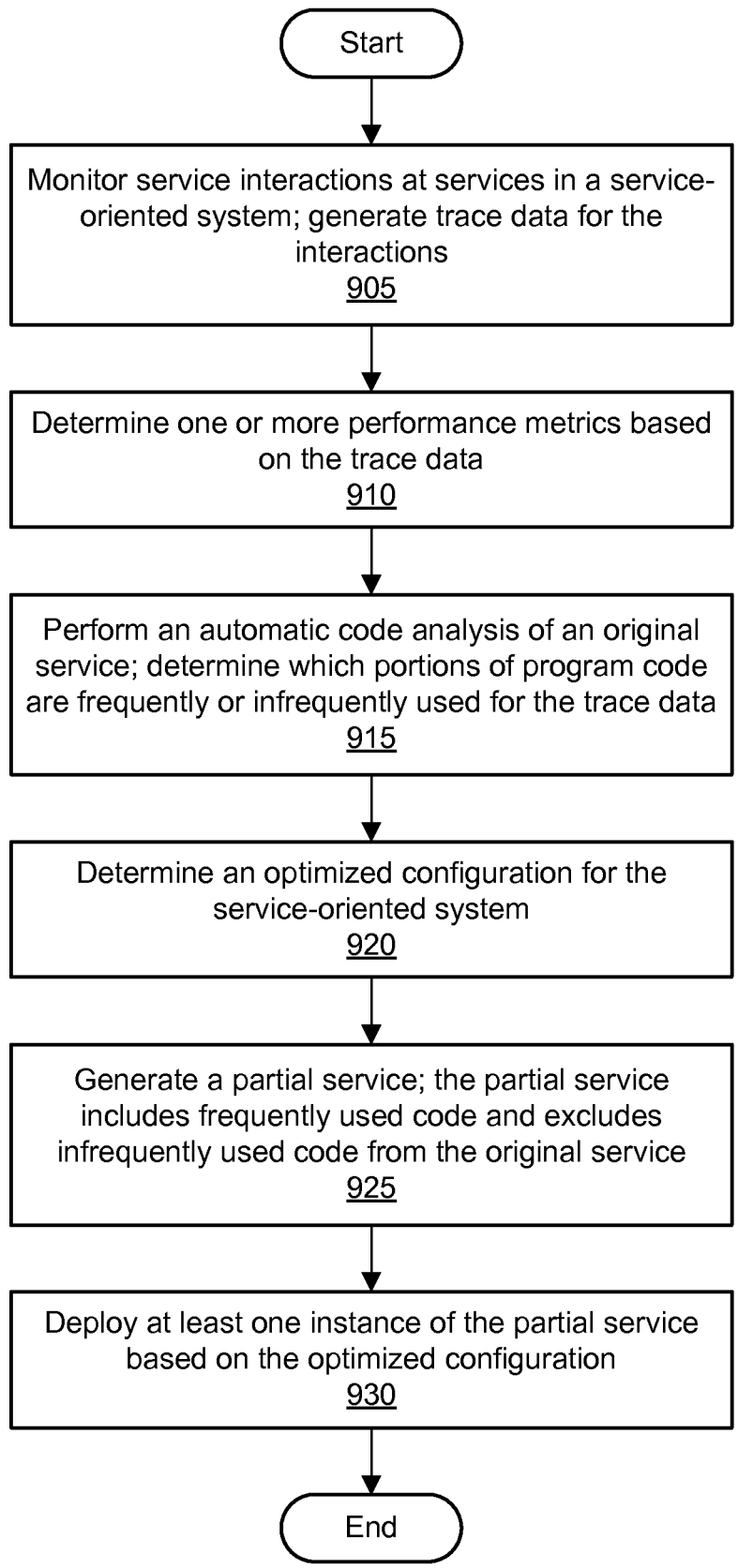
FIG. 9 is a flowchart illustrating a method for service-oriented system optimization using partial service relocation, according to some embodiments.

FIG. 9 is a flowchart illustrating a method for service-oriented system optimization using partial service relocation, according to some embodiments. As shown in 905, service interactions at services in a service-oriented system may be monitored, and trace data describing the interactions may be generated. As shown in 910, one or more performance metrics may be generated based on the trace data.

As shown in 915, a code analysis may be performed automatically to analyze the program code of an original service. The automated code analysis may be performed automatically (e.g., without being directly prompted by user input) and/or programmatically (e.g., according to program instructions). The automated code analysis may determine that one set of program code in the original service is frequently used within a particular context defined by the trace data. Similarly, the automated code analysis may determine that another set of program code in the original service is infrequently used within the particular context defined by the trace data. In one embodiment, the infrequently used code may never be used in the particular context. The frequency of use may be determined using the code analysis, e.g., by monitoring the program code during service interactions in a production environment or test environment.

As shown in 920, an optimized configuration may be determined for the service-oriented system. The optimized configuration may be determined based on the trace data and/or the performance metrics. As shown in 925, a partial service may be generated based on the code analysis of the original service. The partial service may include the frequently used code from the original service. The partial service may also exclude the infrequently used code from the original service. In one embodiment, the optimized configuration may indicate a number of instances of the partial service to deploy and one or more locations to deploy the partial service in the service-oriented system. As shown in 930, at least one instance of the partial service may be deployed based on the optimized configuration. In one embodiment, any of the operations shown in 905-930 may be performed multiple times over an interval of time to optimize one or more services in a service-oriented system in a continuous manner.

Optimization Using Static Analysis

Figure 10:
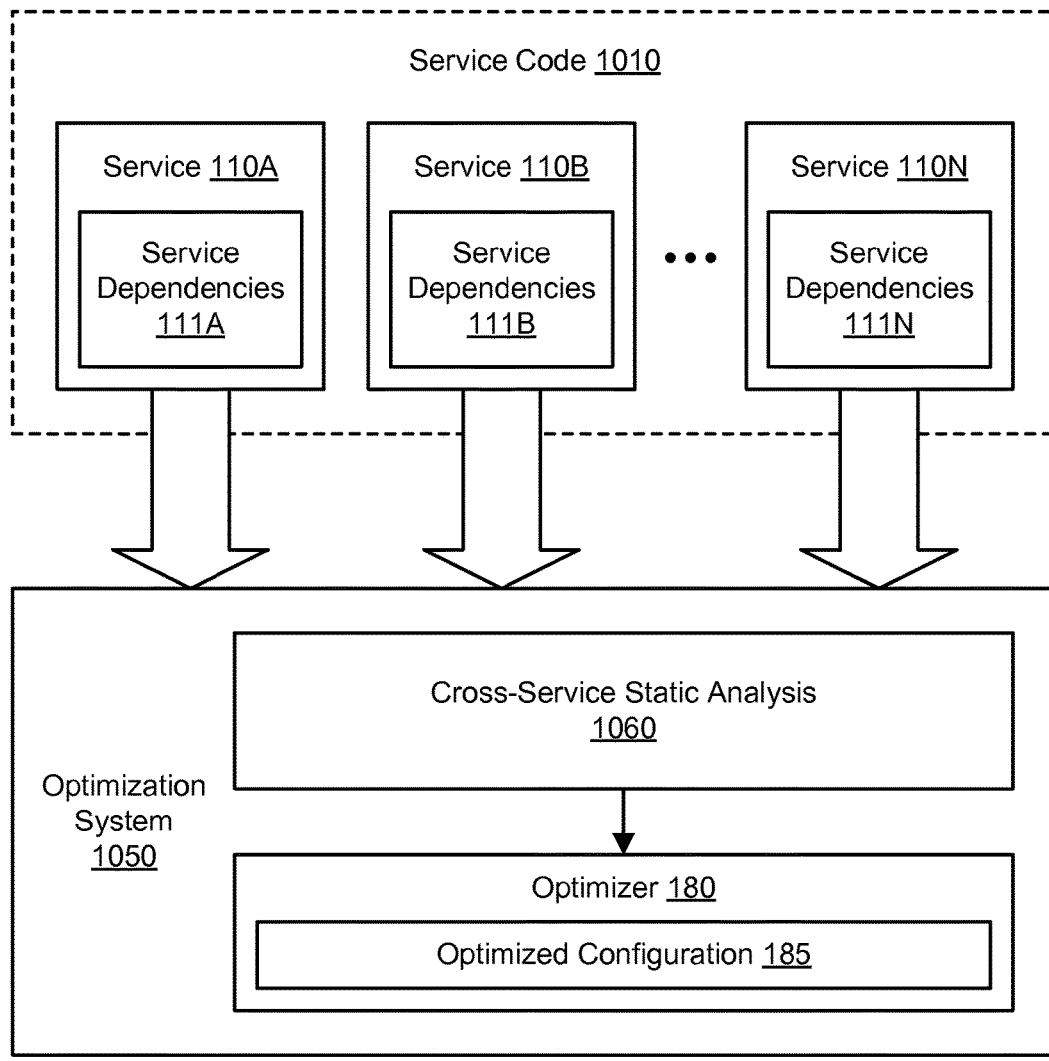
FIG. 10 illustrates an example system environment for service-oriented system optimization using cross-service static analysis, according to some embodiments.

FIG. 10 illustrates an example system environment for service-oriented system optimization using cross-service static analysis, according to some embodiments. The example system environment may include a set of service code 1010 for a plurality of services and an optimization system 1050. The services may be intended for deployment in a service-oriented system. As discussed above with respect to FIG. 1 and FIG. 6A, the service-oriented system may implement a service-oriented architecture and may include multiple services configured to communicate with each other (e.g., through message passing) to carry out various tasks, such as business functions. Although three services 110A and 110B through 110N are illustrated for purposes of example, it is contemplated that any suitable number of services may be used with the service-oriented system. The services 110A-110N may be designed for implementation using a plurality of hosts, any of which may be implemented by the example computing device 3000 illustrated in FIG. 28. The hosts may be located in any suitable number of data centers or geographical locations. In one embodiment, multiple services and/or instances of the same service may be implemented using the same host. It is contemplated that the service-oriented system and/or optimization system 1050 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system including the services 110A-110N may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

As discussed with reference to FIG. 1, each of the services 110A-110N may be configured with one or more components for monitoring interactions between services. The interaction monitoring functionality for each service may monitor or track interactions between the corresponding service and other services (or components of services) in the service-oriented system. The monitored interactions may include service requests (i.e., requests for services to be performed), responses to requests, and other suitable events. In one embodiment, the interaction monitoring functionality may monitor service interactions such as service requests and service responses in any suitable environment, such as a production environment and/or a test environment. To monitor the service requests and responses, lightweight instrumentation may be added to services. The instrumentation (e.g., a reporting agent associated with each service) may collect and report data associated with each inbound request, outbound request, or other service interaction (e.g., a timer-based interaction) processed by a service. As discussed above with respect to FIG. 1, a service may collect trace data and send the trace data to the optimization system 1050. The trace data may describe aspects of the service interactions. Further aspects of the interaction monitoring functionality are discussed below with respect to FIG. 21 through FIG. 26.

In one embodiment, the optimization system 1050 may include a plurality of components configured for optimization of a service-oriented system. For example, the optimization system 1050 may include a cross-service static analysis functionality 1060 and an optimizer functionality 180. In some embodiments, the optimization system 650 may also include a performance analysis functionality 160 as shown in FIG. 1 and/or a data flow analysis functionality 170 as shown in FIG. 6A. The optimization system 1050 may include one or more computing devices, any of which may be implemented by the example computing device 3000 illustrated in FIG. 28. In various embodiments, the functionality of the different services, components, and/or modules of the optimization system 1050 may be provided by the same computing device or by different computing devices. If any of the various components are implemented using different computing devices, then the respective computing devices may be communicatively coupled, e.g., via a network. Each one of the cross-service static analysis functionality 1060 and the optimizer functionality 180 may represent any combination of software and hardware usable to perform their respective functions, as discussed as follows.

Using the cross-service static analysis functionality 1060, the optimization system 1050 may analyze the program code of multiple services (e.g., services 110A-110N) and optimize a service-oriented system including those services based on the analysis. In general, the cross-service static analysis functionality 1060 may determine properties of call patterns before services are executed. For example, the cross-service static analysis functionality 1060 may detect one or more service dependencies in the program code of various services. In one embodiment, any of the services 110A-110N may be programmed with one or more service dependencies. For example, service 110A may include one or more service dependencies 111A, service 110B may include one or more service dependencies 111B, and service 110N may include one or more service dependencies 111N. The service dependencies may include service calls or other invocations of the functionality of other services, for example. The service code 1010 may be expressed in any suitable programming language(s). The service dependencies may be represented in the service code 1010 by any suitable programming language element(s), such as calls to an interface to invoke the functionality of other services.

By using the cross-service static analysis functionality 1060 to detect one or more service dependencies 111A-111N, the optimization system 1050 may generate an optimized configuration that takes advantage of the service dependencies to improve the performance and/or cost of the service-oriented system. In various embodiments, various types of optimizations may be implemented. For example, services with dependencies may be colocated to improve resource usage (e.g., network usage, memory usage, and/or processor usage). As discussed above, two or more services may be colocated to the same zone, the same host, the same process, or the same virtual machine. Similarly, the number of deployed instances of a service may be modified based on the static analysis. As another example, optimized versions of services may be generated by modifying the relevant portions of the service code 1010 prior to deployment of services. In one embodiment, an optimized service may be generated that includes at least a portion of a first service and at least a portion of a second service, where a service dependency between the first and second services was detected using the cross-service static analysis 1060. For example, a first service may be optimized to bring program code from a second service inline, thus improving resource usage. Furthermore, the cross-service static analysis 1060 may be used to compile the program code for multiple services together or at substantially the same time in order to optimize one or more of the services. By determining that some portions of code are never reached using static analysis, a service may be partially deployed to a particular context. By compiling services together, errors involved with service calls may be determined and addressed. Additionally, cross-service static analysis may be used to ensure the security of data passed from one service to another.

In general, suitable ones of the service-oriented system optimizations described herein may be based at least in part on the cross-service static analysis. For example, runtime analysis using trace data (e.g., using the performance analysis functionality 160 as shown in FIG. 1 and/or the data flow analysis functionality 170 as shown in FIG. 6A) may be augmented with the use of cross-service static analysis. In particular, the static analysis may determine which services are called by a service in order to restrict the scope of the runtime analysis. Furthermore, services may be optimized or deployed based on the cross-service static analysis, and that optimization or deployment may be refined with the use of runtime data collected after deployment.

Using the optimizer functionality 180, the optimization system 150 may determine an optimized configuration 185 for at least a portion of the service-oriented system. As used herein, the term "optimized" generally means "improved" rather than "optimal." The optimized configuration 185 for a set of services may represent an improvement on the existing configuration of the set of services with respect to one or more performance metrics (e.g., network latency or transit times, throughput, reliability or availability, cost, etc.) for at least a portion of the one or more call graphs. Accordingly, the optimized configuration 185 may be determined based on the static analysis 1060 and optionally based on one or more performance metrics in order to optimize one or more call paths of the one or more call graphs. In one embodiment, the optimized configuration 185 may also be determined based on additional information that is not derived from trace data, such as an expense associated with each service instance, service interaction, host, and/or unit of resource consumption. In one embodiment, the optimized configuration 185 may be determined such that it minimizes, maximizes, decreases, or increases a total performance metric for one or more call paths. For example, the optimized configuration 185 may minimize or reduce the network latency for one or more call paths, maximize or increase the throughput for one or more call paths, maximize or increase the reliability or availability for one or more call paths, or minimize or reduce the cost for one or more call paths. The optimizer 180 may take into account the sensitivity of a particular call path to latency, e.g., whether improving the latency of one event would improve the latency of another event in a call graph. Any suitable component(s) may be used to implement the optimizer 180. For example, the optimizer 180 may be implemented using a constrained optimization solver which is configured to minimize a cost function or an energy function in the presence of one or more constraints or to maximize a reward function or a utility function in the presence of one or more constraints. The optimizer 180 may generate an optimized configuration 185 by optimizing a user-defined function of network latency, throughput, reliability, cost, and/or any other suitable term(s).

In one embodiment, the optimization system 1050 may generate and/or modify the optimized configuration 185 repeatedly and at appropriate intervals. Similarly, the placement of services may be modified repeatedly and at appropriate intervals in accordance with new or modified versions of the optimized configuration 185. In one embodiment, the optimized configuration 185 for one or more services may be generated periodically, such as when a software deployment occurs or when a traffic analysis is performed. In one embodiment, the optimized configuration 185 may be generated to optimize the use of any suitable computational resources, such as processor resources, memory resources, and/or network resources.

Figure 11A:
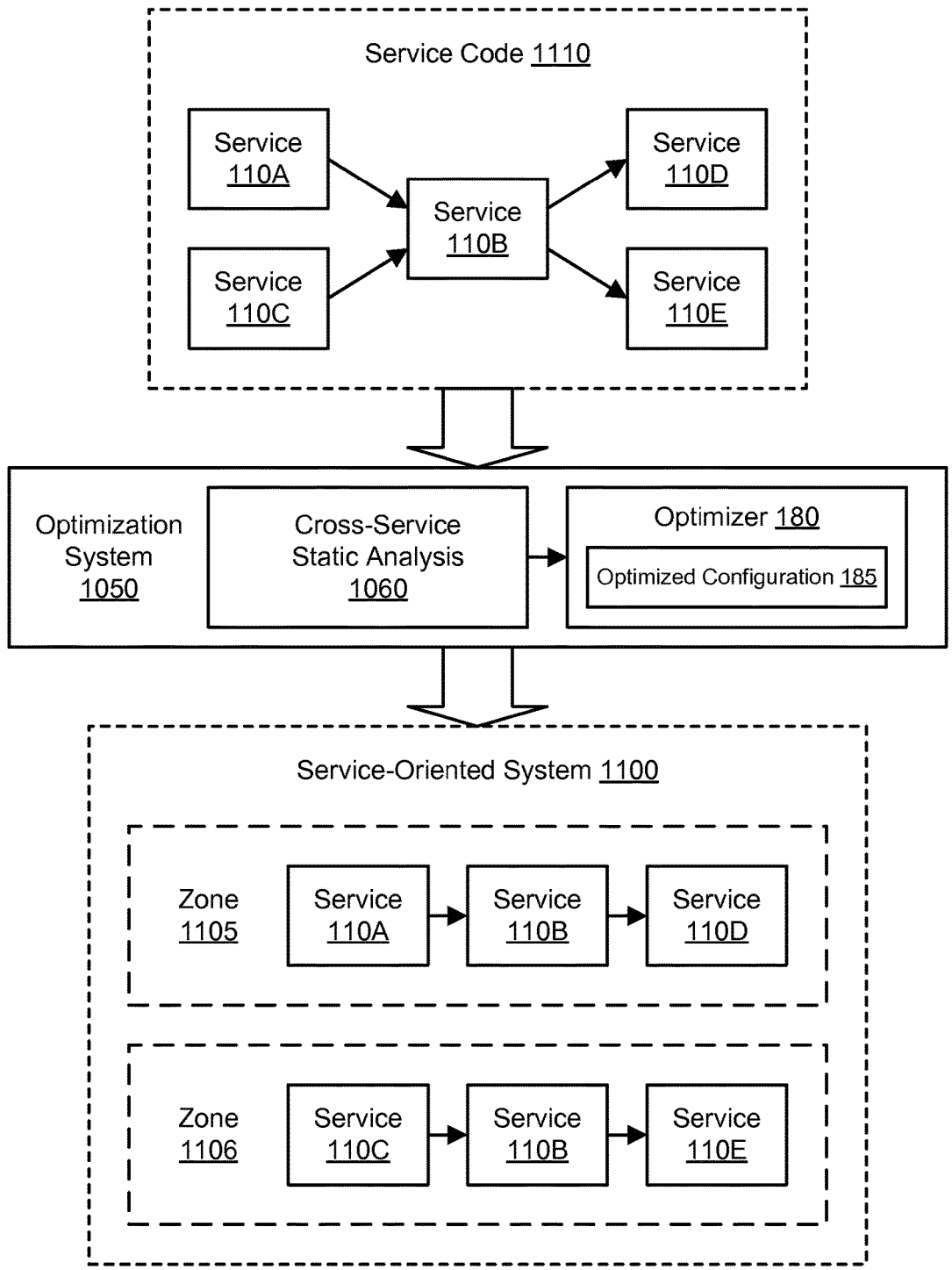
FIG. 11A illustrates an example of service-oriented system optimization using cross-service static analysis, according to some embodiments.

FIG. 11A illustrates an example of service-oriented system optimization using cross-service static analysis, according to some embodiments. As discussed above, the cross-service static analysis functionality 1060 may detect one or more service dependencies in the program code of various services. For example, the cross-service static analysis functionality 1060 may analyze the program code 1110 for a set of services, e.g., service 110A, service 110B, service 110C, service 110D, and service 110E. The service dependencies detected by the cross-service static analysis functionality 1060 may include service calls or other invocations of the functionality of other services, for example. In the example shown in FIG. 11A, the cross-service static analysis functionality 1060 may determine, based on the service code 1110, that calls from service 110A to service 110B result in service 110B calling service 110D but not service 110E. Similarly, the cross-service static analysis functionality 1060 may determine, based on the service code 1110, that calls from service 110C to service 110B result in service 110B calling service 110E but not service 110D.

By using the cross-service static analysis functionality 1060 to detect one or more service dependencies, the optimization system 1050 may generate an optimized configuration that takes advantage of the service dependencies to improve the performance and/or cost of the service-oriented system. Accordingly, based on the service dependencies determined above, instances of the services may be colocated to improve resource usage (e.g., network usage, memory usage, and/or processor usage). As discussed above, two or more services may be colocated to the same zone, the same host, the same process, or the same virtual machine. To take advantage of the service dependencies between services 110A, 110B, and 110D, instances of all three services may be deployed to the same zone 1105, for example. The zone 1105 may represent a geographical area, a data center, or a particular location (e.g., a rack) within a data center. Alternatively, instances of all three services 110A, 110B, and 110D may be deployed to the same host or same virtual machine. Similarly, to take advantage of the service dependencies between services 110C, 110B, and 110E, instances of all three services may be deployed to the same zone 1106, for example. Again, the zone 1106 may represent a geographical area, a data center, or a particular location (e.g., a rack) within a data center. Alternatively, instances of all three services 110C, 110B, and 110E may be deployed to the same host or same virtual machine. In this manner, services that tend to call other services may be deployed near each other in a service-oriented system 1100 in order to improve resource usage, cost, and/or performance in at least a portion of the service-oriented system 1100.

Figure 11B:
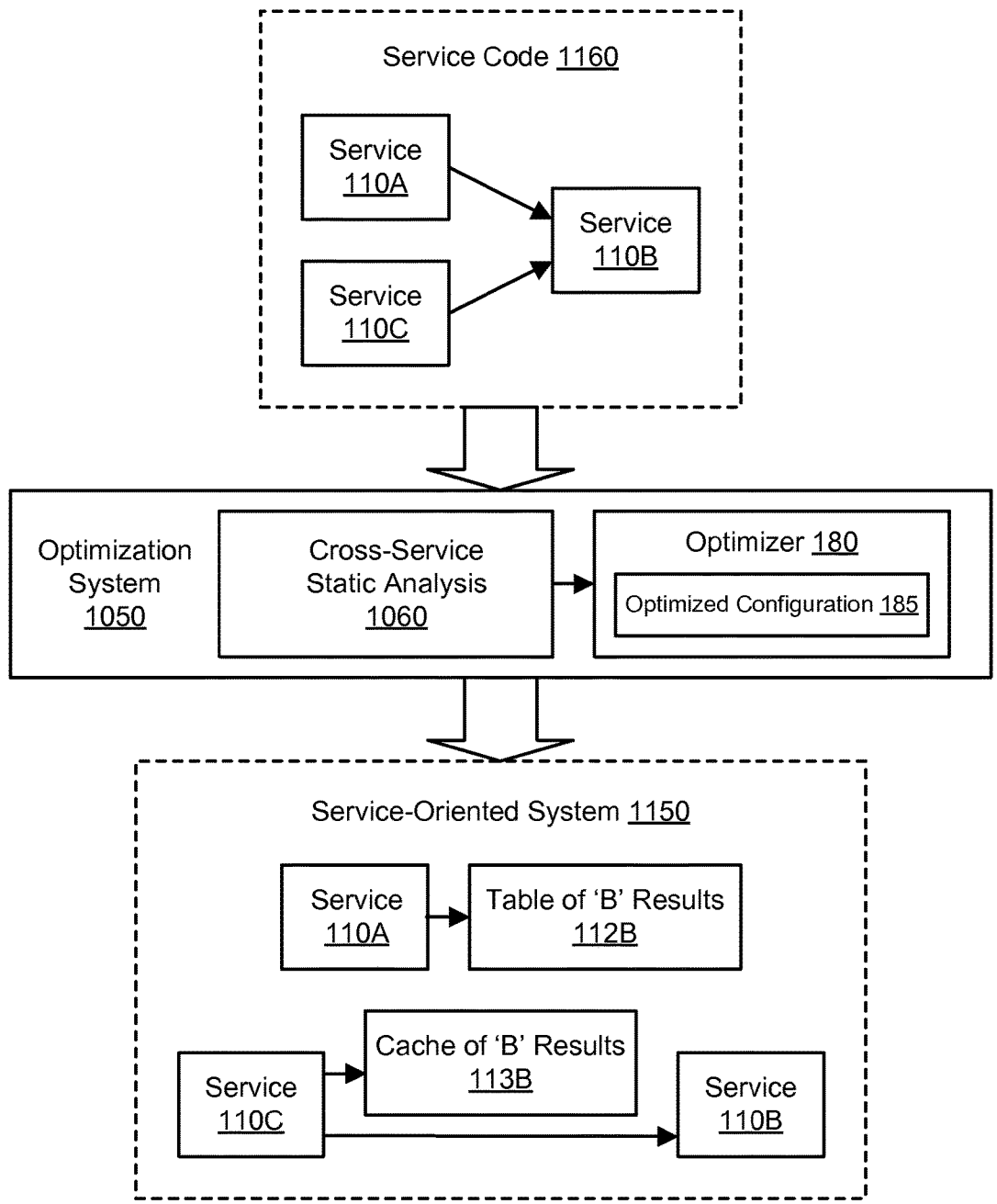
FIG. 11B illustrates an example of service-oriented system optimization using cross-service static analysis, according to some embodiments.

FIG. 11B illustrates an example of service-oriented system optimization using cross-service static analysis, according to some embodiments. As discussed above, the cross-service static analysis functionality 1060 may detect one or more service dependencies in the program code of various services. For example, the cross-service static analysis functionality 1060 may analyze the program code 1160 for a set of services, e.g., service 110A, service 110B, and service 110C. The service dependencies detected by the cross-service static analysis functionality 1060 may include service calls or other invocations of the functionality of other services, for example. In the example shown in FIG. 11B, the cross-service static analysis functionality 1060 may determine, based on the service code 1160, that calls from service 110A to service 110B result in a particular set of results being returned from service 110B to service 110A. The cross-service static analysis functionality 1060 may also determine, based on the service code 1160, that calls from service 110C to service 110B result in a particular set of results being returned from service 110B to service 110C.

By using the cross-service static analysis functionality 1060 to detect one or more service dependencies, the optimization system 1050 may generate an optimized configuration that takes advantage of the service dependencies to improve the performance and/or cost of the service-oriented system. Accordingly, based on the service dependencies determined above, instances of the services may be deployed with suitable tables of results of caches of results to improve resource usage (e.g., network usage, memory usage, and/or processor usage). To take advantage of the service dependencies between services 110A and 110B, service 110A may be deployed not with an instance of service 110B but with a table of results 112B from service 110B, where the potential results in the table 112B were determined using the cross-service static analysis. Accordingly, if only the results in the table 112B are possible when service 110A calls service 110B, the instance of service 110A may be deployed without the ability to make a service call to service 110B but instead to rely upon the table of results 112B. Similarly, to take advantage of the service dependencies between services 110C and 110B, service 110C may be deployed with cache 113B that includes a table of results from service 110B, where the potential results in the cache 113B were determined using the cross-service static analysis. However, if the cross-service static analysis determines that other results are possible, then service 110C may also be deployed with an instance of 110B, and service 110C may call service 110B only if a cache miss is encountered. In this manner, services that tend to call other services may be deployed with caches or tables in a service-oriented system 1150 in order to improve resource usage, cost, and/or performance in at least a portion of the service-oriented system 1150. In general, the cross-service static analysis may also be used to determine cache size, cache location, and cache policy for a service-oriented system.

Figure 12A:
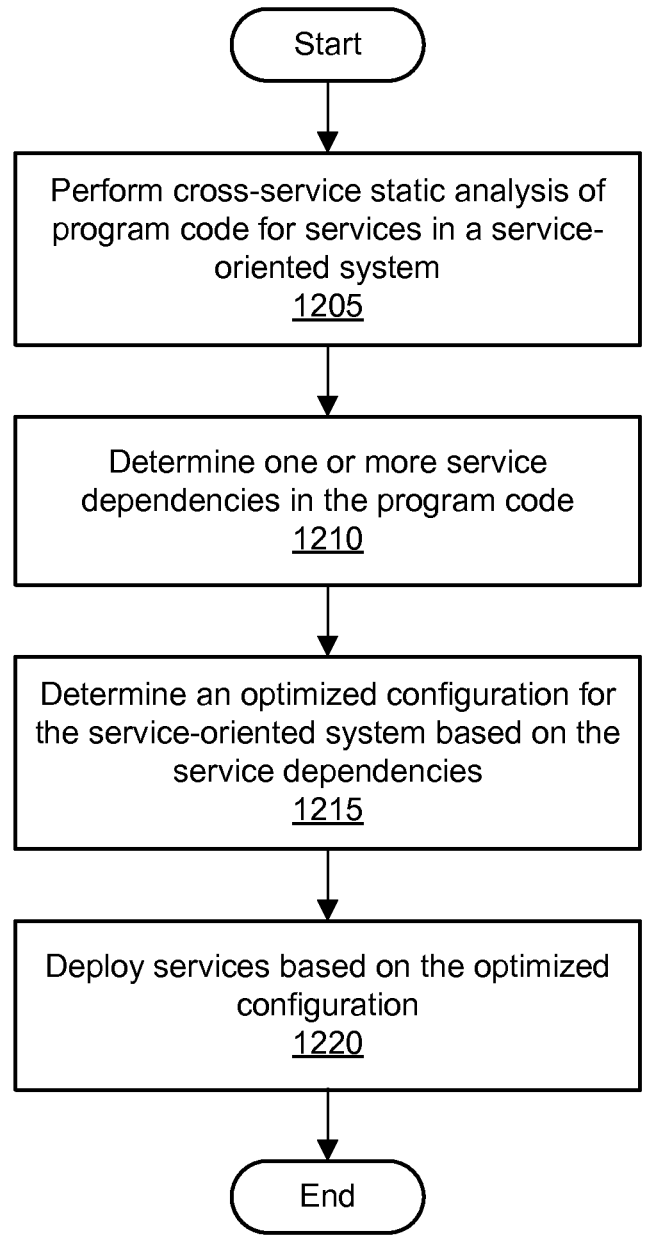
FIG. 12A is a flowchart illustrating a method for service-oriented system optimization using cross-service static analysis, according to some embodiments.

FIG. 12A is a flowchart illustrating a method for service-oriented system optimization using cross-service static analysis, according to some embodiments. As shown in 1205, a cross-service static analysis of program code may be performed for services in a service-oriented system. As shown in 1210, one or more service dependencies may be determined in the program code for the services. The service dependencies may be determined based on the cross-service static analysis. The service dependencies may include one or more service calls between services.

As shown in 1215, an optimized configuration may be determined for the service-oriented system based on the one or more service dependencies. The optimized configuration may improve a total performance metric in at least a portion of the service-oriented system. As shown in 1220, services may be deployed to the service-oriented system based on the optimized configuration. By deploying services based on the optimized configuration, services may be colocated to take advantage of service dependencies detected using cross-service static analysis. Additionally, optimized services may be generated and deployed to take advantage of service dependencies detected using cross-service static analysis. Furthermore, caches of results and/or tables of results may be deployed between services to take advantage of service dependencies detected using cross-service static analysis.

Figure 12B:
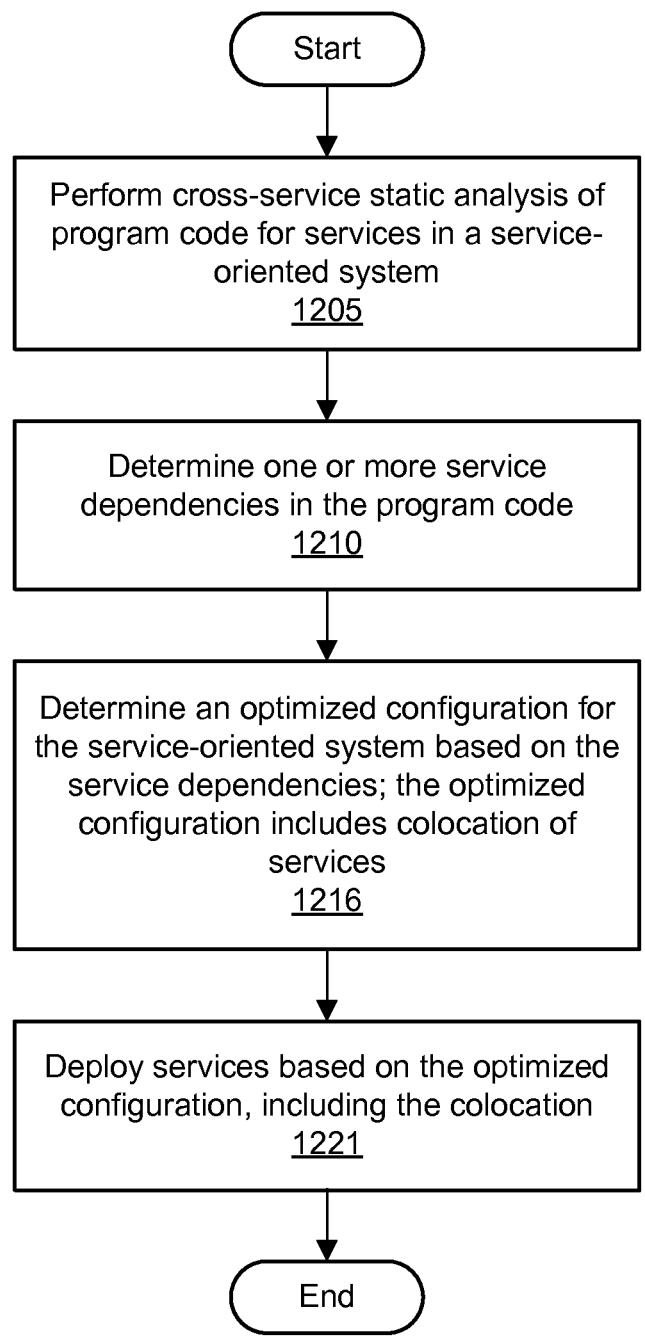
FIG. 12B is a flowchart illustrating a method for service-oriented system optimization using cross-service static analysis, including collocation of services, according to some embodiments.

FIG. 12B is a flowchart illustrating a method for service-oriented system optimization using cross-service static analysis, including collocation of services, according to some embodiments. As shown in 1205, a cross-service static analysis of program code may be performed for services in a service-oriented system. As shown in 1210, one or more service dependencies may be determined in the program code for the services. The service dependencies may be determined based on the cross-service static analysis. The service dependencies may include one or more service calls between services.

As shown in 1216, an optimized configuration may be determined for the service-oriented system based on the one or more service dependencies. The optimized configuration may improve a total performance metric in at least a portion of the service-oriented system. The optimized configuration may also include a colocation of two or more services. For example, if the cross-service static analysis indicates that one service frequently calls another service, then an optimized configuration may include colocation for the two services. The colocation may be within the same zone, the same host, the same process, or the same virtual machine. As shown in 1221, services may be deployed to the service-oriented system based on the optimized configuration, including the colocation. By deploying services based on the optimized configuration, services may be colocated to take advantage of service dependencies detected using cross-service static analysis.

Figure 12C:
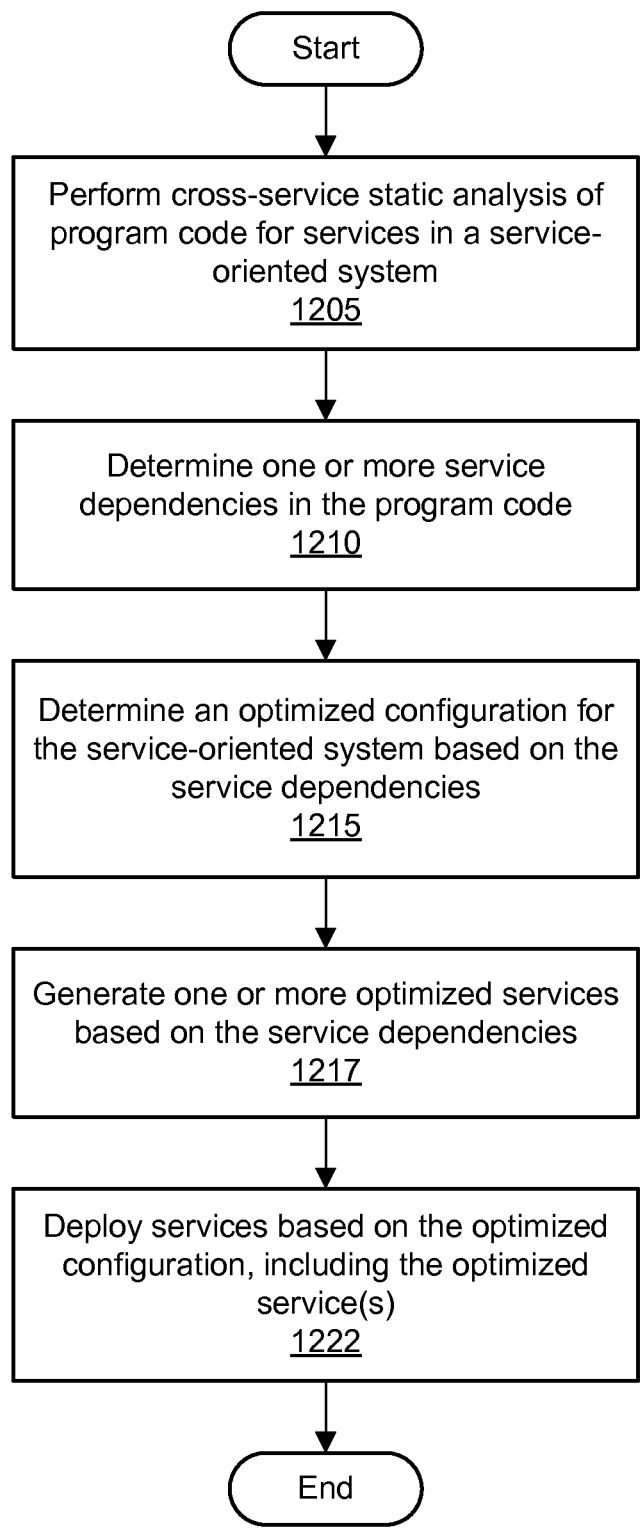
FIG. 12C is a flowchart illustrating a method for service-oriented system optimization using cross-service static analysis, including generation of optimized services, according to some embodiments.

FIG. 12C is a flowchart illustrating a method for service-oriented system optimization using cross-service static analysis, including generation of optimized services, according to some embodiments. As shown in 1205, a cross-service static analysis of program code may be performed for services in a service-oriented system. As shown in 1210, one or more service dependencies may be determined in the program code for the services. The service dependencies may be determined based on the cross-service static analysis. The service dependencies may include one or more service calls between services.

As shown in 1215, an optimized configuration may be determined for the service-oriented system based on the one or more service dependencies. The optimized configuration may improve a total performance metric in at least a portion of the service-oriented system. As shown in 1217, one or more optimized services may be generated based on the service dependencies. For example, one or more optimized services may be generated by compiling the services together or otherwise modifying the services to take advantage of the service dependencies. As another example, code from one service may be pulled inline to another service in place of a service call. As shown in 1222, services may be deployed to the service-oriented system based on the optimized configuration, including the optimized service(s). Accordingly, optimized services may be generated and deployed to take advantage of service dependencies detected using cross-service static analysis.

Global Optimization

Figure 13:
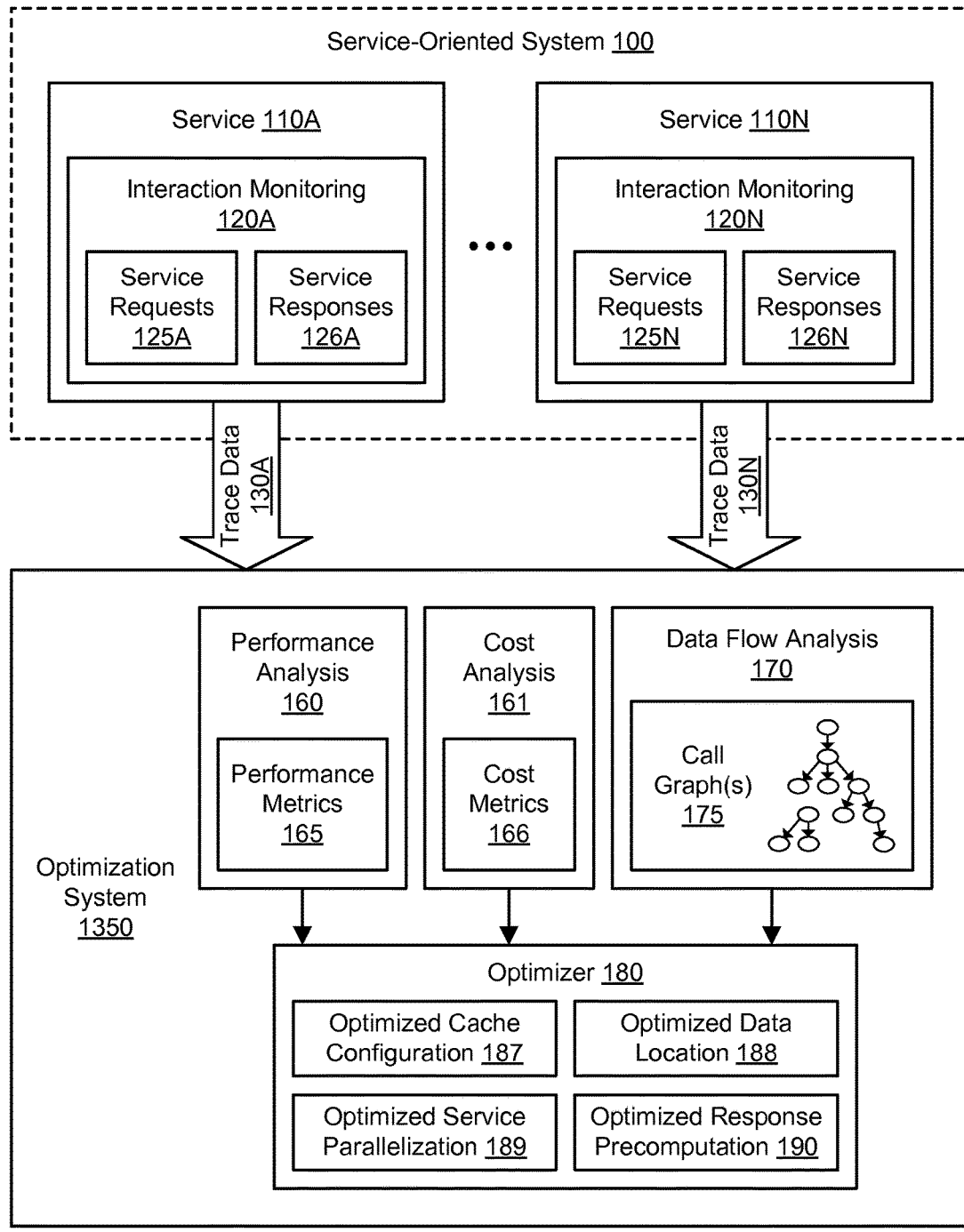
FIG. 13 illustrates an example system environment for global optimization of a service-oriented system, according to some embodiments.

FIG. 13 illustrates an example system environment for global optimization of a service-oriented system, according to some embodiments. The example system environment may include a service-oriented system 100 and an optimization system 1350. The service-oriented system 100 may implement a service-oriented architecture and may include multiple services 110A-110N configured to communicate with each other (e.g., through message passing) to carry out various tasks, such as business functions. Although two services 110A and 110N are illustrated for purposes of example, it is contemplated that any suitable number of services may be used with the service-oriented system 100. The services 110A-110N may represent different services (e.g., different sets of program code) or different instances of the same service. The services 110A-110N may be implemented using a plurality of hosts, any of which may be implemented by the example computing device 3000 illustrated in FIG. 28. The hosts may be located in any suitable number of data centers or geographical locations. In one embodiment, multiple services and/or instances of the same service may be implemented using the same host. It is contemplated that the service-oriented system 100 and/or optimization system 1350 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, each of the services 110A-110N may be configured with one or more components for monitoring interactions between services. For example, service 110A may include an interaction monitoring functionality 120A, and service 110N may include an interaction monitoring functionality 120N. The interaction monitoring functionality 120A or 120N may monitor or track interactions between the corresponding service 110A or 110N and other services (or components of services) in the service-oriented system 100. The monitored interactions may include service requests 125A-125N (i.e., requests for services to be performed), responses 126A-126N to requests, and other suitable events.

In one embodiment, the interaction monitoring functionality 120A or 120N may monitor service interactions such as service requests 125A or 125N and service responses 126A or 126N in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service requests 125A-125N and responses 126A-126N, lightweight instrumentation may be added to services, including services 110A-110N. The instrumentation (e.g., a reporting agent associated with each service) may collect and report data associated with each inbound request, outbound request, or other service interaction (e.g., a timer-based interaction) processed by a service. Further aspects of the interaction monitoring functionality 120A-120N are discussed below with respect to FIG. 21 through FIG. 26.

Based on the interaction monitoring, a service may collect trace data and send the trace data to the optimization system 1350. For example, service 110A may collect and send trace data 130A, and service 110N may collect and send trace data 130N. The trace data may describe aspects of the service interactions. In one embodiment, the trace data may be generated in real-time or near real-time, e.g., as service requests and service responses are received and/or processed by the services. The trace data may include data indicative of relationships between individual services, such as an identification of the calling (i.e., requesting) service and the called (i.e., requested) service for each interaction. The trace data may include metadata such as request identifiers that are usable to identify paths of service requests and responses from service to service. Request identifiers are discussed in greater detail below with respect to FIG. 21 through FIG. 26. The trace data may also include data describing the performance of the service interactions. For example, the trace data may include data indicative of network latency for a request or response, data indicative of network throughput for one or more interactions, data indicative of service reliability or availability, data indicative of resource usage, etc. The trace data generated for multiple services and multiple service interactions may be sent to the optimization system 150 for aggregation and analysis.

In one embodiment, the optimization system 1350 may include a plurality of components configured for analysis of the trace data 130A-130N and optimization of the service-oriented system 100 based on the analysis. For example, the optimization system 1350 may include a performance analysis functionality 160, a cost analysis functionality 161, a data flow analysis functionality 170, and an optimizer functionality 180. The optimization system 1350 may include one or more computing devices, any of which may be implemented by the example computing device 3000 illustrated in FIG. 28. In various embodiments, the functionality of the different services, components, and/or modules of the optimization system 1350 may be provided by the same computing device or by different computing devices. If any of the various components are implemented using different computing devices, then the respective computing devices may be communicatively coupled, e.g., via a network. Each one of the performance analysis functionality 160, the cost analysis functionality 161, the data flow analysis functionality 170, and the optimizer functionality 180 may represent any combination of software and hardware usable to perform their respective functions, as discussed as follows.

Using the performance analysis functionality 160, the optimization system 1350 may analyze the performance data generated by the interaction monitoring functionality 120A-120N and received by the optimization system 1350 in the trace data 130A-130N. The performance analysis functionality 160 may determine one or more performance metrics 165 based on the trace data 130A-130N. In one embodiment, the performance metrics 165 may describe aspects of the performance of multiple interactions, such as metrics representing aggregate performance, average performances, etc. In one embodiment, the performance metrics 165 may describe aspects of the performance of individual interactions. For example, the optimization system 1350 may calculate the client-measured latency for an interaction based on the time at which a request was sent by a service and also on the time at which a response to the request was received by the service. The optimization system 1350 may also calculate the server-measured latency for an interaction based on the time at which a request was received by a service and also on the time at which a response to the request was sent by the service. The network transit time for the interaction may be calculated as the difference between the client-measured latency and the server-measured latency. Accordingly, the performance metrics 165 may include individual transit times for individual service calls and/or transit time metrics (e.g., mean, median, etc.) for multiple service calls. Network transit times may be impacted by the number of network hops, the physical distance between hops, and the link quality between endpoints.

The interaction monitoring functionality 120A-120N for the various services may collect data indicative of service interactions involved in satisfying a particular initial request, e.g., data indicative of a route taken in satisfying a service request and/or a hierarchy of call pathways between services. The route may correspond to a set of call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service, which may then call one or more other services. Additionally, each of those services may also call one or more other services, and so on until the root request is completely fulfilled. The particular services called to fulfill a request may be represented as a call graph that specifies, for each particular service of multiple services called to fulfill the same root request, the service that called the particular service and any services called by the particular service.

Using the cost analysis functionality 161, the optimization system 1350 may estimate the costs of deploying and/or operating various elements of the service-oriented system 100. For example, the cost analysis functionality 161 may determine cost metrics 166 related to deploying and/or operating particular hosts, classes of hosts, services, classes of services, etc. Each cost metric may include one or more cost valuations, such as a total cost of ownership (TCO), a capital expenditure, and/or any other suitable cost valuation with or without a time component. Additionally, the cost metrics 166 may include costs for elements of computing resource usage (e.g., processor usage, persistent storage usage, memory usage, etc.), energy consumption, heat production, and/or any other suitable cost element(s). In one embodiment, the costs of various configuration parameters may also be determined by the cost analysis functionality 161. For example, the costs of potentially enabling varying types of caches in varying locations and with varying sizes and varying policies may be determined by the cost analysis functionality 161. As further examples, the costs of enabling configuration parameters for data locations, service parallelization, and response precomputation may be determined by the cost analysis functionality 161. In one embodiment, the performance metrics 165 may also influence aspects of the cost metrics 166. The cost metrics 166 may be initially determined statically and updated dynamically as costs change through the lifespan of elements of the service-oriented system 100.

In one embodiment, the cost analysis functionality 161 may determine the costs of computations in the service-oriented system 100. Over the course of runtime traffic, the optimization system 1350 may collect data about which computations are run and over which inputs. For every computation, the cost analysis functionality 161 may determine how expensive it is. For every computation, the cost analysis functionality 161 may also determine the number of repeated invocations of the computation within some domain of execution. The cost analysis functionality 161 may multiply the cost per computation by the number of invocations to determine the total cost of the computation within a particular context (as determined by call patterns in trace data) and period of time.

Using the data flow analysis functionality 170, the optimization system 1350 may analyze the trace data 130A-130N and generate one or more call graphs 175 based on connectivity information within the trace data. Each call graph may represent the flow of requests from service to service and may identify service dependencies. Each call graph may include a plurality of nodes representing services and one or more edges (also referred to as call paths) representing service interactions. Each of the call graphs 175 may include a hierarchical data structure that include nodes representing the services and edges representing the interactions. In some cases, a call graph may be a deep and broad tree with multiple branches each representing a series of related service calls. The data flow analysis functionality 170 may use any suitable data and metadata to build each call graph, such as request identifiers and metadata associated with services and their interactions. The request identifiers and metadata are discussed below with respect to FIG. 21 through FIG. 26. In one embodiment, the data flow analysis functionality 170 may analyze the trace data 130A-130N and generate suitable reports and/or visualizations (e.g., call graph visualizations) based on the trace data 130A-130N.

The generation of a particular call graph may be initiated based on any suitable determination. In one embodiment, the call graph generation may be initiated after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the call graph may be finalized within seconds or minutes.

Using the optimizer functionality 180, the optimization system 1350 may determine one or more optimizations for the service-oriented system 100. In general, the optimizer may determine local optimizations or optimizations in particular elements or classes of elements based on global data for the service-oriented system 100. As used herein, the term "optimized" generally means "improved" rather than "optimal." The optimization(s) may be determined as part of an optimized configuration that improves at least one performance metric and/or at least one cost across at least a portion of the service-oriented system 100. Using the cost metrics 166 for potential configuration options along with the performance metrics 165 and optionally the call graph(s) 175, the optimizer 180 may select one or more configuration parameters. The optimizer 180 may select the one or more configuration parameters (e.g., select values for the parameters) from a set of configuration parameters and a set of candidate values for each configuration parameter. The configuration parameters may relate to the operation of any suitable services, hosts, and/or other components that are sought to be optimized. In one embodiment, the search domain (e.g., the configuration parameters and candidate values) may be defined based on input from a user. In one embodiment, the search domain may be defined based on automatic and/or programmatic discovery of various configurable elements of services, hosts, and/or other components.

In one embodiment, the optimizer 180 may determine an optimized cache configuration 187 for one or more caches in the service-oriented system 100 by selecting suitable values for cache configuration options. For example, the optimizer 180 may determine an optimized cache location by selecting one or more cache location options. As another example, the optimizer 180 may determine an optimized cache size by selecting one or more cache location sizes. As a further example, the optimizer 180 may determine an optimized cache policy by selecting one or more cache policy options. Similarly, the optimizer 180 may determine an optimized cache type by selecting one or more cache type options.

Based on the total cost for a computation, the optimization system 1350 may determine, for example, how large of a cache and/or how expensive of a cache may be used in association with the computation. Because the optimization may be based on call patterns between various services, an optimization decision made for one pair of services may differ from an optimization decision made for one pair of services, even when one of the services is the same. In one embodiment, the optimization system 1350 may determine that service calls across different services are related to a common request, and the optimization system 1350 may identify and/or configure caches for those services to have an affinity for that common request. In one embodiment, the optimization system 1350 may ensure that caches are maintained for the life cycle of such a request, for the consistency of the caches. In one embodiment, the optimization system 1350 may enable caching in areas where caching would not incur any additional staleness of data. Additionally, static data may be used to augment the determination of the optimized cache configuration 187.

In one embodiment, the optimizer 180 may determine an optimized data location 188 for one or more data sources in the service-oriented system 100 by selecting suitable values for data location options. By configuring data locations in this manner, data sources may be linked to data consumers in an optimized manner. For example, the type of storage (e.g., transient or persistent), the number of storage locations, and the proximity of the storage location(s) may be determined to meet the needs of a particular data consumer. Additionally, the optimizer 180 may determine how and when to optimize batch accumulation for service calls to a remote node.

In one embodiment, the optimizer 180 may determine an optimized service parallelization 189 for one or more sets of services in the service-oriented system 100 by selecting suitable values for service parallelization options. Service parallelization options may include different numbers of service instances and potentially different locations for those instances. By using global data to influence service parallelization, the optimizer 180 may optimize along different dimensions such as low latency, consistency of throughput, maximal utilization of CPU or memory or network resources, availability. In optimizing service parallelization, the optimizer 180 may determine a balance between various trade-offs in the service-oriented system 100. For example, for a request including a quantity M of parallelizable elements of work, where each element of work includes a quantity N of instructions that are also parallelizable, the optimizer may distribute the M*N instructions among any suitable number of parallelized paths on any suitable number of hosts, where each path may include serialized instructions. The distribution of parallelized paths and serialized instructions may be determined (at least in part) based on cost analysis. As another example of a trade-off, a set of X*Y parallelizable instructions may be broken into X parallelized chunks of Y serialized instructions based on cost constraints for the parallelized chunks. In this manner, service parallelization may be automatically tuned in a service-oriented system.

In one embodiment, the optimizer 180 may determine an optimized response precomputation 190 for one or more services in the service-oriented system 100 by selecting suitable values for response precomputation options. For example, trace data may be used to determine the entities that are being looked up frequently and/or recognize patterns in responses. Accordingly, the optimizer 180 may determine when to precompute elements of data for particular entities. Similarly, trace data may be used to determine when to do speculative execution or when to reorder a sequence of steps. In general, precomputation may involve doing a computation "eagerly" rather than "lazily." For example, if a computation involves multiplying A and B to produce C, then a "lazy" computation might involve looking up A when the computation is requested, looking up B when the computation is requested, and then computing C. However, if the optimizer 180 determines that clients frequently want to know the value of C, then the optimizer may configure the service-oriented system such that whenever A or B changes, the system may automatically precompute C (in anticipation of a client seeking C in the future) and store the updated value of C.

Any suitable component(s) may be used to implement the optimizer 180. For example, the optimizer 180 may be implemented using a constrained optimization solver which is configured to minimize a cost function or an energy function in the presence of one or more constraints or to maximize a reward function or a utility function in the presence of one or more constraints. The optimizer 180 may generate any of the optimizations 187, 188, 189, or 190 by optimizing a user-defined function of network latency, throughput, reliability, cost, and/or any other suitable term(s).

In one embodiment, data and/or metadata associated with a request or response may be compressed, encrypted, or serialized by a service. Similarly, data and/or metadata associated with a request or response may be decompressed, decrypted, or deserialized upon receipt by a service. The cost or time associated with compression, decompression, encryption, decryption, serialization, and/or deserialization may be taken into account by the optimizer 180. Accordingly, performance metrics associated with the costs of preparing a message for network transport and processing such a received message (e.g., the costs of compression, decompression, encryption, decryption, serialization, and/or deserialization) may be collected as part of the trace data. Additionally, the optimizer 180 may take into account such performance data as CPU (central processing unit) utilization for program code, memory utilization for program code, and any other suitable data. In one embodiment, the optimization system 150 may collect performance data from sources other than the interaction monitoring components.

In one embodiment, all or nearly all of the service interactions (e.g., the service requests 125A-125N and service responses 126A-126N) may be monitored to generate trace data 130A-130N for use with the optimization system 150. In one embodiment, however, only a subset of the service interactions (e.g., service requests 125A-125N and service responses 126A-126N) may be monitored to generate trace data 130A-130N for use with the optimization system 150. Any suitable technique may be used to identify which of the service interactions are collected and/or used as the basis for the optimized configuration. For example, probabilistic sampling techniques may be used to initiate interaction monitoring for a certain percentage (e.g., 1%) of all service interactions.

In one embodiment, the optimization system 1350 may receive a continuous stream of trace data from the service-oriented system 100. The optimization system 1350 may generate and/or modify the optimized configuration (including any of the optimizations 187, 188, 189, or 190) repeatedly and at appropriate intervals. Similarly, the deployment of elements based on the optimizations 187, 188, 189, or 190 may be modified repeatedly and at appropriate intervals in accordance with new or modified versions of the optimized configuration.

Figure 14:
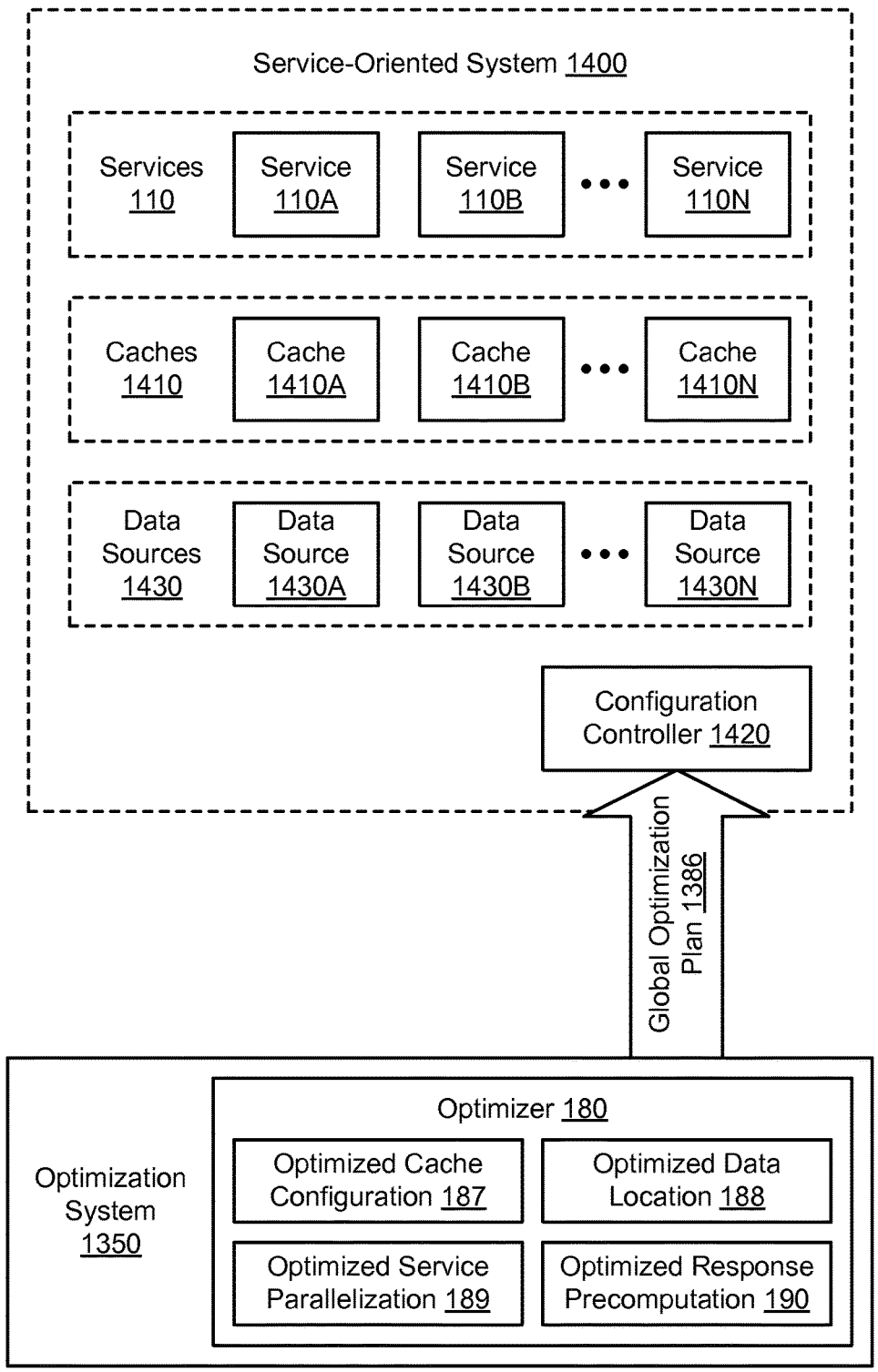
FIG. 14 illustrates further aspects of an example system environment for global optimization of a service-oriented system, according to some embodiments.

FIG. 14 illustrates further aspects of an example system environment for global optimization of a service-oriented system, according to some embodiments. A service-oriented system 1400 may implement a service-oriented architecture and may include a variety of different types of components. In one embodiment, the service-oriented system 1400 may include a plurality of services such as services 110A and 110B through 110N. In one embodiment, the service-oriented system 1400 may include a plurality of caches 1410 such as caches 1410A and 1410B through 1410N. In one embodiment, the service-oriented system 1400 may include a plurality of data sources 1430 such as caches 1430A and 1430B through 1430N. The services 110, caches 1410, and data sources 1430 may be implemented using any suitable number of hosts as well as any suitable memory resources, storage resources, processing resources, and network resources. In one embodiment, individual hosts may be added to or subtracted from the service-oriented system 1400, e.g., based on the computing resources required to run a particular set of services with a desired level of performance. Each host may run one or more services. It is contemplated that the service-oriented system 1400 and/or optimization system 1350 may include additional components not shown, fewer components than shown, or different combinations, configurations, or quantities of the components shown.

In one embodiment, a suitable component of the service-oriented system 1400 may provision and/or configure the hosts, services 110, caches 1410, and data sources 1430. For example, the hosts may be provisioned from a pool of available compute instances by selecting available compute instances with suitable specifications and configuring the selected compute instances with suitable software. In one embodiment, additional compute instances may be added to the service-oriented system 1400 as needed. In one embodiment, compute instances may be returned to the pool of available compute instances from service-oriented system 1400, e.g., if the computing instances are not needed at a particular point in time. Additionally, the software installed on the hosts may be modified. A configuration controller 1420 may implement such a provisioning and configuration functionality (potentially in conjunction with other components) to cause one or more hosts to be added to the service-oriented system 1400, cause one or more hosts to be removed from the service-oriented system 1400, cause one or more services to be removed from one or more hosts, and/or cause one or more services to be added to one or more hosts. The configuration controller 1420 may also implement any configuration changes for the services 110, caches 1410, and data sources 1430. The configuration controller 1420 may be implemented by the example computing device 3000 illustrated in FIG. 28 and may be implemented as a physical compute instance or virtual compute instance.

The number and/or configuration of the services 110, caches 1410, and data sources 1430 may be modified in accordance with the optimized configuration determined by the optimizer 180. In one embodiment, the number and/or configuration of the services 110, caches 1410, and data sources 1430 may be modified dynamically, e.g., while the service-oriented system 1400 remains operational to serve requests. In one embodiment, the optimization system 1350 may generate a global optimization plan 1386 based on the optimizations 187, 188, 189, and/or 189 and send the plan to the configuration controller 1420. The global optimization plan 1386 may include an indication of the location(s) and configuration option(s) to be implemented for any of the services 110, caches 1410, and data sources 1430. In one embodiment, any of the services 110, caches 1410, and data sources 1430 may be added, modified, or removed from the service-oriented system 1400 if the global optimization plan 1386 so indicates. In this manner, the service-oriented system 1400 may be reconfigured to provide improved performance (e.g., improved transit times, throughput, or reliability) or to be implemented at an improved cost.

Figure 15A:
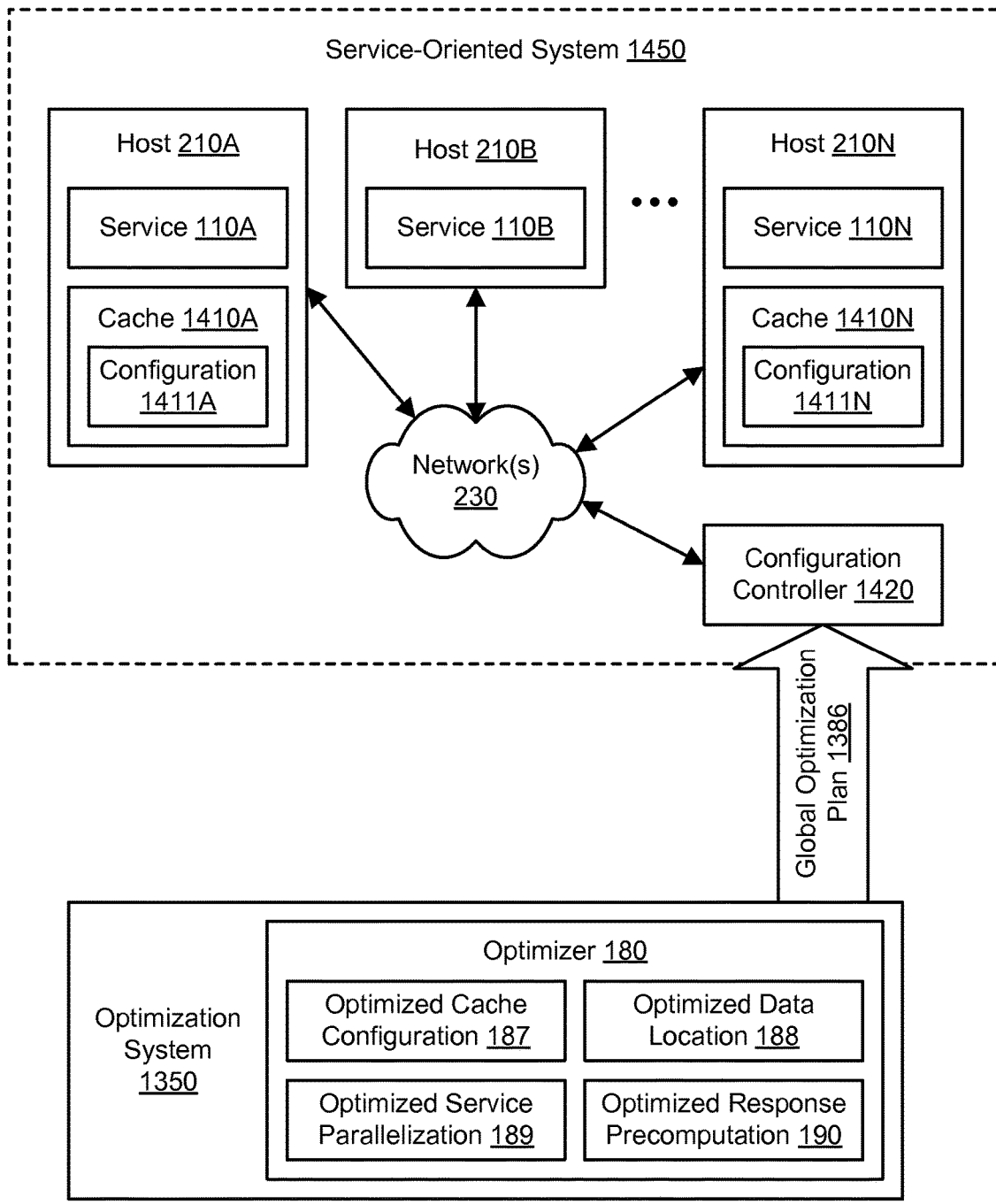
FIG. 15A illustrates an example of global optimization of a service-oriented system, including cache optimization, according to some embodiments.

FIG. 15A illustrates an example of global optimization of a service-oriented system, including cache optimization, according to some embodiments. A service-oriented system 1450 may implement a service-oriented architecture and may include a plurality of hosts, any of which may be implemented by the example computing device 3000 illustrated in FIG. 28. The hosts may be coupled using one or more networks 230. Although three hosts 210A, 210B, and 210N are illustrated for purposes of example, it is contemplated that any suitable number of hosts may be used with the service-oriented system 1450. The hosts 210A-210N may be located in any suitable number of data centers and/or geographical locations. In one embodiment, individual hosts may be added to or subtracted from the service-oriented system 1450, e.g., based on the computing resources required to run a particular set of services with a desired level of performance. Each host may run one or more services. For example, as shown in FIG. 15A, host 210A may run one or more instances of service 110A, host 210B may run one or more instances of service 110B, and host 210N may run one or more instances of service 110N. In one embodiment, multiple services and/or instances of the same service may be implemented using the same host. It is contemplated that the service-oriented system 1450 and/or optimization system 1350 may include additional components not shown, fewer components than shown, or different combinations, configurations, or quantities of the components shown.

Based on the optimized cache configuration 187 determined by the optimizer 180, one or more caches may be enabled and/or configured in the service-oriented system 1450. As discussed with respect to FIG. 14, a configuration controller 1420 may implement a configuration functionality (potentially in conjunction with other components) to enable caches in various locations and/or change the configuration of the caches. As shown in the example of FIG. 15A, a cache 1410A may be enabled on host 210A with a particular configuration 1411A. Similarly, a cache 1410N may be enabled on host 210N with a particular configuration 1411N. In addition to varying in location, the caches 1410A and 1410N may vary in type, level, size, and/or policy, based on the optimized cache configuration 187. The cache 1410A may be enabled within the same process as the service 110A, or the cache 1410N may be enabled within the same process as the service 110N. In one embodiment, the use of a cache (e.g., cache 1410A) may not be specified in the program code for a service (e.g., service 110A) that is linked to the cache in the global optimization plan 1386.

Figure 15B:
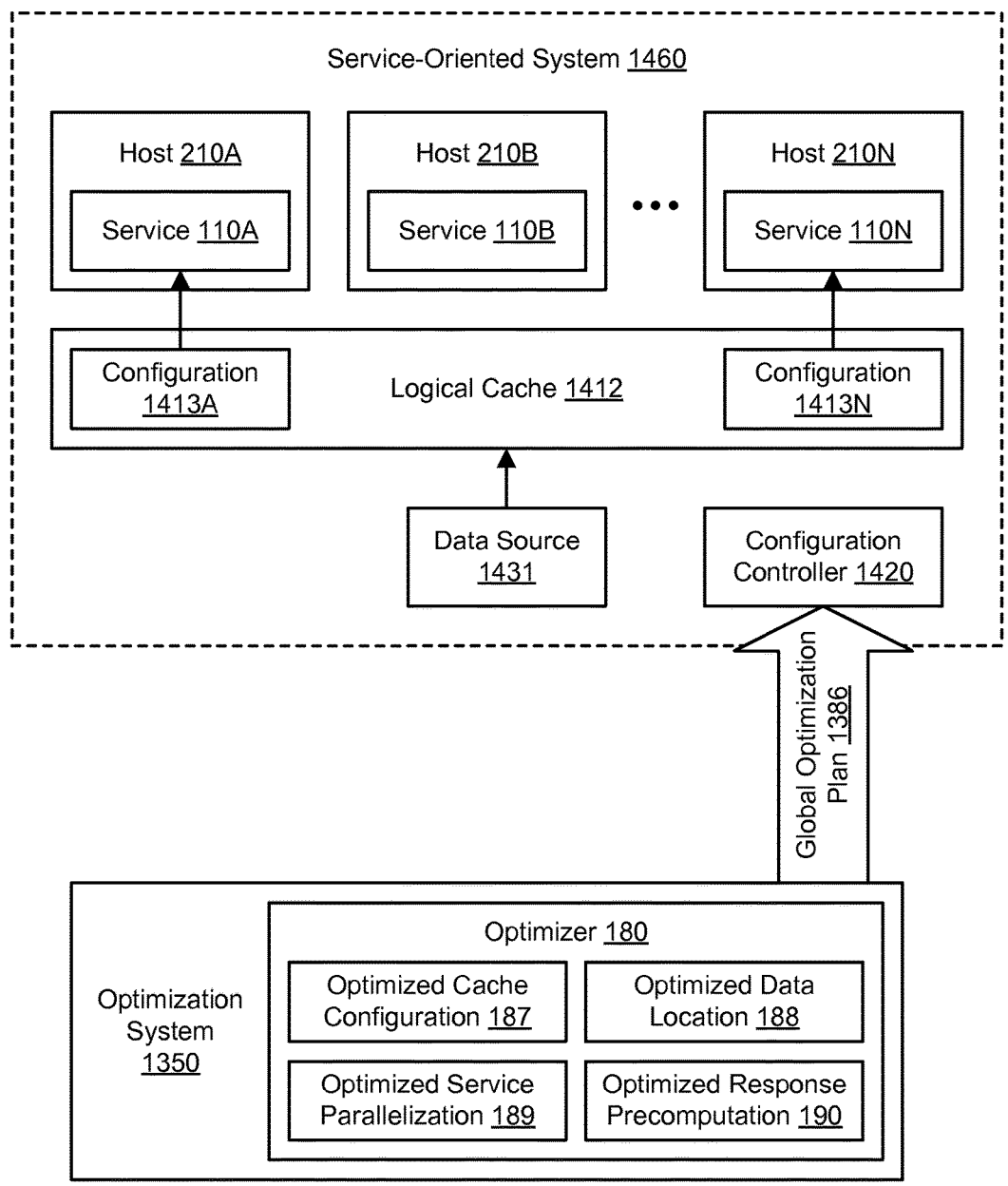
FIG. 15B illustrates an example of global optimization of a service-oriented system, including logical cache optimization, according to some embodiments.

FIG. 15B illustrates an example of global optimization of a service-oriented system, including logical cache optimization, according to some embodiments. A service-oriented system 1460 may implement a service-oriented architecture and may include a plurality of hosts, such as hosts 210A, 210B, and 210N. Each host may run one or more services. For example, as shown in FIG. 15B, host 210A may run one or more instances of service 110A, host 210B may run one or more instances of service 110B, and host 210N may run one or more instances of service 110N. It is contemplated that the service-oriented system 1460 and/or optimization system 1350 may include additional components not shown, fewer components than shown, or different combinations, configurations, or quantities of the components shown.

Based on the optimized cache configuration 187 determined by the optimizer 180, one or more caches may be enabled and/or configured in the service-oriented system 1460. As discussed with respect to FIG. 14, a configuration controller 1420 may implement a configuration functionality (potentially in conjunction with other components) to enable caches in various locations and/or change the configuration of the caches. As shown in the example of FIG. 15B, a logical cache 1412 may provide cached data from data source 1431 to a plurality of services. However, the services that use the logical cache 1412 may use different configurations. For example, service 110A may use one configuration 1413A for the logical cache 1412, and service 110N may use a different configuration 1413N for the logical cache 1412. The different cache configurations 1413A and 1413N may enable different cache sizes, policies, or other configuration options. In one embodiment, elements of the logical cache 1412 may be located on host 210A, host 210N, and/or other locations. In one embodiment, the use of a cache (e.g., cache 1412) may not be specified in the program code for a service (e.g., service 110A or 110N) that is linked to the cache in the global optimization plan 1386.

Figure 15C:
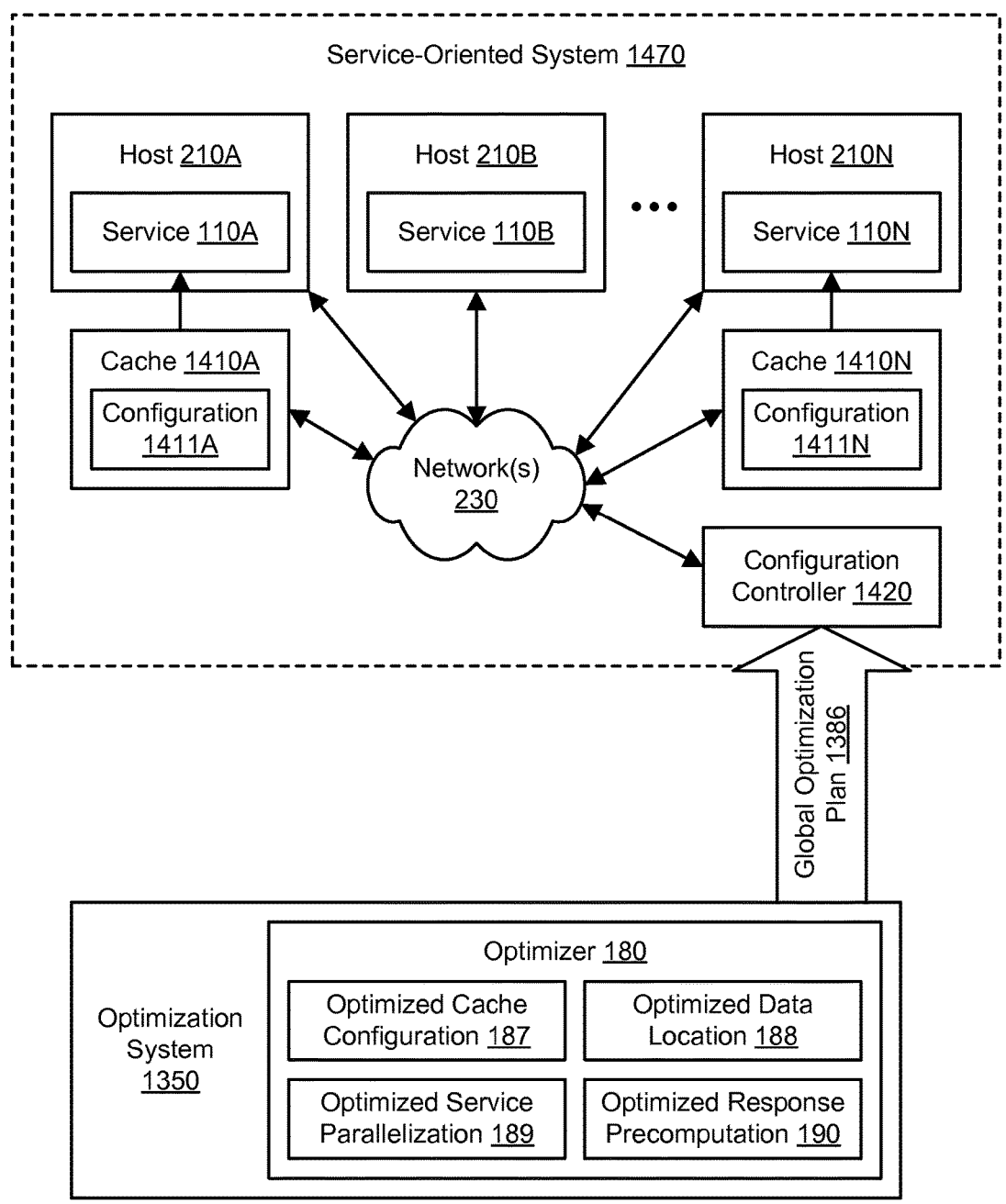
FIG. 15C illustrates an example of global optimization of a service-oriented system, including distributed cache optimization, according to some embodiments.

FIG. 15C illustrates an example of global optimization of a service-oriented system, including distributed cache optimization, according to some embodiments. A service-oriented system 1470 may implement a service-oriented architecture and may include a plurality of hosts, such as hosts 210A, 210B, and 210N. Each host may run one or more services. For example, as shown in FIG. 15B, host 210A may run one or more instances of service 110A, host 210B may run one or more instances of service 110B, and host 210N may run one or more instances of service 110N. It is contemplated that the service-oriented system 1470 and/or optimization system 1350 may include additional components not shown, fewer components than shown, or different combinations, configurations, or quantities of the components shown.

Based on the optimized cache configuration 187 determined by the optimizer 180, one or more caches may be enabled and/or configured in the service-oriented system 1470. As discussed with respect to FIG. 14, a configuration controller 1420 may implement a configuration functionality (potentially in conjunction with other components) to enable caches in various locations and/or change the configuration of the caches. The caches may be distributed caches that are implemented using a plurality of networked components. As shown in the example of FIG. 15C, a distributed cache 1410A may be enabled for service 110A with a particular configuration 1411A. Similarly, a distributed cache 1410N may be enabled for service 110N with a particular configuration 1411N. The distributed cache 1410A may be located (at least partially) off of host 210A, and the distributed cache 1410N may be located (at least partially) off of host 210N. In addition to varying in location, the caches 1410A and 1410N may vary in type, level, size, and/or policy, based on the optimized cache configuration 187. In one embodiment, the use of a cache (e.g., cache 1410A) may not be specified in the program code for a service (e.g., service 110A) that is linked to the cache in the global optimization plan 1386.

Figure 15D:
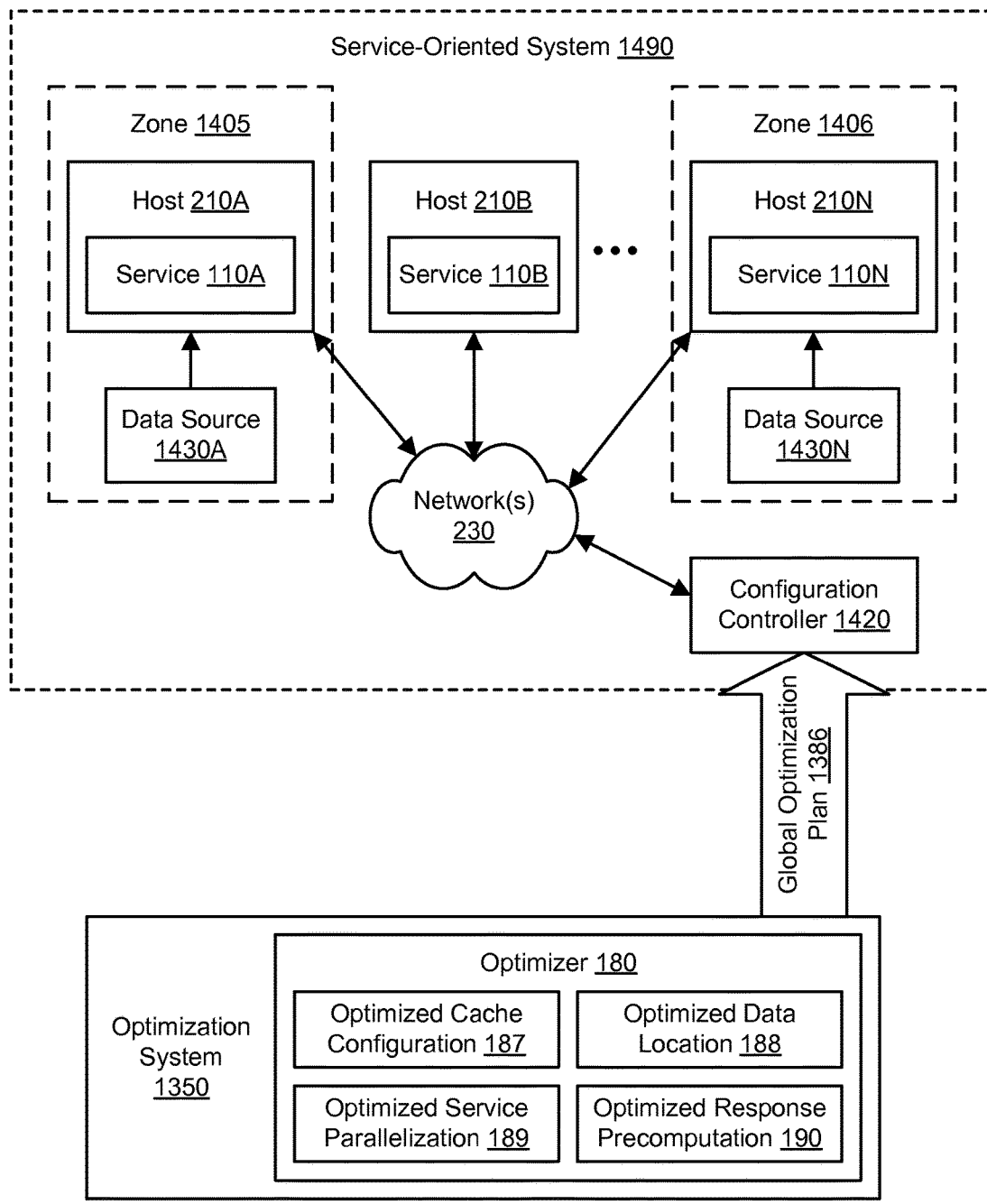
FIG. 15D illustrates an example of global optimization of a service-oriented system, including data location optimization, according to some embodiments.

FIG. 15D illustrates an example of global optimization of a service-oriented system, including data location optimization, according to some embodiments. A service-oriented system 1490 may implement a service-oriented architecture and may include a plurality of hosts, any of which may be implemented by the example computing device 3000 illustrated in FIG. 28. The hosts may be coupled using one or more networks 230. Although three hosts 210A, 210B, and 210N are illustrated for purposes of example, it is contemplated that any suitable number of hosts may be used with the service-oriented system 1490. The hosts 210A-210N may be located in any suitable number of data centers and/or geographical locations. In one embodiment, individual hosts may be added to or subtracted from the service-oriented system 1490, e.g., based on the computing resources required to run a particular set of services with a desired level of performance. Each host may run one or more services. For example, as shown in FIG. 15D, host 210A may run one or more instances of service 110A, host 210B may run one or more instances of service 110B, and host 210N may run one or more instances of service 110N. In one embodiment, multiple services and/or instances of the same service may be implemented using the same host. It is contemplated that the service-oriented system 1490 and/or optimization system 1350 may include additional components not shown, fewer components than shown, or different combinations, configurations, or quantities of the components shown.

Based on the optimized data location 188 determined by the optimizer 180, locations for one or more data sources may be configured in the service-oriented system. As discussed with respect to FIG. 14, a configuration controller 1420 may implement a configuration functionality (potentially in conjunction with other components) to change the location and/or configuration of the data sources. As shown in the example of FIG. 15D, a data source 1430A may be provided for service 110A on host 210A. The data source 1430A may be located in the same zone 1405 as the service 110A in order to optimize the performance and/or cost of the service 110A using the data source 1430A. Similarly, a data source 1430N may be provided for service 110N on host 210N. The data source 1430N may be located in the same zone 1406 as the service 110N in order to optimize the performance and/or cost of the service 110N using the data source 1430N. In one embodiment, the use of a particular data source (e.g., data source 1430A) may not be specified in the program code for a service (e.g., service 110A) that is linked to the data source in the global optimization plan 1386.

Figure 15E:
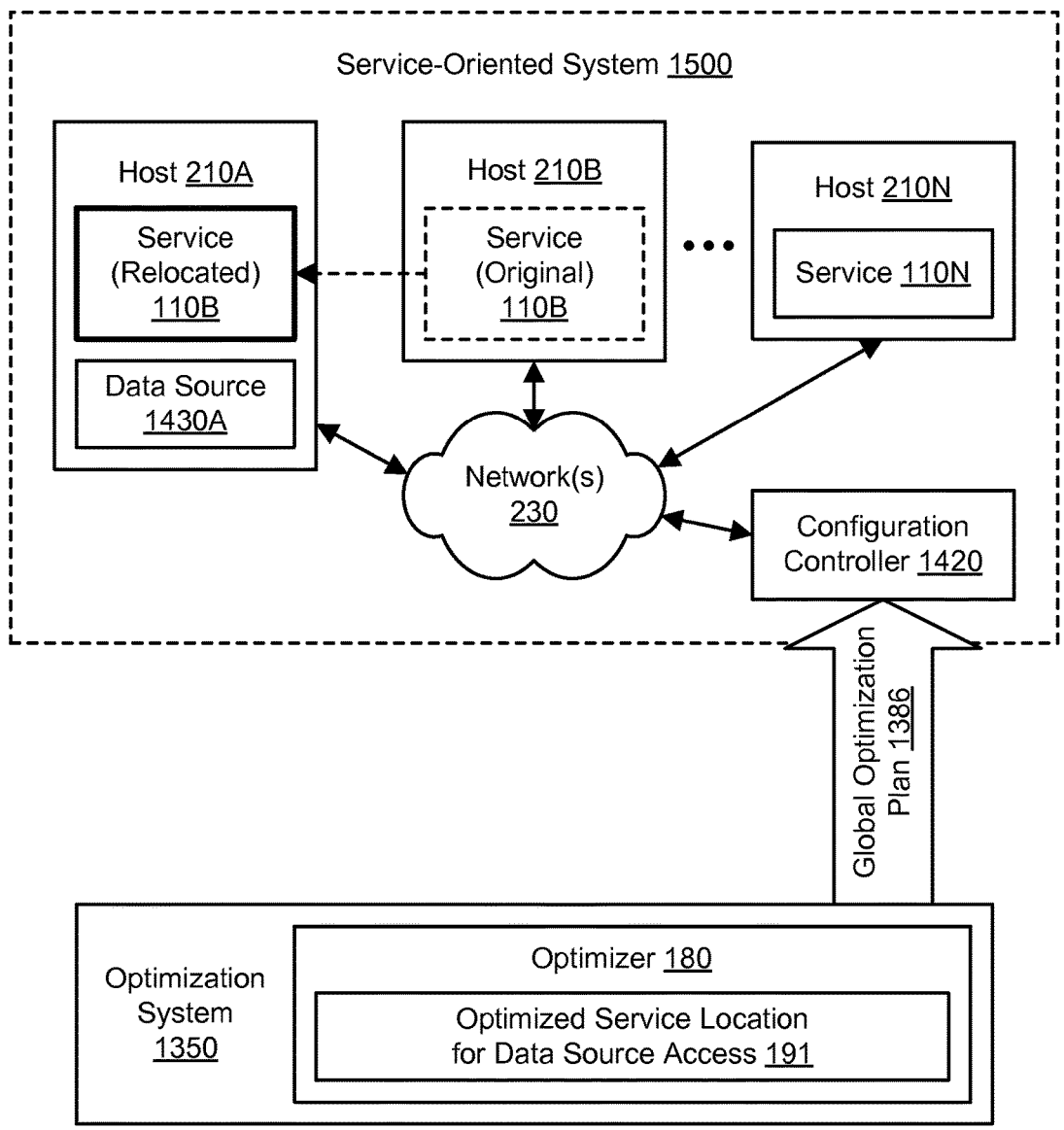
FIG. 15E illustrates an example of global optimization of a service-oriented system, including service location optimization for data source access, according to some embodiments.

FIG. 15E illustrates an example of global optimization of a service-oriented system, including service location optimization for data source access, according to some embodiments. A service-oriented system 1500 may implement a service-oriented architecture and may include a plurality of hosts, any of which may be implemented by the example computing device 3000 illustrated in FIG. 28. The hosts may be coupled using one or more networks 230. Although three hosts 210A, 210B, and 210N are illustrated for purposes of example, it is contemplated that any suitable number of hosts may be used with the service-oriented system 1500. The hosts 210A-210N may be located in any suitable number of data centers and/or geographical locations. In one embodiment, individual hosts may be added to or subtracted from the service-oriented system 1500, e.g., based on the computing resources required to run a particular set of services with a desired level of performance. Each host may run one or more services. For example, as shown in FIG. 15E, host 210B may originally run one or more instances of service 110B, and host 210N may run one or more instances of service 110N. In one embodiment, multiple services and/or instances of the same service may be implemented using the same host. It is contemplated that the service-oriented system 1500 and/or optimization system 1350 may include additional components not shown, fewer components than shown, or different combinations, configurations, or quantities of the components shown.

In one embodiment, the optimizer 180 may include a functionality 191 for optimizing service location for data source access. Using inputs such as the performance metrics 165, cost metrics 166, and/or call graph(s) 175, the service location optimization functionality 191 may determine new locations for one or more services to optimize the access of those services to one or more data sources. For example, the optimizer 180 may determine that an instance of service 110B should be installed on the same host 210A as a data source 1430A that the service 110B uses as input. In one embodiment, the original instance of the service 110B may be removed from its original host 210B. As discussed with respect to FIG. 14, a configuration controller 1420 may implement a configuration functionality (potentially in conjunction with other components) to change the location and/or configuration of the service 110B for optimized access to the data source 1430A. The relocated service 110B may be located on the same host as the data source 1430A in order to optimize the performance and/or cost of the service 110B and/or the data source 1430A. In one embodiment, the use of a particular data source (e.g., data source 1430A) may not be specified in the program code for a service (e.g., service 110B) that is linked to the data source in the global optimization plan 1386.

Figure 15F:
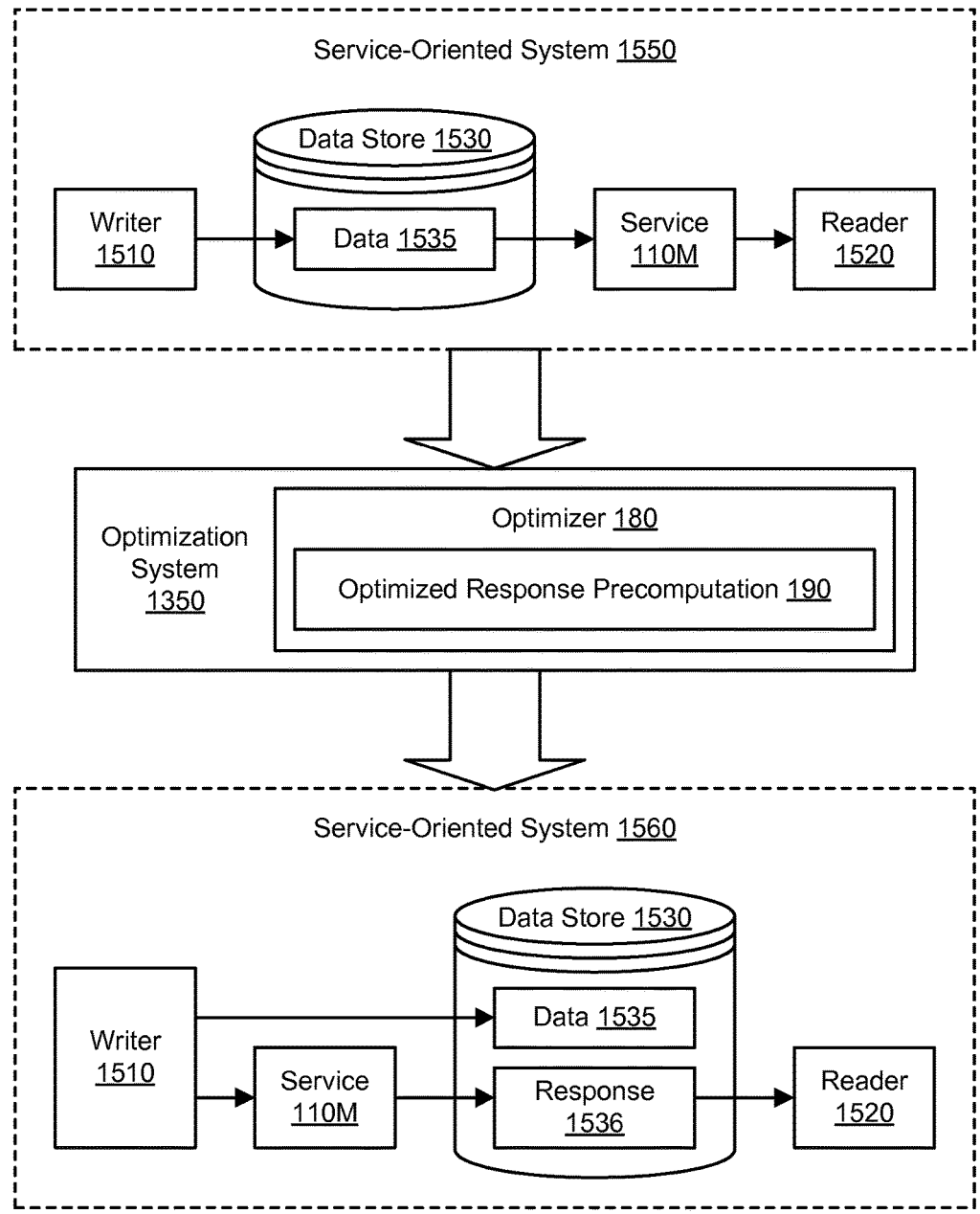
FIG. 15F illustrates an example of global optimization of a service-oriented system, including optimization of response precomputation, according to some embodiments.

FIG. 15F illustrates an example of global optimization of a service-oriented system, including optimization of response precomputation, according to some embodiments. Using the optimized response precomputation functionality 190, the optimization system may analyze a service-oriented system 1550 and generate an optimized version of the service-oriented system 1560. In the initial state of the service-oriented system 1550, a writer component (e.g., a service) may modify data 1535 and store the data in a data store 1530. Upon request from a reader component 1520 (e.g., another service), a service 110M may retrieve the data 1535 from the data store, compute a response by modifying or otherwise processing the data, and send the response to the reader.

The optimization system 1350 may determine an optimized configuration for the service-oriented system in which the response from the service 110M is computed before the reader 1520 requests the response. Accordingly, in the optimized version of the service-oriented system 1560, the service 110M may be notified proactively when the writer 1510 changes the data 1535. The service 110M may read the data 1535 (e.g., from the writer 1510 or from the data store 1530) and precompute a response 1536 by modifying or otherwise processing the data. The service 110M may store the precomputed response 1536 in the data store 1530. When the reader 1520 requests the response 1536, the precomputed response 1536 may be provided to the reader 1520 without additional computation on the data 1535. In the optimized version of the service-oriented system 1560, the update of the data 1535 along with the computation (by service 110M) and the storage of the response 1536 may be wrapped in a transaction, e.g., to preserve the semantics present in the original system 1550. In one embodiment, the transaction may be skipped if possible, e.g., if the transactional guarantee is not required. In one embodiment, if response 1536 is older than the data 1535, then the original service 110M may be used to compute a fresh value. In this manner, the performance and/or cost of the service-oriented system may be improved.

Figure 16:
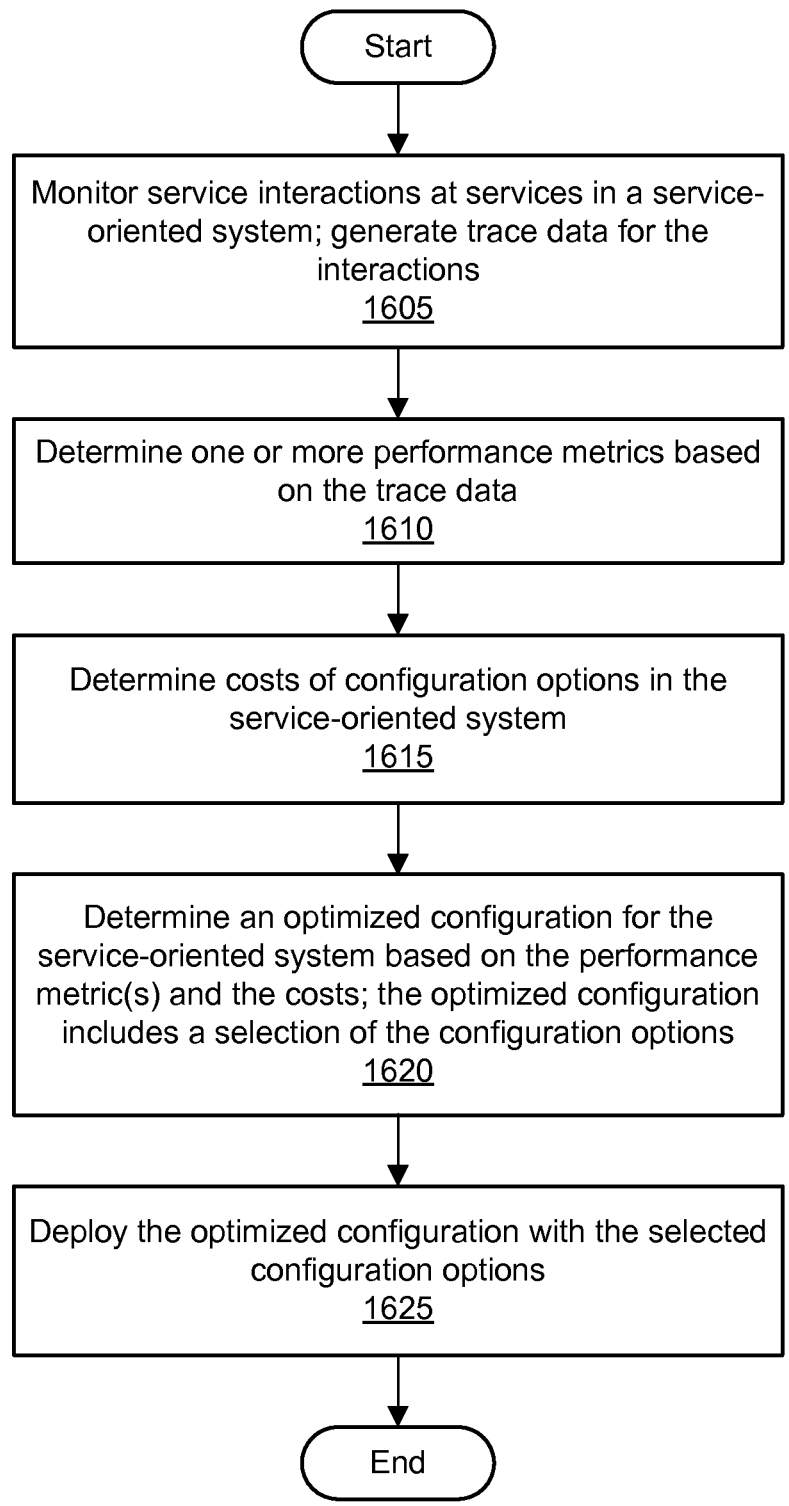
FIG. 16 is a flowchart illustrating a method for global optimization of a service-oriented system, according to some embodiments.

FIG. 16 is a flowchart illustrating a method for global optimization of a service-oriented system, according to some embodiments. As shown in 1605, service interactions may be monitored at services in a service-oriented system, and trace data describing the interactions may be generated. As shown in 1610, one or more performance metrics may be determined based on the trace data. The performance metrics may relate to any suitable elements of the service-oriented system, including services, hosts, and other components. As shown in 1615, the costs of various configuration options in the service-oriented system may be determined. Each of the configuration options may include a configuration parameter and a value for that configuration parameter.

As shown in 1620, an optimized configuration may be determined for the service-oriented system based on the costs and the performance metrics. The optimized configuration may include a selection of one or more of the plurality of configuration options. The optimized configuration may improve at least one performance metric and/or at least one cost across at least a portion of the service-oriented system. The optimized configuration may be determined using an automated optimizer or other automated process. The automated optimization may be performed automatically (e.g., without being directly prompted by user input) and/or programmatically (e.g., according to program instructions). As shown in 1625, the optimized configuration may be deployed to the service-oriented system. In one embodiment, one or more of the operations shown in FIG. 16, such as the operations shown in 1620 and 1625, may be performed a plurality of times (e.g., over an interval of time) to further refine the optimized configuration of the service-oriented system.

Edge Relocation

Figure 17A:
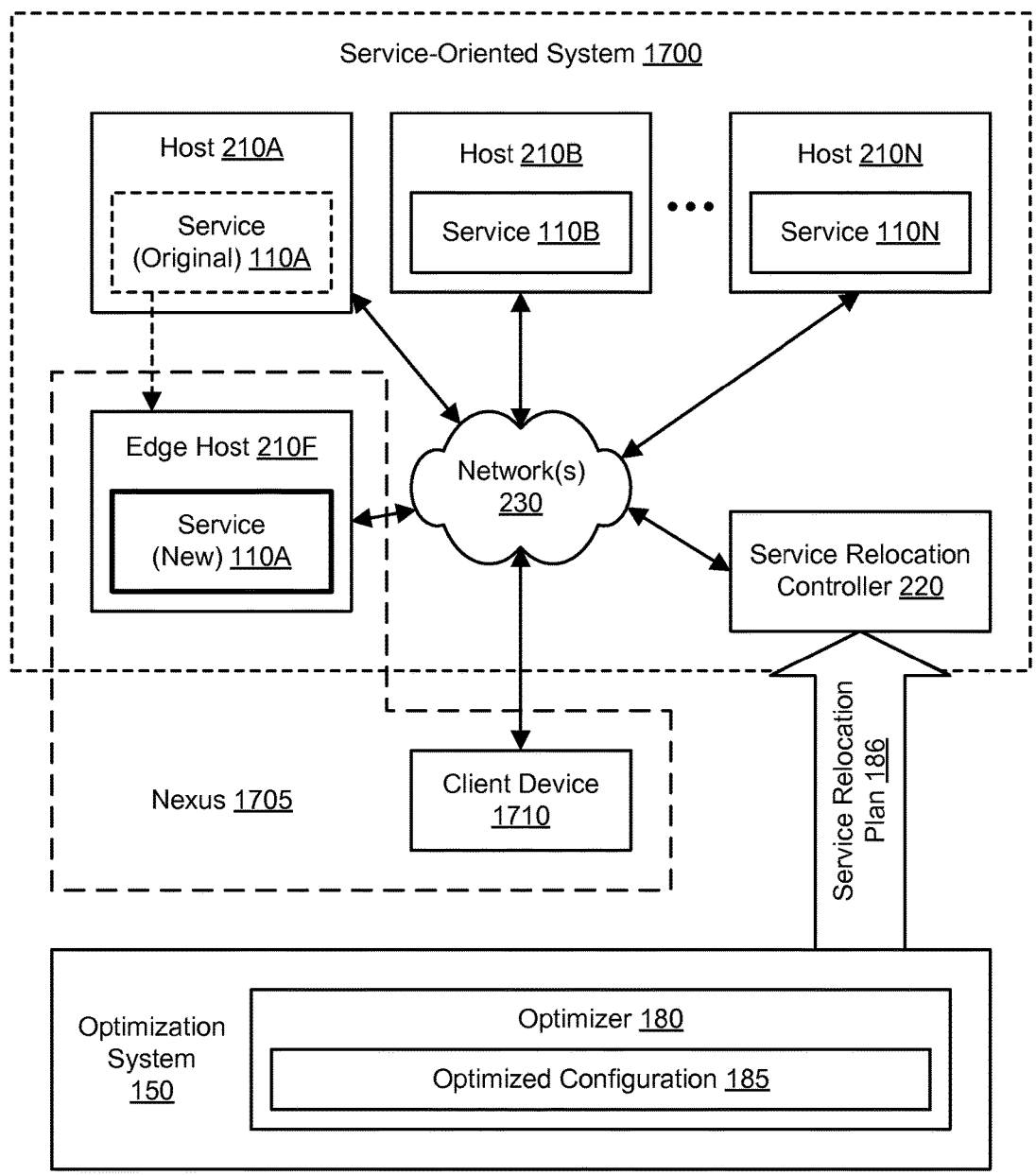
FIG. 17A illustrates an example system environment for service-oriented system optimization using edge relocation, according to some embodiments.

FIG. 17A illustrates an example system environment for service-oriented system optimization using edge relocation, according to some embodiments. A service-oriented system 1700 may implement a service-oriented architecture and may include a plurality of hosts, any of which may be implemented by the example computing device 3000 illustrated in FIG. 28. The hosts may be coupled using one or more networks 230. Although four hosts 210A, 210B, 210F, and 210N are illustrated for purposes of example, it is contemplated that any suitable number of hosts may be used with the service-oriented system 1700. In one embodiment, host 210F may be physically located within the same nexus 1705 as one or more client devices, such as client device 1710. Hosts 210A, 210B, and 210N may be located outside the nexus 1705. The nexus 1705 may represent a geographical area having closer proximity to the client device 1710 and/or a network configuration or other logical arrangement having lower latency for traffic with the client device 1710 in comparison to the locations of the other hosts 210A, 210B, and 210N. Due to its proximity to the client device 1710, the host 210F may be referred to as an edge host.

In one embodiment, individual hosts may be added to or subtracted from the service-oriented system 1700, e.g., based on the computing resources required to run a particular set of services with a desired level of performance. Each host may run one or more services. For example, as shown in FIG. 17A, host 210A may originally run an instance of service 110A, host 210B may run an instance of service 110B, and host 210N may run an instance of service 110N. In one embodiment, multiple services and/or instances of the same service may be implemented using the same host. It is contemplated that the service-oriented system 1700 and/or optimization system 150 may include additional components not shown, fewer components than shown, or different combinations, configurations, or quantities of the components shown.

In some embodiments, the hosts 210A-210N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 28.

In one embodiment, a suitable component of the service-oriented system 1700 may provision and/or configure the hosts 210A-210N. For example, the hosts 210A-210N may be provisioned from a pool of available compute instances by selecting available compute instances with suitable specifications and configuring the selected compute instances with suitable software. In one embodiment, additional compute instances may be added to the service-oriented system 1700 as needed. In one embodiment, compute instances may be returned to the pool of available compute instances from service-oriented system 1700, e.g., if the computing instances are not needed at a particular point in time. Additionally, the software installed on the hosts may be modified. A service relocation controller 220 may implement such a provisioning and configuration functionality (potentially in conjunction with other components) to cause one or more hosts to be added to the service-oriented system 1700, cause one or more hosts to be removed from the service-oriented system 1700, cause one or more services to be removed from one or more hosts, and/or cause one or more services to be added to one or more hosts. The service relocation controller 220 may be implemented by the example computing device 3000 illustrated in FIG. 28 and may be implemented as a physical compute instance or virtual compute instance.

The number of hosts and/or configuration of the hosts may be modified in accordance with the optimized configuration 185. In one embodiment, the number and/or configuration of the hosts may be modified dynamically, e.g., while the service-oriented system 1700 remains operational to serve requests. Based on the trace data, the optimization system 150 may generate an optimized configuration 185 in which the original instance of the service 110A does not run on host 210A. The optimized configuration 185 may instead indicate that another instance of the service 110A should run on the edge host 210F. In accordance with the optimized configuration 185, the service-oriented system 1700 may be modified to relocate or migrate the service 110A from the original host 210A to the edge host 210F. Due to the increased proximity of edge host 210F to the client device 1710, the relocation of the service 110A may yield performance and/or cost improvements such as lower latency for network traffic between the service-oriented system 1700 and the client device 1710.

In one embodiment, the optimization system 150 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. Using the service relocation plan 186, the service relocation controller 220 may implement the relocation or migration of one or more services, such as service 110A. Accordingly, the service relocation controller 220 may provision the edge host 210F (if necessary) and add the new instance of the service 110A to the edge host 210F. In one embodiment, the edge host 210F may be part of a content delivery network (CDN) that is closer to users (e.g., in terms of network latency and/or geography) than the other hosts 210A, 210B, and 210N in the service-oriented system 1700. Access to the CDN may be leased by the operator of the service-oriented system 1700 prior to the relocation of the service 110A.

Additionally, if so indicated in the service relocation plan 186, the service relocation controller 220 may remove the original instance of the service 110A from the host 210A. In some scenarios, however, the original instance of the service 110A on host 210A may be left in place to run in parallel with the new instance of the service 110A on host 210C. In one embodiment, a service (e.g., service 110A) may include multiple components that may run independently, and only a portion of the service may be relocated based on the optimized configuration 185. For example, as discussed above, a partial service may be generated based on frequently used code in original service 110A, and that partial service may be deployed to the edge host 210F rather than the original service. In one embodiment, the host 210A may be removed from the service-oriented system 1700 and returned to the pool of available hosts if it no longer provides any services after removal of the original instance of the service 110A. The service relocation controller 220 may also perform any steps needed to inform other services of the location of the new instance of the service 110A. In this manner, the service-oriented system 1700 may be reconfigured to provide improved performance (e.g., improved transit times, throughput, or reliability) or to be implemented at an improved cost.

In one embodiment, for further performance improvements, a service or partial service may also be relocated to the client device 1710 in addition to the relocation to the edge host 210F. In one embodiment, program code for the relocated service(s) may be translated to a format executable on the edge host 210F. In one embodiment, execution on the edge host may be more expensive than execution on one of the other hosts in the service-oriented system. However, the cost of sending data from the edge host 210F to the client device 1710 may be lower than the cost of sending the same data from one of the other hosts to the client device 1710. Accordingly, the optimized configuration, including the relocation of the service to the edge host 210F, may be determined based on a balancing of the estimated cost of executing the relocated service on the edge host and the estimated cost of sending data to the client device 1710. The optimized configuration, including the relocation of the service to the edge host 210F, may also be determined based on a security risk analysis of executing the relocated service on the edge host.

Figure 17B:
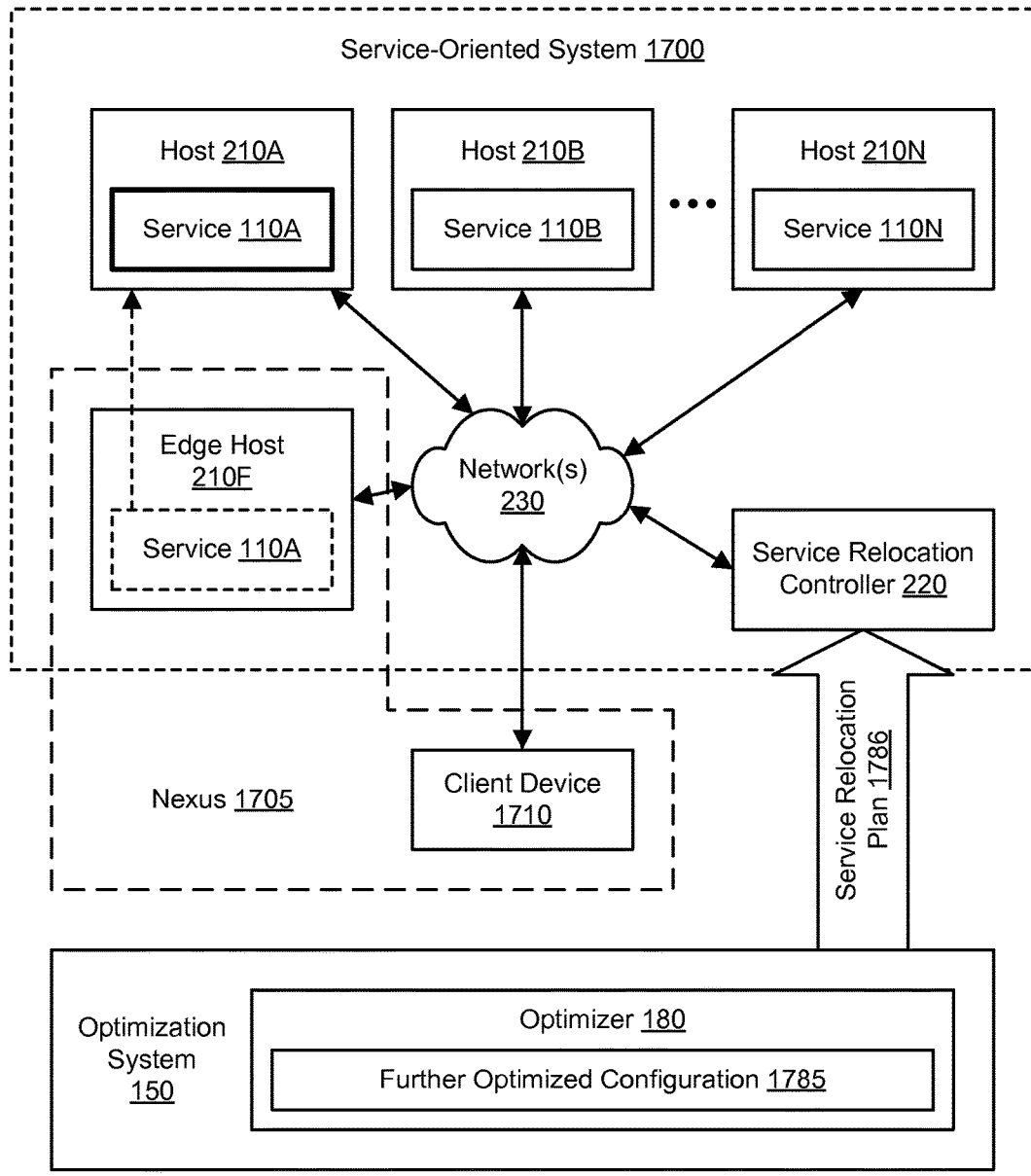
FIG. 17B illustrates further aspects of an example system environment for service-oriented system optimization using edge relocation, according to some embodiments.

FIG. 17B illustrates further aspects of an example system environment for service-oriented system optimization using edge relocation, according to some embodiments. In one embodiment, the service previously relocated to the edge host 210F may be moved back to the original host 210A (or to any of the other hosts in the service-oriented system 1700) to implement further optimization. For example, additional trace data may be collected, and a further optimized configuration 1785 may be determined by the optimizer 180 based on the additional trace data. Based on the further optimized configuration 1785, the optimization system 150 may generate another service relocation plan 1786 which indicates that an instance of the service 110A should be deployed to a non-edge server such as host 210A. If conditions have changed since implementing the optimized configuration 185, then implementing the further optimized configuration 1785 to relocate the service 110A back to the host 210A may improve a performance metric and/or cost in the service-oriented system 1700.

The number of hosts and/or configuration of the hosts may be modified in accordance with the further optimized configuration 1785. In one embodiment, the number and/or configuration of the hosts may be modified dynamically, e.g., while the service-oriented system 1700 remains operational to serve requests. Based on the additional trace data, the optimization system 150 may generate an optimized configuration 1785 in which the original instance of the service 110A does not run on edge host 210F. The optimized configuration 1785 may instead indicate that another instance of the service 110A should run on the non-edge host 210A. In accordance with the optimized configuration 1785, the service-oriented system 1700 may be modified to relocate or migrate the service 110A from the edge host 210F to the host 210A. Due to changed conditions since the original relocation, the further relocation of the service 110A may yield performance and/or cost improvements.

In one embodiment, the optimization system 150 may generate a service relocation plan 1786 based on the optimized configuration 1785 and send the plan to the service relocation controller 220. The service relocation plan 1786 may include an indication of the original location and/or host and the new location and/or host for each service whose location or host is modified in the optimized configuration 1785. Using the service relocation plan 1786, the service relocation controller 220 may implement the relocation or migration of one or more services, such as service 110A. Accordingly, the service relocation controller 220 may provision the host 210A (if necessary) and add the new instance of the service 110A to the host 210A.

Additionally, if so indicated in the service relocation plan 1786, the service relocation controller 220 may remove the original instance of the service 110A from the edge host 210F. In some scenarios, however, the original instance of the service 110A on host 210F may be left in place to run in parallel with the new instance of the service 110A on host 210A. In one embodiment, a service (e.g., service 110A) may include multiple components that may run independently, and only a portion of the service may be relocated based on the optimized configuration 1785. For example, as discussed above, a partial service may be generated based on frequently used code in original service 110A, and that partial service may be deployed to the edge host 210A rather than the original service. In one embodiment, the host 210F may be removed from the service-oriented system 1700 and returned to the pool of available hosts if it no longer provides any services after removal of the original instance of the service 110A. The service relocation controller 220 may also perform any steps needed to inform other services of the location of the new instance of the service 110A. In this manner, the service-oriented system 1700 may be reconfigured to provide improved performance (e.g., improved transit times, throughput, or reliability) or to be implemented at an improved cost.

Figure 18:
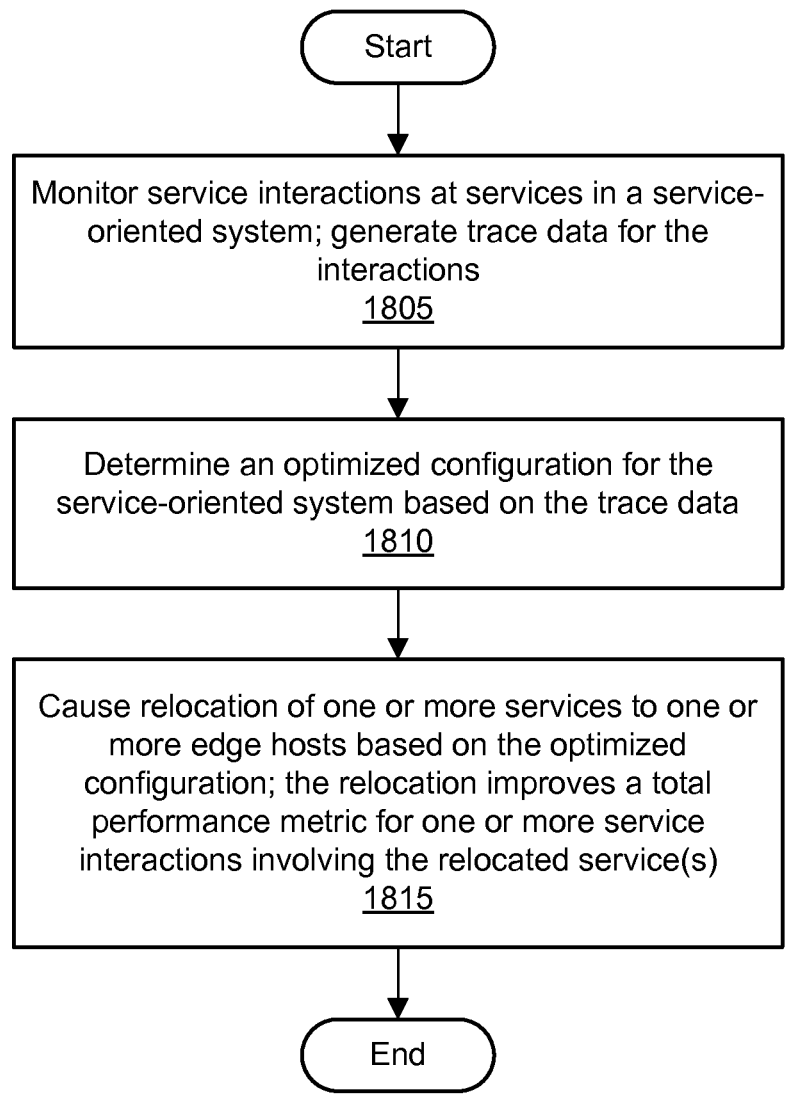
FIG. 18 is a flowchart illustrating a method for service-oriented system optimization using edge relocation, according to some embodiments.

FIG. 18 is a flowchart illustrating a method for service-oriented system optimization using edge relocation, according to some embodiments. As shown in 1805, service interactions may be monitored at services in a service-oriented system, and trace data describing the interactions may be generated. As shown in 1810, an optimized configuration for the service-oriented system may be determined based on the trace data. As shown in 1815, one or more of the services may be relocated to one or more edge hosts based on the optimized configuration. The relocation may improve a total performance metric for at least a portion of the service-oriented system. For example, the relocation may improve a total performance metric for one or more service interactions involving the relocated service(s) and/or the edge host(s).

Client Device Relocation

Figure 19A:
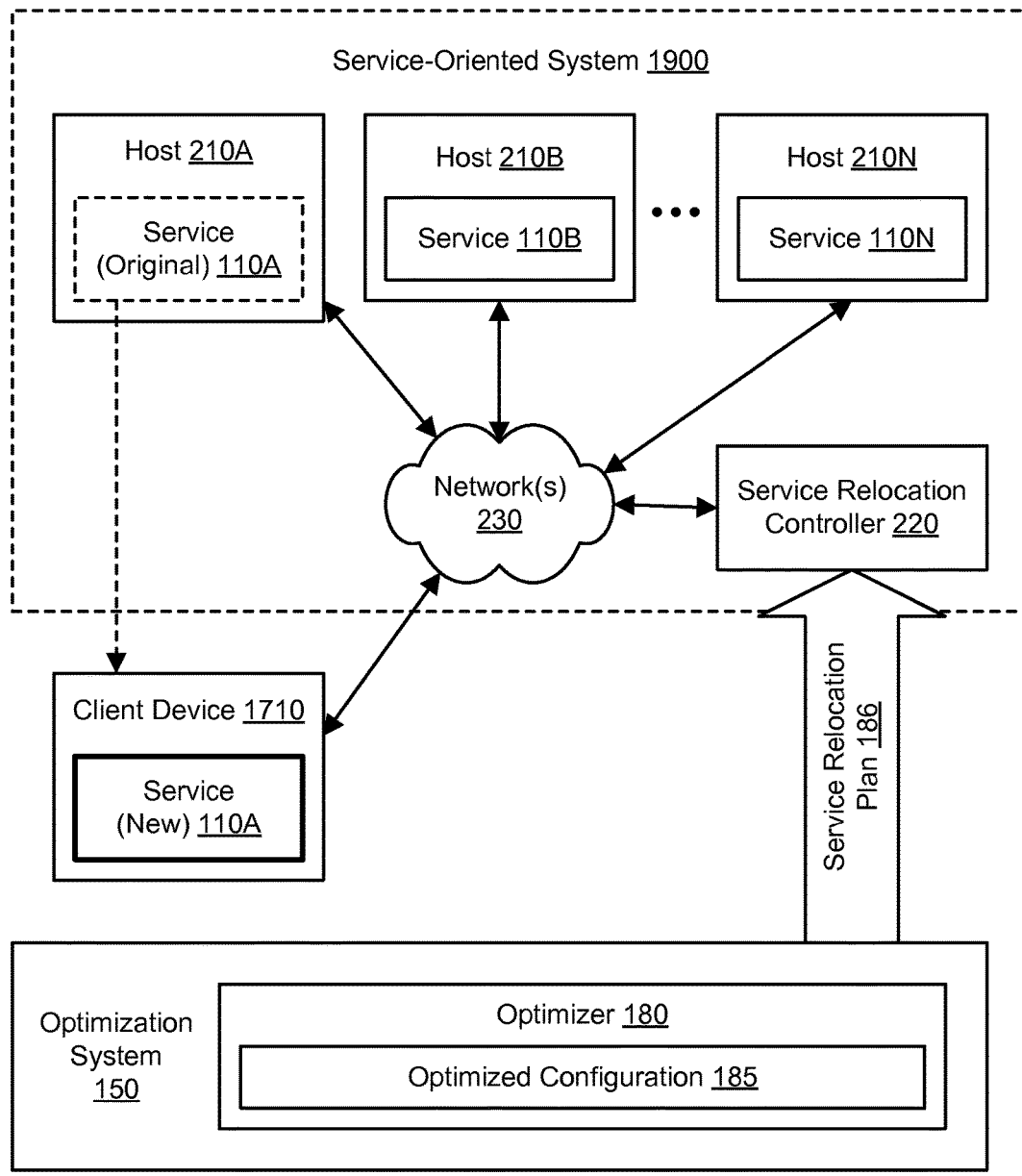
FIG. 19A illustrates an example system environment for service-oriented system optimization using client device relocation, according to some embodiments.

FIG. 19A illustrates an example system environment for service-oriented system optimization using client device relocation, according to some embodiments. A service-oriented system 1900 may implement a service-oriented architecture and may include a plurality of hosts, any of which may be implemented by the example computing device 3000 illustrated in FIG. 28. The hosts may be coupled using one or more networks 230. Although three hosts 210A, 210B, and 210N are illustrated for purposes of example, it is contemplated that any suitable number of hosts may be used with the service-oriented system 1900.

In one embodiment, individual hosts may be added to or subtracted from the service-oriented system 1900, e.g., based on the computing resources required to run a particular set of services with a desired level of performance. Each host may run one or more services. For example, as shown in FIG. 19A, host 210A may originally run an instance of service 110A, host 210B may run an instance of service 110B, and host 210N may run an instance of service 110N. In one embodiment, multiple services and/or instances of the same service may be implemented using the same host. It is contemplated that the service-oriented system 1900 and/or optimization system 150 may include additional components not shown, fewer components than shown, or different combinations, configurations, or quantities of the components shown.

In some embodiments, the hosts 210A-210N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 28.

In one embodiment, a suitable component of the service-oriented system 1900 may provision and/or configure the hosts 210A-210N. For example, the hosts 210A-210N may be provisioned from a pool of available compute instances by selecting available compute instances with suitable specifications and configuring the selected compute instances with suitable software. In one embodiment, additional compute instances may be added to the service-oriented system 1900 as needed. In one embodiment, compute instances may be returned to the pool of available compute instances from service-oriented system 1900, e.g., if the computing instances are not needed at a particular point in time. Additionally, the software installed on the hosts may be modified. A service relocation controller 220 may implement such a provisioning and configuration functionality (potentially in conjunction with other components) to cause one or more hosts to be added to the service-oriented system 1900, cause one or more hosts to be removed from the service-oriented system 1900, cause one or more services to be removed from one or more hosts, and/or cause one or more services to be added to one or more hosts. The service relocation controller 220 may be implemented by the example computing device 3000 illustrated in FIG. 28 and may be implemented as a physical compute instance or virtual compute instance.

The number of hosts and/or configuration of the hosts may be modified in accordance with the optimized configuration 185. In one embodiment, the number and/or configuration of the hosts may be modified dynamically, e.g., while the service-oriented system 1900 remains operational to serve requests. Based on the trace data, the optimization system 150 may generate an optimized configuration 185 in which the original instance of the service 110A does not run on host 210A. The optimized configuration 185 may instead indicate that another instance of the service 110A should run on a client device 1710. In accordance with the optimized configuration 185, the service-oriented system 1900 may be modified to relocate or migrate the service 110A from the original host 210A to the client device 1710. The relocation of the service 110A to the client device 1710 may yield performance and/or cost improvements for service interactions involving the relocated service on the client device 1710. In one embodiment, the relocation of the service 110A to the client device 1710 may produce an improved user experience.

In one embodiment, the optimization system 150 may generate a service relocation plan 186 based on the optimized configuration 185 and send the plan to the service relocation controller 220. The service relocation plan 186 may include an indication of the original location and/or host and the new location and/or host for each service whose location or host is modified in the optimized configuration 185. Using the service relocation plan 186, the service relocation controller 220 may implement the relocation or migration of one or more services, such as service 110A. Accordingly, the service relocation controller 220 may take any suitable measures to add the new instance of the service 110A to the client device 1710. For example, the new instance of the service 110A may be included with a software update released through an app store or other software marketplace. In one embodiment, the new instance of the service 110A may be deployed to the client device 1710 in a manner that does not violate user expectations regarding software installation. For example, the software update may be manually downloaded by a user of the client device 1710. As another example, the new instance of the service 110A may be automatically downloaded to the client device 1710 if a user of the client device 1710 has affirmatively opted in to receive automatic software updates.

In one embodiment, the functionality of the service 110A may be initially included in software deployed to the client device 1710, but the functionality of the service 110A may be disabled upon installation. However, the functionality of the service 110A may be enabled on the client device 1710 at any suitable time, such as when the optimized configuration 185 indicates that the service 110A should be relocated to the client device 1710. Similarly, the functionality of the service 110A may be disabled on the client device 1710 at any suitable time.

Additionally, if so indicated in the service relocation plan 186, the service relocation controller 220 may remove the original instance of the service 110A from the host 210A. In some scenarios, however, the original instance of the service 110A on host 210A may be left in place to run in parallel with the new instance of the service 110A on the client device 1710. In one embodiment, a service (e.g., service 110A) may include multiple components that may run independently, and only a portion of the service may be relocated based on the optimized configuration 185. For example, as discussed above, a partial service may be generated based on frequently used code in original service 110A, and that partial service may be deployed to the client device 1710 rather than the original service. In one embodiment, the host 210A may be removed from the service-oriented system 1900 and returned to the pool of available hosts if it no longer provides any services after removal of the original instance of the service 110A. The service relocation controller 220 may also perform any steps needed to inform other services of the location of the new instance of the service 110A. In this manner, the service-oriented system 1900 may be reconfigured to provide improved performance (e.g., improved transit times, throughput, or reliability) or to be implemented at an improved cost.

In one embodiment, for further performance improvements, a service or partial service may also be relocated to an edge host in addition to the relocation to the client device 1710. In one embodiment, program code for the relocated service(s) may be translated to a format executable on the client device 1710. The optimized configuration, including the relocation of the service to the client device 1710, may be determined based on an estimated cost of executing the relocated service (and optionally one or more other services) on the client device 1710 and/or transmitting data to or from the client device 1710. The optimized configuration, including the relocation of the service to the client device 1710, may be determined based on a security risk analysis of executing the relocated service on the client device 1710.

In one embodiment, one or more services may be deployed to a set of client devices that may interact with one another. For example, the set of client devices may be managed by a single user. The set of client devices may include different types of devices, including various types of mobile devices, desktop computers, etc. In one embodiment, the one or more services on the set of client devices may share state and/or otherwise collaborate with one another to provide functionality across the set of client devices in an optimized manner.

Figure 19B:
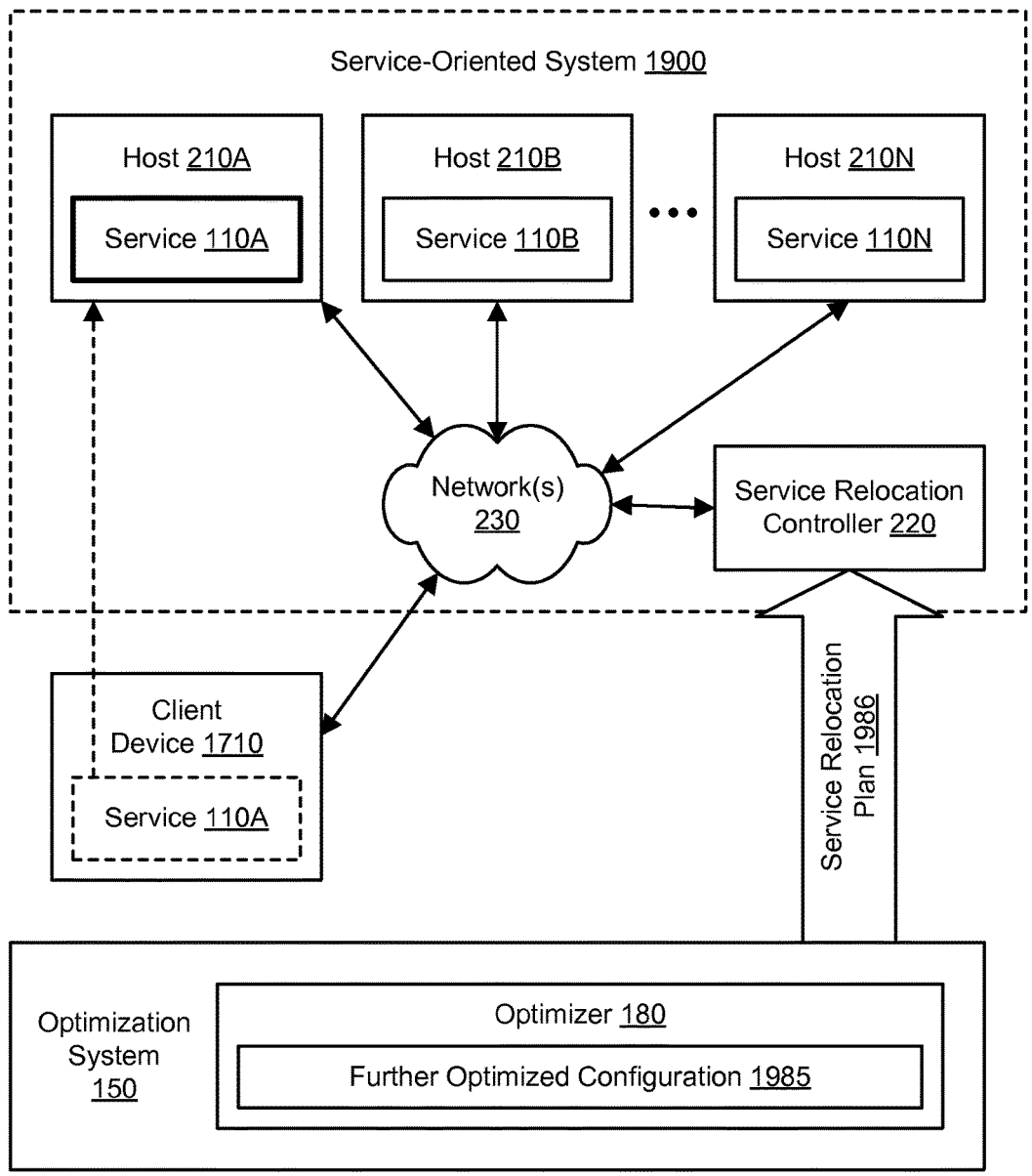
FIG. 19B illustrates further aspects of an example system environment for service-oriented system optimization using client device relocation, according to some embodiments.

FIG. 19B illustrates further aspects of an example system environment for service-oriented system optimization using client device relocation, according to some embodiments. In one embodiment, the service previously relocated to the client device 1710 may be moved back to the original host 210A (or to any of the other hosts in the service-oriented system 1900) to implement further optimization. For example, additional trace data may be collected, and a further optimized configuration 1985 may be determined by the optimizer 180 based on the additional trace data. Based on the further optimized configuration 1985, the optimization system 150 may generate another service relocation plan 1986 which indicates that an instance of the service 110A should be deployed to a server such as host 210A. If conditions have changed since implementing the optimized configuration 185, then implementing the further optimized configuration 1985 to relocate the service 110A back to the host 210A may improve a performance metric and/or cost in the service-oriented system 1900.

The number of hosts and/or configuration of the hosts may be modified in accordance with the further optimized configuration 1985. In one embodiment, the number and/or configuration of the hosts may be modified dynamically, e.g., while the service-oriented system 1900 remains operational to serve requests. Based on the trace data, the optimization system 150 may generate an optimized configuration 1985 in which the original instance of the service 110A does not run on the client device 1710. The further optimized configuration 1985 may instead indicate that another instance of the service 110A should run on the host 210A. In accordance with the further optimized configuration 1985, the service-oriented system 1900 may be modified to relocate or migrate the service 110A from the client device 1710 to the host 210A. Due to changed conditions since the original relocation, the further relocation of the service 110A may yield performance and/or cost improvements.

In one embodiment, the optimization system 150 may generate a service relocation plan 1986 based on the optimized configuration 1985 and send the plan to the service relocation controller 220. The service relocation plan 1986 may include an indication of the original location and/or host and the new location and/or host for each service whose location or host is modified in the optimized configuration 1985. Using the service relocation plan 1986, the service relocation controller 220 may implement the relocation or migration of one or more services, such as service 110A. Accordingly, the service relocation controller 220 may provision the host 210A (if necessary) and add the new instance of the service 110A to the host 210A.

Additionally, if so indicated in the service relocation plan 1986, the service relocation controller 220 may remove the original instance of the service 110A from the client device 1710. In some scenarios, however, the original instance of the service 110A on client device 1710 may be left in place to run in parallel with the new instance of the service 110A on host 210A. In one embodiment, a service (e.g., service 110A) may include multiple components that may run independently, and only a portion of the service may be relocated based on the optimized configuration 1985. For example, as discussed above, a partial service may be generated based on frequently used code in original service 110A, and that partial service may be deployed to the host 210A rather than the original service. The service relocation controller 220 may also perform any steps needed to inform other services of the location of the new instance of the service 110A. In this manner, the service-oriented system 1900 may be reconfigured to provide improved performance (e.g., improved transit times, throughput, or reliability) or to be implemented at an improved cost.

Figure 20:
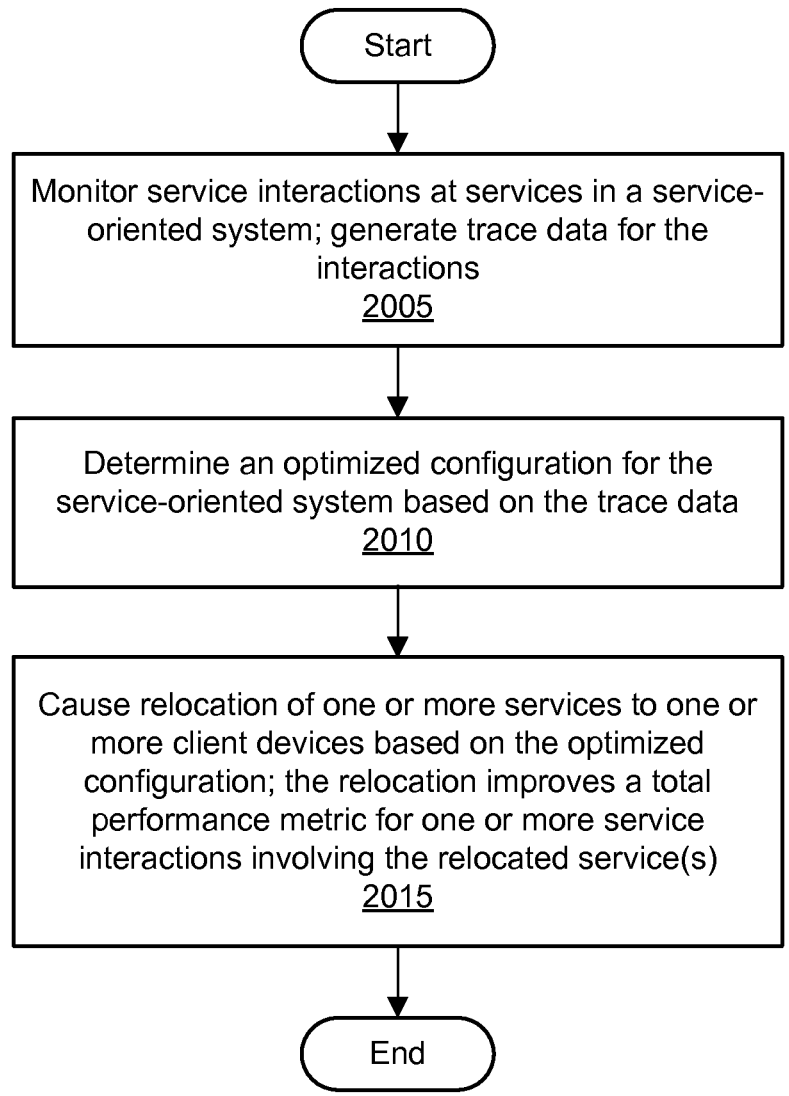
FIG. 20 is a flowchart illustrating a method for service-oriented system optimization using client device relocation, according to some embodiments.

FIG. 20 is a flowchart illustrating a method for service-oriented system optimization using client device relocation, according to some embodiments. As shown in 2005, service interactions may be monitored at services in a service-oriented system, and trace data describing the interactions may be generated. As shown in 2010, an optimized configuration for the service-oriented system may be determined based on the trace data. As shown in 2015, one or more of the services may be relocated to one or more client devices based on the optimized configuration. The relocation may improve a total performance metric for at least a portion of the service-oriented system. For example, the relocation may improve a total performance metric for one or more service interactions involving the relocated service(s) and/or the client device(s).

Tracking Service Requests

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 21:
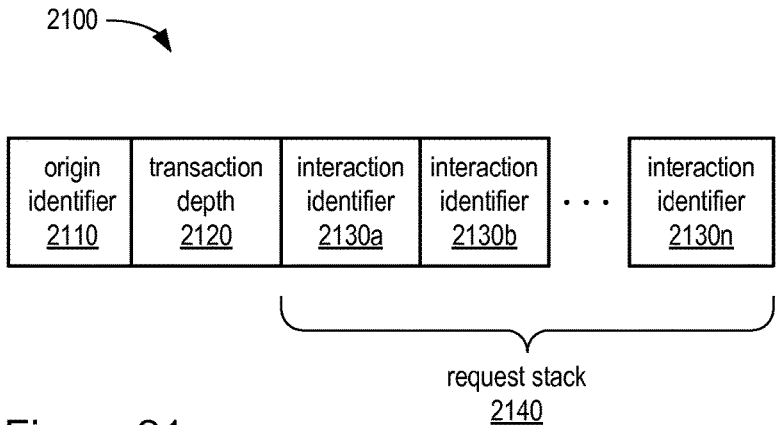
FIG. 21 illustrates an example format of a request identifier, according to some embodiments.

FIG. 21 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 21. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lowercase alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of service requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the shear number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130a-2130n may represent a series of interaction identifiers in ascending chronological order (where interaction identifier 2130a corresponds to the oldest service call and interaction identifier 2130n corresponds to the most recent service call).

In addition to the illustrated elements, request identifier 2100 may in various embodiments include one or more portions of data for error detection and/or error correction. Examples of such data include but are not limited to various types of checksums.

Figure 22:
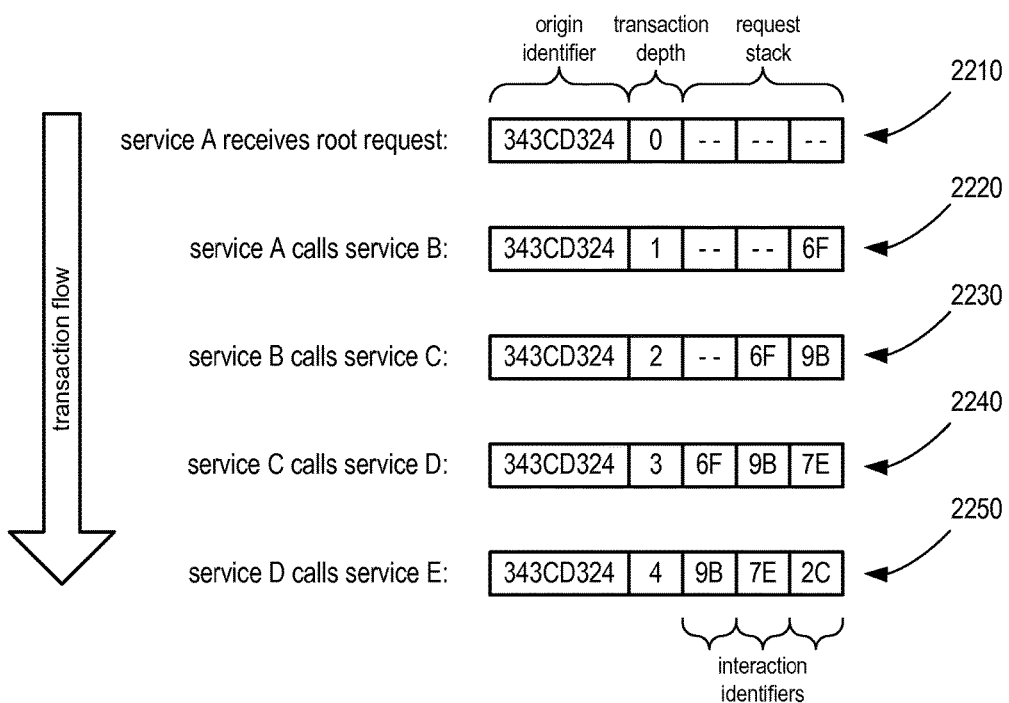
FIG. 22 illustrates an example transaction flow for fulfilling a root request, according to some embodiments.

FIG. 22 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 23). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 23:
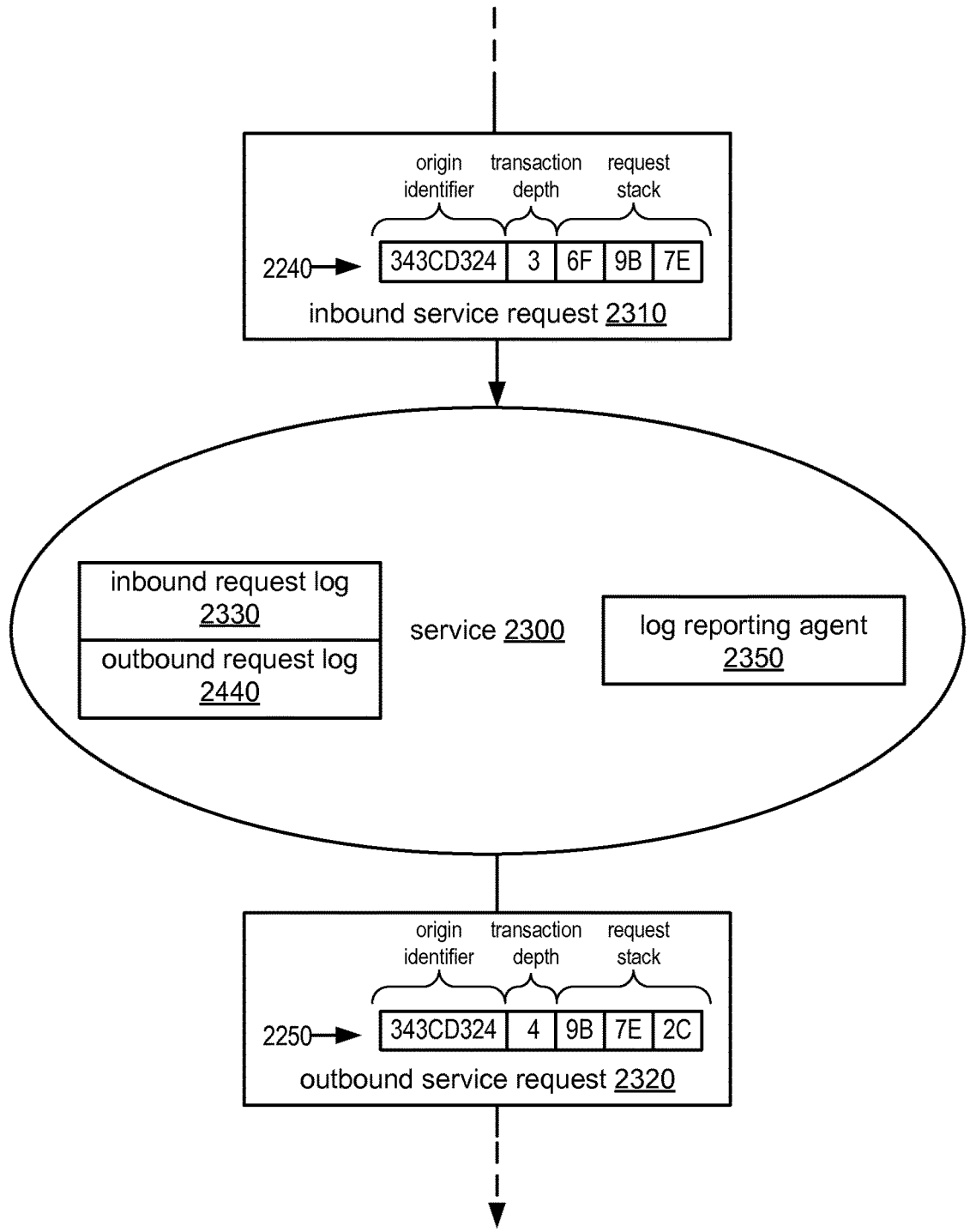
FIG. 23 illustrates one example of a service of a service-oriented system, according to some embodiments.

Referring collectively to FIG. 22 and FIG. 23, a representation of the receipt of an inbound service request (or service call) 2310 as well as the issuance of an outbound request 2320 by service 2300 is illustrated. Request identifiers 2240 and 2250 of FIG. 23 may correspond to the like-numbered elements of FIG. 22. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 22. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 24:
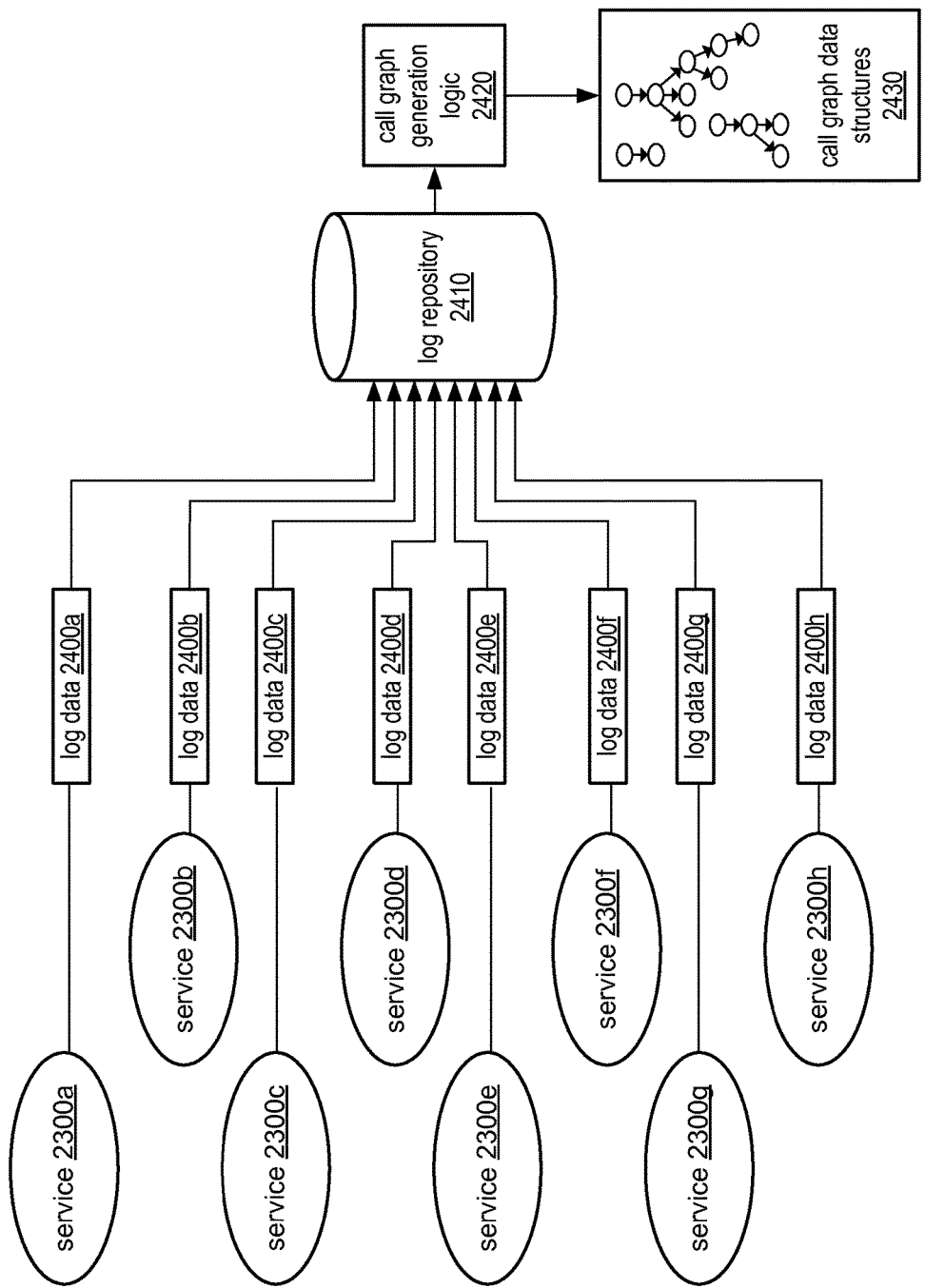
FIG. 24 illustrates an example data flow diagram for the collection of log data and generation of a call graph, according to some embodiments.

Referring collectively to FIG. 23 and FIG. 24, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 24. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 24, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 25:
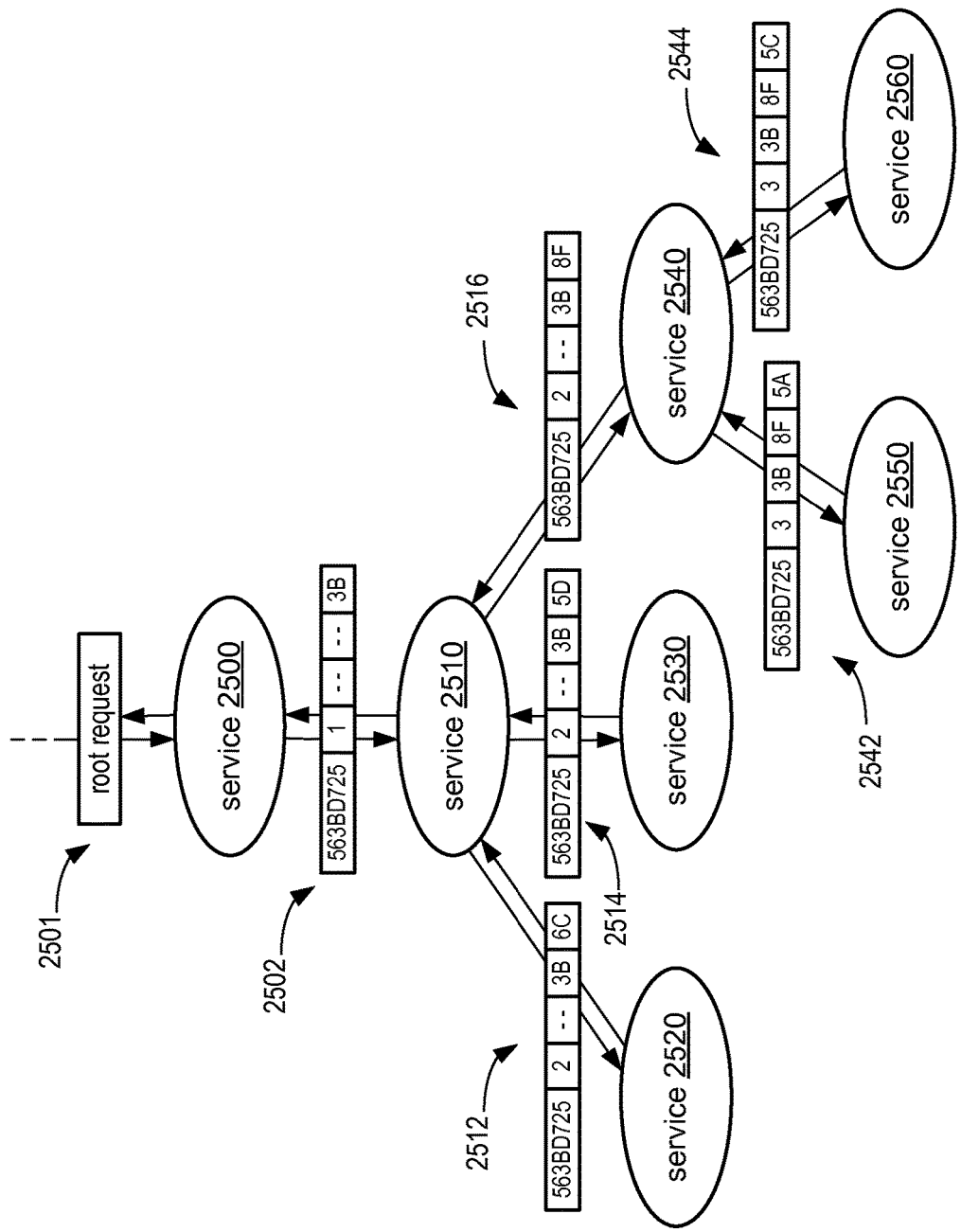
FIG. 25 illustrates an example visual representation of a call graph and request identifiers from which such call graph is generated, according to some embodiments.

FIG. 25 illustrates a visual representation of such a call graph data structure that may be generated by call graph generation logic 2420. In various embodiments, a call graph data structure may include any data structure that specifies, for a given root request, all the services called to fulfill that root request. Note that while FIG. 25 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 25 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 21. Generating the data structure may also include determining that the request stack of a given node at a given level within the hierarchy includes an interaction identifier that is the same as an interaction identifier of the request stack of another node located within an adjacent level of the hierarchy. In response to determining such match, the call graph generation logic may indicate a service call as an edge between said given node and said other node. Examples of such an edge are illustrated as the edges coupling the nodes of FIG. 25 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 23 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 23, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 23, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 23.

In various embodiments, the call graph generation logic may also generate the new depth value such that the new depth value is a result of incrementing the first depth value. For example, in the illustrated embodiment of FIG. 23, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 23, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A terminal downstream service (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 21.

Figure 26:
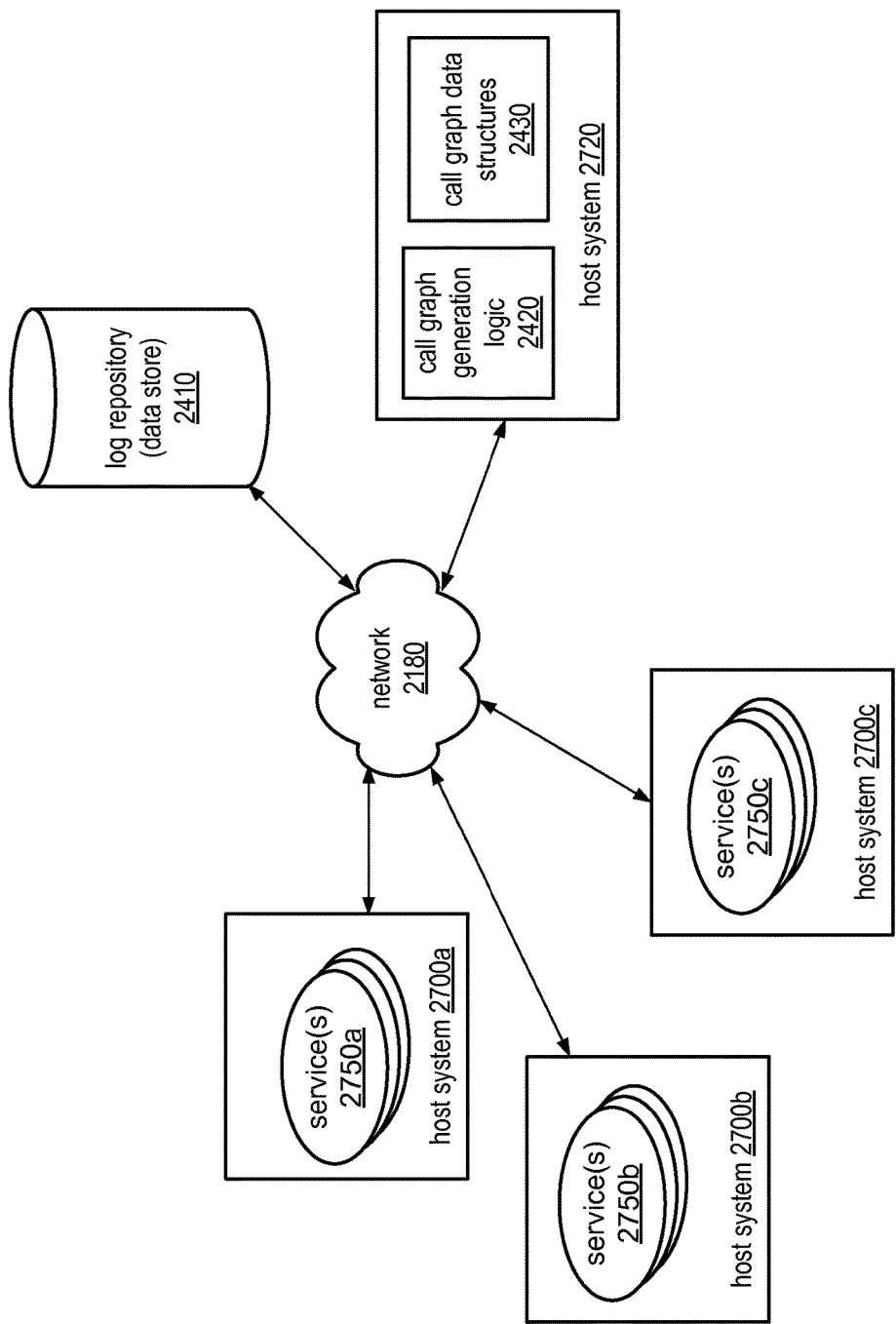
FIG. 26 illustrates an example system configuration for tracking service requests, according to some embodiments.

One example system configuration for tracking service requests is illustrated in FIG. 26. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700a-c and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700a may be configured to execute program instruction to implement one or more services 2750a. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700b-c and services 2750b-c may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Containerization

Figure 27:
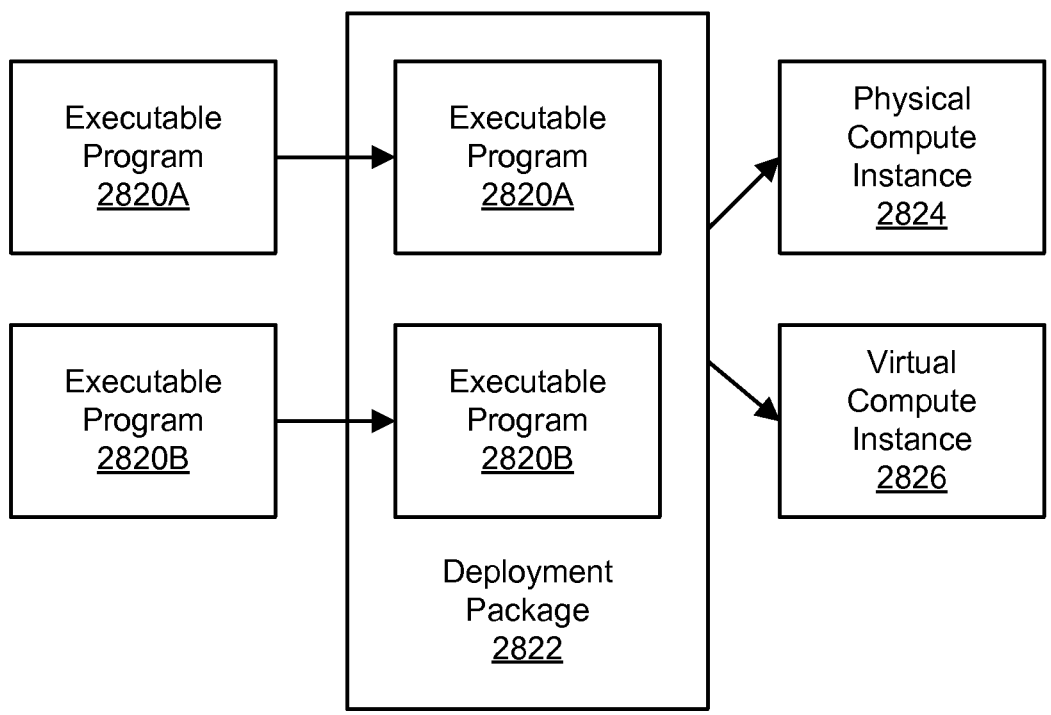
FIG. 27 is a software architecture diagram illustrating the containerization of various types of program components, according to some embodiments.

FIG. 27 is a software architecture diagram illustrating the containerization of various types of program components, according to some embodiments. The program components of a distributed program, including services in a service-oriented system, might be containerized in order to provide flexibility in locating the program components in the distributed execution environment for efficient execution. Containerization refers to a process of integrating one or more program components within an appropriate and re-locatable execution environment. As shown in FIG. 27, various types of executable programs 2820A and 2820B might be containerized into other types of deployment packages 2822 for deployment and execution on a physical compute instance 2824 or a virtual compute instance (or virtual machine) 2826. For instance, JAVA programs that typically execute in separate JAVA virtual machines ("JVMs") might be placed in a containerized JVM for execution.

An optimization component (e.g., the optimizer 180) might determine that one or more program components of the distributed program (e.g., one or more services) should be containerized in order to optimize for the metrics specified by a developer of the distributed program. In response thereto, the optimization component might work in conjunction with other components to perform the containerization. The optimization component might then operate with the deployment component to deploy the containerized program component to a server computer selected to optimize the execution of the distributed program that utilizes the containerized program component. The server computer to which the JVM is deployed might be selected to maximize the efficiency of execution of the JAVA programs in the context of the entire distributed program and the metrics and constraints specified by the developer of the distributed program.

In a similar fashion, the JAVASCRIPT programs, which ordinarily execute in separate JAVASCRIPT engines, might be containerized into a containerized JAVASCRIPT engine. Containerizing in this fashion provides significant flexibility in selecting a server for executing the JAVASCRIPT programs. It should be appreciated, however, that containerization of program components in the manner presented above is not limited to JAVA and JAVASCRIPT programs. For instance, executable C++ programs that typically execute in separate virtual machines might be containerized into a containerized virtual machine for execution.

Once the program components have been containerized, the containers can be deployed to locations in the distributed computing environment in order to optimize for the metrics and constraints specified by the developer of the distributed program. For instance, containers may be located close together (e.g., on the same server, in the same rack of servers, or in the same data center) when possible to reduce latency and data movement between the containerized programs. Similarly, containerized programs might be placed close together or close to dependent resources in order to eliminate or reduce remote network calls. Other types of optimizations might also be performed on containerized and non-containerized program components.

Illustrative Computer System

Figure 28:
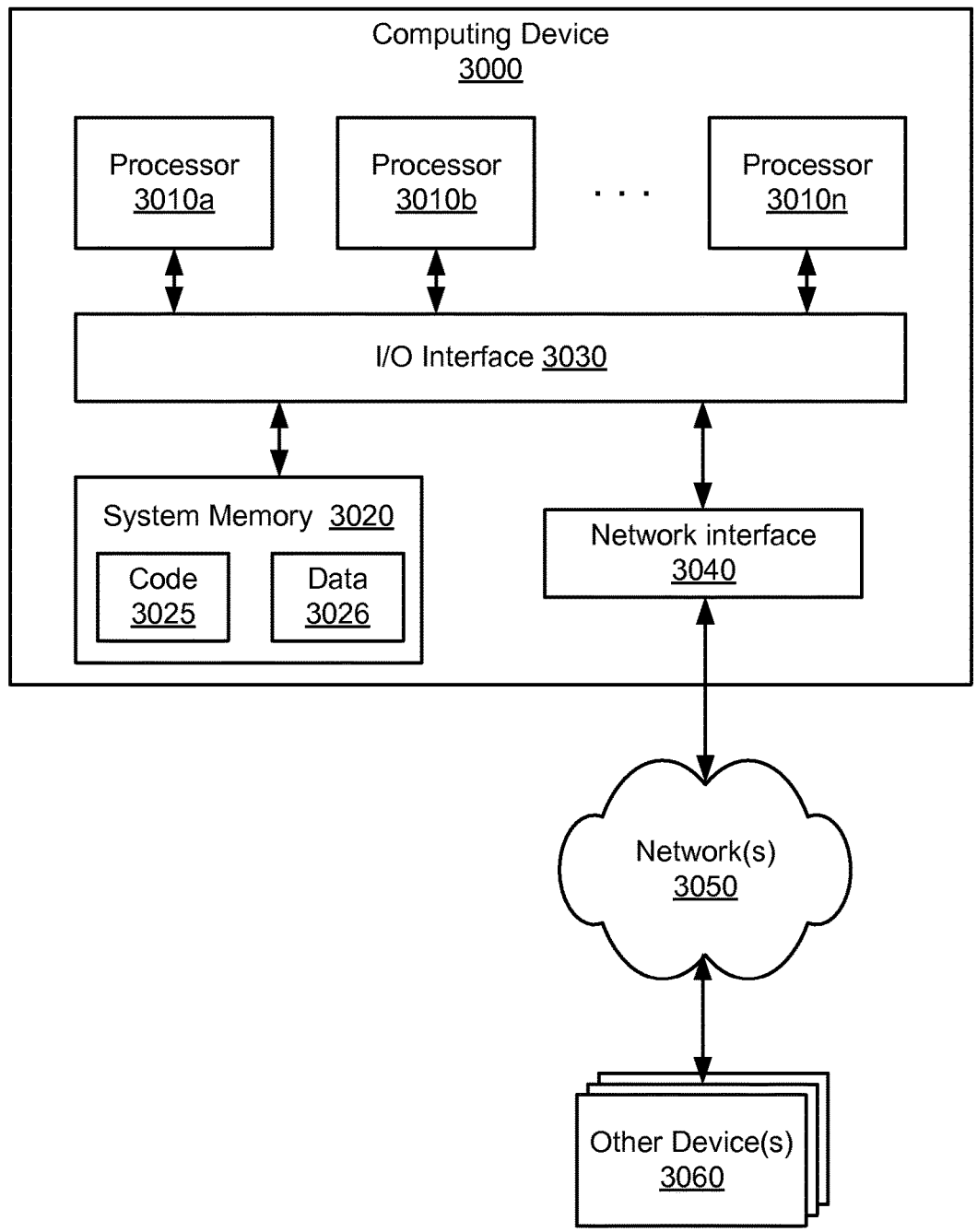
FIG. 28 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 28 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 28 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Embodiments of the disclosure can be described in view of the following clauses:

Clause 1. A system, comprising:
 a plurality of computing devices configured to implement an optimization system and a service-oriented system, wherein the service-oriented system comprises a plurality of services, wherein the plurality of services are configured to:
  generate trace data for a plurality of service interactions between individual ones of the plurality of services, wherein the trace data comprises data indicative of network latency for the plurality of service interactions; and
  send the trace data to the optimization system; and
 wherein the optimization system is configured to:
  determine an optimized configuration for the service-oriented system, wherein the optimized configuration reduces a total network latency for one or more service interactions in the service-oriented system;
  generate a partial service based on an original service of the plurality of services, wherein the partial service is generated based on an automatic analysis of program code of the original service, wherein the partial service includes a first set of program code from the original service and excludes a second set of program code from the original service, and wherein the first set of program code is included in the partial service based on a frequency of use of the first set of program code; and
  cause deployment of one or more instances of the partial service based on the optimized configuration.

Clause 2. The system as recited in clause 1, wherein, in causing deployment of one or more instances of the partial service based on the optimized configuration, the optimization system is configured to:
 cause deployment of one or more instances of the partial service to one or more of the computing devices in a same zone as one or more of the services that interact with the original service;
 cause deployment of one or more instances of the partial service to one or more of the computing devices that host one or more of the services that interact with the original service;
 cause deployment of one or more instances of the partial service to one or more virtual machines that host one or more of the services that interact with the original service; or
 cause deployment of one or more instances of the partial service to one or more processes that host one or more of the services that interact with the original service.

Clause 3. The system as recited in clause 1 or 2, wherein the optimized configuration for the service-oriented system is determined based on performance data for individual ones of the plurality of services, based on static analysis of program code for individual ones of the plurality of services, or based on the performance data for individual ones of the plurality of services and on the static analysis of the program code for individual ones of the plurality of services.

Clause 4. The system as recited in any of clauses 1 to 3, wherein, in performing the automatic analysis of the program code of the original service, the optimization system is configured to:
 determine one or more parameters passed to the original service by one or more of the plurality of services that interact with the original service; and
 partially evaluate the program code of the original service using the one or more parameters.

Clause 5. A computer-implemented method, comprising:
 generating a partial service based on an original service in a service-oriented system, wherein the partial service is generated based on an automatic analysis of program code of the original service, wherein the partial service includes a first set of program code from the original service and excludes a second set of program code from the original service, and wherein the first set of program code is included in the partial service based on a frequency of use of the first set of program code; and
 causing deployment of one or more instances of the partial service to the service-oriented system based on an optimized configuration, wherein the optimized configuration improves a total performance metric in the service-oriented system.

Clause 6. The method as recited in clause 5, wherein causing deployment of one or more instances of the partial service to the service-oriented system based on the optimized configuration comprises:
 causing deployment of one or more instances of the partial service to one or more computing devices in a same zone as one or more services that interact with the original service.

Clause 7. The method as recited in clause 5 or 6, wherein causing deployment of one or more instances of the partial service to the service-oriented system based on the optimized configuration comprises:
 causing deployment of one or more instances of the partial service to one or more computing devices that host one or more services that interact with the original service.

Clause 8. The method as recited in any of clauses 5 to 7, wherein the automatic analysis of the program code of the original service, the generating the partial service based on the original service, and the causing deployment of the one or more instances of the partial service are performed a plurality of times over an interval of time.

Clause 9. The method as recited in any of clauses 5 to 8, further comprising:
 determining the optimized configuration for the service-oriented system based on performance data for a plurality of services, based on static analysis of program code for the plurality of services, or based on the performance data for the plurality of services and on the static analysis of the program code for the plurality of services.

Clause 10. The method as recited in any of clauses 5 to 9, wherein performing the automatic analysis of the program code of the original service comprises:
 determining one or more parameters passed to the original service by one or more services that interact with the original service; and
 partially evaluating the program code of the original service using the one or more parameters.

Clause 11. The method as recited in any of clauses 5 to 10, wherein the one or more parameters are determined based on trace data for a plurality of service interactions between the original service and the one or more services that interact with the original service.

Clause 12. The method as recited in any of clauses 5 to 11, wherein generating the partial service based on the original service comprises:
   substituting, for the second set of program code, a service call to an additional service that implements the second set of program code.

Clause 13. A computer-readable storage medium storing program instructions computer-executable to perform:
   collecting trace data for a plurality of service interactions between individual ones of a plurality of services in a service-oriented system;
   determining an optimized configuration for the service-oriented system based on the trace data;
   generating a partial service based on an original service in the service-oriented system, wherein the partial service is generated based on an automatic analysis of program code of the original service, wherein the partial service includes a first set of program code from the original service and excludes a second set of program code from the original service, and wherein the first set of program code is included in the partial service based on a frequency of use of the first set of program code; and
   causing deployment of one or more instances of the partial service to the service-oriented system based on the optimized configuration.

Clause 14. The computer-readable storage medium as recited in clause 13, wherein, in causing deployment of one or more instances of the partial service to the service-oriented system based on the optimized configuration, the program instructions are further computer-executable to perform:
   causing deployment of one or more instances of the partial service to one or more computing devices in a same zone as one or more services that interact with the original service.

Clause 15. The computer-readable storage medium as recited in clause 13 or 14, wherein, in causing deployment of one or more instances of the partial service to the service-oriented system based on the optimized configuration, the program instructions are further computer-executable to perform:
   causing deployment of one or more instances of the partial service to one or more computing devices that host one or more services that interact with the original service.

Clause 16. The computer-readable storage medium as recited in any of clauses 13 to 15, wherein the automatic analysis of the program code of the original service, the generating the partial service based on the original service, and the causing deployment of the one or more instances of the partial service are performed a plurality of times over an interval of time.

Clause 17. The computer-readable storage medium as recited in any of clauses 13 to 16, wherein the optimized configuration for the service-oriented system is determined based on performance data for a plurality of services, based on static analysis of program code for the plurality of services, or based on the performance data for the plurality of services and on the static analysis of the program code for the plurality of services.

Clause 18. The computer-readable storage medium as recited in any of clauses 13 to 17, wherein, in performing the automatic analysis of the program code of the original service, the program instructions are further computer-executable to perform:
   determining one or more parameters passed to the original service by one or more services that interact with the original service; and
   partially evaluating the program code of the original service using the one or more parameters.

Clause 19. The computer-readable storage medium as recited in any of clauses 13 to 18, wherein the one or more parameters are determined based on trace data for a plurality of service interactions between the original service and the one or more services that interact with the original service.

Clause 20. The computer-readable storage medium as recited in any of clauses 13 to 19, wherein, in generating the partial service based on the original service, the program instructions are further computer-executable to perform:
   substituting, for the second set of program code, a service call to an additional service that implements the second set of program code.

Clause 21. A system, comprising:
   a plurality of computing devices configured to implement an optimization system and a service-oriented system, wherein the service-oriented system comprises a plurality of services, wherein the plurality of services are configured to:
      generate trace data for a plurality of service interactions between individual ones of the plurality of services, wherein the trace data comprises data indicative of network latency for the plurality of service interactions; and
      send the trace data to the optimization system; and
   wherein the optimization system is configured to:
      determine an optimized configuration for the service-oriented system based on the trace data; and
      cause relocation of one or more of the plurality of services to one or more edge hosts based on the optimized configuration, wherein the relocation improves a total performance metric for one or more service interactions involving the one or more relocated services on the one or more edge hosts.

Clause 22. The system as recited in clause 21, wherein the optimization system is configured to:
   cause an additional relocation of one or more of the plurality of services to one or more of the client devices based on the optimized configuration, wherein the additional relocation improves a total performance metric for one or more service interactions involving the one or more client devices.

Clause 23. The system as recited in clause 21 or 22, wherein the optimization system is configured to:
   generate a partial service based on an original service of the plurality of services, wherein the partial service includes a first set of program code from the original service and excludes a second set of program code from the original service, and wherein the first set of program code is included in the partial service based on a frequency of use of the first set of program code;
   wherein, in causing the relocation of one or more of the plurality of services to the one or more edge hosts based on the optimized configuration, the optimization system is configured to cause relocation of the partial service to the one or more edge hosts based on the optimized configuration.

Clause 24. The system as recited in any of clauses 21 to 23, wherein one or more content delivery networks comprise the one or more edge hosts.

Clause 25. A computer-implemented method, comprising:
  determining an optimized configuration for a service-oriented system based on trace data for a plurality of service interactions between individual ones of a plurality of services in the service-oriented system; and
  causing relocation of one or more of the plurality of services to or from one or more edge hosts based on the optimized configuration, wherein the relocation improves a total performance metric for one or more service interactions involving the one or more edge hosts.

Clause 26. The method as recited in clause 25, further comprising:
  causing an additional relocation of one or more of the plurality of services to or from one or more of the client devices based on the optimized configuration, wherein the additional relocation improves a total performance metric for one or more service interactions involving the one or more client devices.

Clause 27. The method as recited in clause 25 or 26, further comprising:
  generating a partial service based on an original service of the plurality of services, wherein the partial service includes a first set of program code from the original service and excludes a second set of program code from the original service, and wherein the first set of program code is included in the partial service based on a frequency of use of the first set of program code;
  wherein causing the relocation of one or more of the plurality of services to or from the one or more edge hosts based on the optimized configuration comprises causing relocation of the partial service to or from the one or more edge hosts based on the optimized configuration.

Clause 28. The method as recited in any of clauses 25 to 27, wherein one or more content delivery networks comprise the one or more edge hosts.

Clause 29. The method as recited in any of clauses 25 to 28, wherein the trace data comprises data indicative of network latency for the plurality of service interactions.

Clause 30. The method as recited in any of clauses 25 to 29, further comprising:
  translating program code for the relocated one or more services to a format executable on the one or more edge hosts.

Clause 31. The method as recited in any of clauses 25 to 30, wherein the optimized configuration is determined based on an estimated cost of executing the relocated one or more services on the one or more edge hosts.

Clause 32. The method as recited in any of clauses 25 to 31, wherein the optimized configuration is determined based on a security risk analysis of executing the relocated one or more services on the one or more edge hosts.

Clause 33. A computer-readable storage medium storing program instructions computer-executable to perform:
  collecting trace data for a plurality of service interactions between individual ones of a plurality of services in a service-oriented system;
  determining an optimized configuration for the service-oriented system based on the trace data; and
  causing relocation of one or more of the plurality of services to one or more edge hosts based on the optimized configuration, wherein the relocation improves a total performance metric for one or more service interactions involving the one or more edge hosts.

Clause 34. The computer-readable storage medium as recited in clause 33, wherein the program instructions are further computer-executable to perform:
  causing an additional relocation of one or more of the plurality of services to one or more of the client devices based on the optimized configuration, wherein the additional relocation improves a total performance metric for one or more service interactions involving the one or more client devices.

Clause 35. The computer-readable storage medium as recited in clause 33 or 34, wherein the program instructions are further computer-executable to perform:
  generating a partial service based on an original service of the plurality of services, wherein the partial service includes a first set of program code from the original service and excludes a second set of program code from the original service, and wherein the first set of program code is included in the partial service based on a frequency of use of the first set of program code;
  wherein causing the relocation of one or more of the plurality of services to the one or more edge hosts based on the optimized configuration comprises causing relocation of the partial service to the one or more edge hosts based on the optimized configuration.

Clause 36. The computer-readable storage medium as recited in any of clauses 33 to 35, wherein one or more content delivery networks comprise the one or more edge hosts.

Clause 37. The computer-readable storage medium as recited in any of clauses 33 to 36, wherein the trace data comprises data indicative of network latency for the plurality of service interactions.

Clause 38. The computer-readable storage medium as recited in any of clauses 33 to 37, wherein the program instructions are further computer-executable to perform:
  translating program code for the relocated one or more services to a format executable on the one or more edge hosts.

Clause 39. The computer-readable storage medium as recited in any of clauses 33 to 38, wherein the optimized configuration is determined based on an estimated cost of executing the relocated one or more services on the one or more edge hosts.

Clause 40. The computer-readable storage medium as recited in any of clauses 33 to 39, wherein the program instructions are further computer-executable to perform:
  determining a further optimized configuration for the service-oriented system based on additional trace data for a plurality of additional service interactions in the service-oriented system; and
  causing an additional relocation of individual ones of the relocated one or more services from the one or more edge hosts to one or more hosts in the service-oriented system, wherein the additional relocation is performed based on the further optimized configuration.

Clause 41. A system, comprising:
  a plurality of computing devices configured to implement an optimization system and a service-oriented system, wherein the service-oriented system comprises a plurality of services, wherein the plurality of services are configured to:
    generate trace data for a plurality of service interactions between individual ones of the plurality of services, wherein the trace data comprises data indicative of network latency for the plurality of service interactions; and send the trace data to the optimization system; and
wherein the optimization system is configured to:
  determine an optimized configuration for the service-oriented system based on the trace data; and
  cause relocation of one or more of the plurality of services to one or more client devices based on the optimized configuration, wherein the relocation improves a total performance metric for one or more service interactions involving the one or more relocated services on the one or more client devices.

Clause 42. The system as recited in clause 41, wherein the optimization system is configured to:
  cause an additional relocation of one or more of the plurality of services to one or more edge hosts based on the optimized configuration, wherein the additional relocation improves a total performance metric for one or more service interactions involving the one or more edge hosts.

Clause 43. The system as recited in clause 41 or 42, wherein the optimization system is configured to:
  generate a partial service based on an original service of the plurality of services, wherein the partial service includes a first set of program code from the original service and excludes a second set of program code from the original service, and wherein the first set of program code is included in the partial service based on a frequency of use of the first set of program code;
  wherein, in causing the relocation of one or more of the plurality of services to one or more client devices based on the optimized configuration, the optimization system is configured to cause relocation of the partial service to the one or more client devices based on the optimized configuration.

Clause 44. The system as recited in any of clauses 41 to 43, wherein the optimization system is configured to:
  translate program code for the relocated one or more services to a format executable on the one or more client devices.

Clause 45. A computer-implemented method, comprising:
  determining an optimized configuration for a service-oriented system based on trace data for a plurality of service interactions between individual ones of a plurality of services in the service-oriented system; and
  causing relocation of one or more of the plurality of services to or from one or more client devices based on the optimized configuration, wherein the relocation improves a total performance metric for one or more service interactions involving the one or more client devices.

Clause 46. The method as recited in clause 45, further comprising:
  causing an additional relocation of one or more of the plurality of services to or from one or more edge hosts based on the optimized configuration, wherein the additional relocation improves a total performance metric for one or more service interactions involving the one or more edge hosts.

Clause 47. The method as recited in clause 45 or 46, wherein one or more content delivery networks comprise the one or more edge hosts.

Clause 48. The method as recited in any of clauses 45 to 47, wherein the trace data comprises data indicative of network latency for the plurality of service interactions.

Clause 49. The method as recited in any of clauses 45 to 48, further comprising:
  translating program code for the relocated one or more services to a format executable on the one or more client devices.

Clause 50. The method as recited in any of clauses 45 to 49, wherein the optimized configuration is determined based on an estimated cost of executing the relocated one or more services on the one or more client devices.

Clause 51. The method as recited in any of clauses 45 to 50, wherein the optimized configuration is determined based on a security risk analysis of executing the relocated one or more services on the one or more client devices.

Clause 52. The method as recited in clause any of clauses 45 to 51, further comprising:
  enabling a first portion of program code for individual ones of the relocated one or more services and disabling a second portion of program code for individual ones of the relocated one or more services on the one or more client devices.

Clause 53. A computer-readable storage medium storing program instructions computer-executable to perform:
  collecting trace data for a plurality of service interactions between individual ones of a plurality of services in a service-oriented system;
  determining an optimized configuration for the service-oriented system based on the trace data; and
  causing relocation of one or more of the plurality of services to one or more client devices based on the optimized configuration, wherein the relocation improves a total performance metric for one or more service interactions on the one or more client devices.

Clause 54. The computer-readable storage medium as recited in clause 53, wherein the program instructions are further computer-executable to perform:
  causing an additional relocation of one or more of the plurality of services to one or more edge hosts based on the optimized configuration, wherein the additional relocation improves a total performance metric for one or more service interactions involving the one or more edge hosts.

Clause 55. The computer-readable storage medium as recited in clause 53 or 54, wherein one or more content delivery networks comprise the one or more edge hosts.

Clause 56. The computer-readable storage medium as recited in any of clauses 53 to 55, wherein the trace data comprises data indicative of network latency for the plurality of service interactions.

Clause 57. The computer-readable storage medium as recited in any of clauses 53 to 56, wherein the program instructions are further computer-executable to perform:
  translating program code for the relocated one or more services to a format executable on the one or more client devices.

Clause 58. The computer-readable storage medium as recited in any of clauses 53 to 57, wherein the optimized configuration is determined based on an estimated cost of executing the relocated one or more services on the one or more client devices.

Clause 59. The computer-readable storage medium as recited in any of clauses 53 to 58, wherein the program instructions are further computer-executable to perform:
  determining a further optimized configuration for the service-oriented system based on additional trace data for a plurality of additional service interactions in the service-oriented system; and
  causing an additional relocation of individual ones of the relocated one or more services from the one or more client devices to one or more hosts in the service-oriented system, wherein the additional relocation is performed based on the further optimized configuration.

Clause 60. The computer-readable storage medium as recited in any of clauses 53 to 59, wherein the program instructions are further computer-executable to perform:
enabling a first portion of program code for individual ones of the relocated one or more services and disabling a second portion of program code for individual ones of the relocated one or more services on the one or more client devices.

Clause 61. A system, comprising:
a plurality of computing devices configured to implement an optimization system and a service-oriented system, wherein the service-oriented system comprises a plurality of services, wherein the plurality of services are configured to:
generate trace data for a plurality of service interactions between individual ones of the plurality of services, wherein the trace data comprises data indicative of call paths, performance metrics, or call paths and performance metrics for the plurality of service interactions; and
send the trace data to the optimization system; and
wherein the optimization system is configured to:
determine a respective cost of individual ones of a plurality of configuration options in the service-oriented system;
determine an optimized configuration for the service-oriented system based on the respective costs and the trace data, wherein the optimized configuration comprises a selection of one or more of the plurality of configuration options, and wherein the optimized configuration improves at least one performance metric, at least one cost, or at least one performance metric and at least one cost across at least a portion of the service-oriented system; and
cause deployment of the optimized configuration to the service-oriented system, wherein the deployment of the optimized configuration comprises modification of a configuration of a cache, modification of a location of a data source or a location of a service that uses the data source, modification of a configuration for service parallelization, or modification of a configuration for response precomputation.

Clause 62. The system as recited in clause 61, wherein the deployment of the optimized configuration comprises modification of a configuration of a cache or a location of a data source for a service whose program code does not specify usage of the cache or the data source.

Clause 63. The system as recited in clause 61 or 62, wherein the optimized configuration is determined based on an automated optimization process.

Clause 64. The system as recited in any of clauses 61 to 63, wherein the optimization system is further configured to:
refine the optimized configuration for the service-oriented system a plurality of times over an interval of time.

Clause 65. A computer-implemented method, comprising:
receiving trace data for a plurality of service interactions between individual ones of a plurality of services in a service-oriented system;
receiving a respective cost of individual ones of a plurality of configuration options in the service-oriented system;
determining an optimized configuration for the service-oriented system based on the respective costs and the trace data, wherein the optimized configuration is determined based on an automated optimization process, and wherein the optimized configuration comprises a selection of one or more of the plurality of configuration options; and
causing deployment of the optimized configuration to the service-oriented system.

Clause 66. The method as recited in clause 65, wherein the plurality of configuration options comprise a plurality of cache configuration options, and wherein the optimized configuration comprises a selection of one or more of the cache configuration options.

Clause 67. The method as recited in clause 65 or 66, wherein the deployment of the optimized configuration comprises modification of a configuration of a cache or a location of a data source for a service whose program code does not specify usage of the cache or the data source.

Clause 68. The method as recited in any of clauses 65 to 67, wherein the plurality of configuration options comprise a plurality of options for batch accumulation for a plurality of service calls to a remote node, and wherein the optimized configuration comprises a selection of one or more of the options for batch accumulation.

Clause 69. The method as recited in any of clauses 65 to 68, wherein the plurality of configuration options comprise a plurality of data location options, and wherein the optimized configuration comprises a selection of one or more of the data location options.

Clause 70. The method as recited in any of clauses 65 to 69, wherein the plurality of configuration options comprise a plurality of service parallelization options, and wherein the optimized configuration comprises a selection of one or more of the service parallelization options.

Clause 71. The method as recited in any of clauses 65 to 70, wherein the plurality of configuration options comprise a plurality of response precomputation options, and wherein the optimized configuration comprises a selection of one or more of the response precomputation options.

Clause 72. The method as recited in any of clauses 65 to 71, wherein the optimized configuration comprises a new location for a service with respect to a data source that provides input for the service.

Clause 73. A computer-readable storage medium storing program instructions computer-executable to perform:
collecting trace data for a plurality of service interactions between individual ones of a plurality of services in a service-oriented system;
determining a respective cost of individual ones of a plurality of configuration options in the service-oriented system;
determining an optimized configuration for the service-oriented system based on the respective costs and the trace data, wherein the optimized configuration is determined using an automated optimizer, and wherein the optimized configuration comprises a selection of one or more of the plurality of configuration options; and
causing deployment of the optimized configuration to the service-oriented system.

Clause 74. The computer-readable storage medium as recited in clause 73, wherein the plurality of configuration options comprise a plurality of cache configuration options, and wherein the optimized configuration comprises a selection of one or more of the cache configuration options.

Clause 75. The computer-readable storage medium as recited in clause 73 or 74, wherein the deployment of the optimized configuration comprises modification of a configuration of a cache or a location of a data source for a service whose program code does not specify usage of the cache or the data source.

Clause 76. The computer-readable storage medium as recited in any of clauses 73 to 75, wherein the program instructions are further computer-executable to perform:
    refining the optimized configuration for the service-oriented system a plurality of times over an interval of time.

Clause 77. The computer-readable storage medium as recited in any of clauses 73 to 76, wherein the plurality of configuration options comprise a plurality of data location options, and wherein the optimized configuration comprises a selection of one or more of the data location options.

Clause 78. The computer-readable storage medium as recited in any of clauses 73 to 77, wherein the plurality of configuration options comprise a plurality of service parallelization options, and wherein the optimized configuration comprises a selection of one or more of the service parallelization options.

Clause 79. The computer-readable storage medium as recited in any of clauses 73 to 78, wherein the plurality of configuration options comprise a plurality of response precomputation options, and wherein the optimized configuration comprises a selection of one or more of the response precomputation options.

Clause 80. The computer-readable storage medium as recited in any of clauses 73 to 79, wherein the optimized configuration improves at least one performance metric, at least one cost, or at least one performance metric and at least one cost across at least a portion of the service-oriented system.

Clause 81. A system, comprising:
    a plurality of computing devices configured to implement an optimization system and a service-oriented system, wherein the service-oriented system comprises a plurality of services, wherein the optimization system is configured to:
        perform a cross-service static analysis of program code for individual ones of the plurality of services;
        determine, based on the cross-service static analysis, one or more service dependencies in the program code for the individual ones of the plurality of services, wherein the one or more service dependencies comprise one or more service calls between the individual ones of the plurality of services;
        determine an optimized configuration for the service-oriented system, wherein the optimized configuration improves a total performance metric in at least a portion of the service-oriented system, and wherein the optimized configuration comprises a colocation of at least two of the plurality of services based on the one or more service dependencies; and
        cause deployment of individual ones of the plurality of services based on the optimized configuration, wherein the deployment comprises the colocation.

Clause 82. The system as recited in clause 81, wherein the optimization system is configured to:
    generate, based on the cross-service static analysis, program code for one or more new services, wherein the program code for the one or more new services comprises at least a portion of the program code for two or more of the plurality of services.

Clause 83. The system as recited in clause 81 or 82, wherein the optimization system is configured to:
    compile the program code for two or more of the services together based on the one or more service dependencies.

Clause 84. The system as recited in any of clauses 81 to 83, wherein, in causing deployment of individual ones of the plurality of services based on the optimized configuration, the optimization system is configured to:
    cause deployment of two or more of the services to a same zone based on the one or more service dependencies;
    cause deployment of two or more of the services to a same host based on the one or more service dependencies; or
    cause deployment of two or more of the services to a same process based on the one or more service dependencies.

Clause 85. A computer-implemented method, comprising:
    performing a cross-service static analysis of program code for individual ones of a plurality of services in a service-oriented system;
    determining, based on the cross-service static analysis, one or more service dependencies in the program code for the individual ones of the plurality of services;
    determining an optimized configuration for the service-oriented system based on the one or more service dependencies; and
    causing deployment of individual ones of the plurality of services to the service-oriented system based on the optimized configuration.

Clause 86. The method as recited in clause 85, wherein causing deployment of the individual ones of the plurality of services to the service-oriented system based on the optimized configuration comprises:
    causing deployment of two or more of the services to a same zone based on the one or more service dependencies.

Clause 87. The method as recited in clause 85 or 86, wherein causing deployment of the individual ones of the plurality of services to the service-oriented system based on the optimized configuration comprises:
    causing deployment of two or more of the services to a same host based on the one or more service dependencies.

Clause 88. The method as recited in any of clauses 85 to 87, wherein causing deployment of the individual ones of the plurality of services to the service-oriented system based on the optimized configuration comprises:
    causing deployment of two or more of the services to a same process based on the one or more service dependencies.

Clause 89. The method as recited in any of clauses 85 to 88, further comprising:
    generating, based on the cross-service static analysis, optimized program code for one or more of the plurality of services.

Clause 90. The method as recited in any of clauses 85 to 89, further comprising:
    generating, based on the cross-service static analysis, program code for one or more new services, wherein the program code for the one or more new services comprises at least a portion of the program code for two or more of the plurality of services and excludes an additional portion of the program code for the two or more of the plurality of services.

Clause 91. The method as recited in any of clauses 85 to 90, further comprising:
    collecting trace data using individual ones of the deployed services, wherein the trace data describes a plurality of service interactions; and
    refining the optimized configuration using the trace data.

Clause 92. The method as recited in any of clauses 85 to 91, further comprising:
deploying, based on the cross-service static analysis, one or more caches between individual ones of the plurality of services.

Clause 93. A computer-readable storage medium storing program instructions computer-executable to perform:
performing a cross-service static analysis of program code for individual ones of a plurality of services in a service-oriented system;
determining, based on the cross-service static analysis, one or more service dependencies in the program code for the individual ones of the plurality of services, wherein the one or more service dependencies comprise one or more service calls between the individual ones of the plurality of services;
determining an optimized configuration for the service-oriented system based on the one or more service dependencies, wherein the optimized configuration improves a total performance metric in at least a portion of the service-oriented system; and
causing deployment of individual ones of the plurality of services to the service-oriented system based on the optimized configuration.

Clause 94. The computer-readable storage medium as recited in clause 93, wherein, in causing deployment of the individual ones of the plurality of services to the service-oriented system based on the optimized configuration, the program instructions are further computer-executable to perform:
causing deployment of two or more of the services to a same zone based on the one or more service dependencies.

Clause 95. The computer-readable storage medium as recited in clause 93 or 94, wherein, in causing deployment of the individual ones of the plurality of services to the service-oriented system based on the optimized configuration, the program instructions are further computer-executable to perform:
causing deployment of two or more of the services to a same host based on the one or more service dependencies.

Clause 96. The computer-readable storage medium as recited in any of clauses 93 to 95, wherein, in causing deployment of the individual ones of the plurality of services to the service-oriented system based on the optimized configuration, the program instructions are further computer-executable to perform:
causing deployment of two or more of the services to a same process based on the one or more service dependencies.

Clause 97. The computer-readable storage medium as recited in any of clauses 93 to 96, wherein the program instructions are further computer-executable to perform:
generating, based on the cross-service static analysis, optimized program code for one or more of the plurality of services.

Clause 98. The computer-readable storage medium as recited in any of clauses 93 to 97, wherein the program instructions are further computer-executable to perform:
generating, based on the cross-service static analysis, program code for one or more new services, wherein the program code for the one or more new services comprises at least a portion of the program code for two or more of the plurality of services and excludes an additional portion of the program code for the two or more of the plurality of services.

Clause 99. The computer-readable storage medium as recited in any of clauses 93 to 98, wherein the program instructions are further computer-executable to perform:
generating, based on the cross-service static analysis, optimized program code for one or more of the plurality of services, wherein the optimized program code substitutes a table of results for a service call, wherein contents of the table of results are restricted based on the cross-service static analysis.

Clause 100. The computer-readable storage medium as recited in any of clauses 93 to 99, wherein the program instructions are further computer-executable to perform:
deploying, based on the cross-service static analysis, one or more caches between individual ones of the plurality of services.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement an optimization system and a service-oriented system, wherein the service-oriented system comprises a plurality of services, wherein at least some of the plurality of services are accessible by a plurality of client devices that are clients of the service-oriented system, wherein the plurality of services are configured to:
generate trace data for a plurality of service interactions between individual ones of the plurality of services, wherein the trace data comprises data indicative of network latency for the plurality of service interactions; and
send the trace data to the optimization system; and
wherein the optimization system is configured to:
determine an optimized configuration for the service-oriented system based on the trace data; and
cause deployment of one or more partial services corresponding to one or more respective original services of the plurality of services to one or more of the client devices based on the optimized configuration, wherein individual ones of the partial services include a portion of program code used by an original service and exclude another portion of program code used by the original service, and wherein a frequency of use by the original service of the other portion of excluded code is lower than that of the included portion of program code, and wherein the deployment improves a total performance metric for one or more service interactions involving the one or more client devices.

2. The system as recited in claim 1, wherein the optimization system is configured to:
cause a relocation of one or more of the plurality of services to one or more edge hosts based on the optimized configuration, wherein the relocation improves a total performance metric for one or more service interactions involving the one or more edge hosts.

3. The system as recited in claim 1, wherein the optimization system is configured to, for the individual ones of the partial services:
determine that a frequency of use by the original service of the portion of program code is above a threshold frequency of use; and
generate the partial service, wherein the partial service includes the portion of program code.

4. The system as recited in claim 1, wherein the optimization system is configured to:
translate program code for the one or more partial services to a format executable on the one or more client devices.

5. A computer-implemented method, comprising:
determining an optimized configuration for a service-oriented system based on trace data for a plurality of service interactions between individual ones of a plurality of services in the service-oriented system, wherein at least some of the plurality of services are accessible by a plurality of client devices that are clients of the service-oriented system; and
causing deployment of one or more partial services corresponding to one or more respective original services of the plurality of services to one or more of the client devices the plurality of client devices based on the optimized configuration, wherein individual ones of the partial services include a portion of program code used by an original service and exclude another portion of program code used by the original service, and wherein a frequency of use by the original service of the other portion of excluded code is lower than that of the included portion of program code, and wherein the deployment improves a total performance metric for one or more service interactions involving the one or more client devices.

6. The method as recited in claim 5, further comprising:
causing a relocation of one or more of the plurality of services to or from one or more edge hosts based on the optimized configuration, wherein the relocation improves a total performance metric for one or more service interactions involving the one or more edge hosts.

7. The method as recited in claim 6, wherein one or more content delivery networks comprise the one or more edge hosts.

8. The method as recited in claim 5, wherein the trace data comprises data indicative of network latency for the plurality of service interactions.

9. The method as recited in claim 5, further comprising:
translating the included portion of program code for the one or more partial services to a format executable on the one or more client devices.

10. The method as recited in claim 5, wherein the optimized configuration is determined based on an estimated cost of executing the one or more partial services on the one or more client devices.

11. The method as recited in claim 5, wherein the optimized configuration is determined based on a security risk analysis of executing the one or more partial services on the one or more client devices.

12. The method as recited in claim 5, further comprising for individual ones of the one or more services that have been migrated to one or more of the client devices:
enabling a first portion of program code for the service one or more services and disabling a second portion of program code for the service.

13. A computer-readable storage medium storing program instructions computer-executable to perform:
collecting trace data for a plurality of service interactions between individual ones of a plurality of services in a service-oriented system, wherein at least some of the plurality of services are accessible by a plurality of client devices that are clients of the service-oriented system;
determining an optimized configuration for the service-oriented system based on the trace data; and causing deployment of one or more partial services corresponding to one or more respective original services of the plurality of services to one or more of the client devices based on the optimized configuration, wherein individual ones of the partial services include a portion of program code used by an original service and exclude another portion of program code used by the original service, and wherein a frequency of use by the original service of the other portion of excluded code is lower than that of the included portion of program code, and wherein the deployment improves a total performance metric for one or more service interactions on the one or more client devices.

14. The computer-readable storage medium as recited in claim 13, wherein the program instructions are further computer-executable to perform:
   causing a relocation of one or more of the plurality of services to one or more edge hosts based on the optimized configuration, wherein the relocation improves a total performance metric for one or more service interactions involving the one or more edge hosts.

15. The computer-readable storage medium as recited in claim 14, wherein one or more content delivery networks comprise the one or more edge hosts.

16. The computer-readable storage medium as recited in claim 13, wherein the trace data comprises data indicative of network latency for the plurality of service interactions.

17. The computer-readable storage medium as recited in claim 13, wherein the program instructions are further computer-executable to perform:
   translating the included portion of program code for the one or more partial services to a format executable on the one or more client devices.

18. The computer-readable storage medium as recited in claim 13, wherein the optimized configuration is determined based on an estimated cost of executing the one or more partial services on the one or more client devices.

19. The computer-readable storage medium as recited in claim 13, wherein the program instructions are further computer-executable to perform:
   determining a further optimized configuration for the service-oriented system based on additional trace data for a plurality of additional service interactions in the service-oriented system; and
   causing a relocation of individual ones of the one or more services from the one or more client devices to one or more hosts in the service-oriented system, wherein the relocation is performed based on the further optimized configuration.

20. The computer-readable storage medium as recited in claim 13, wherein the program instructions are further computer-executable to perform, for individual ones of the one or more services that have been migrated to one or more of the client devices:
   enabling a first portion of program code for the service one or more services and disabling a second portion of program code for the service.

* * * * *